US007195560B2

(12) United States Patent
DeMar et al.

(10) Patent No.: US 7,195,560 B2
(45) Date of Patent: Mar. 27, 2007

(54) GAMING MACHINES WITH BOARD GAME THEME

(75) Inventors: Lawrence E. DeMar, Winnetka, IL (US); Erica Frohm, Evanston, IL (US); William A. Grupp, Sleepy Hollow, IL (US); Joel R. Jaffe, Evanston, IL (US); Scott Slomiany, Streamwood, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 10/427,657

(22) Filed: Apr. 30, 2003

(65) Prior Publication Data

US 2003/0199309 A1 Oct. 23, 2003

Related U.S. Application Data

(60) Continuation of application No. 10/350,606, filed on Jan. 24, 2003, which is a continuation of application No. 10/092,817, filed on Mar. 7, 2002, now Pat. No. 6,520,855, which is a division of application No. 09/940,813, filed on Aug. 27, 2001, now Pat. No. 6,508,707, which is a division of application No. 09/274,793, filed on Mar. 23, 1999, now Pat. No. 6,315,660.

(60) Provisional application No. 60/079,143, filed on Mar. 24, 1998.

(51) Int. Cl.
*G07F 17/34* (2006.01)
*A63F 13/00* (2006.01)

(52) U.S. Cl. ............................ 463/20; 463/16; 463/22; 463/32; 273/143 R; 273/138.1; 273/138.2; 273/145 R

(58) Field of Classification Search .................. 463/20, 463/32, 22, 16; 273/143 R, 138.1, 138.2, 273/145 R
See application file for complete search history.

(56) References Cited

U.S. PATENT DOCUMENTS 3,281,149 A 10/1966 Miller ........................ 273/143

(Continued)

FOREIGN PATENT DOCUMENTS

DE 37 00 861 7/1988

(Continued)

OTHER PUBLICATIONS

Product Sheet for "Monopoly SWP," JPM Ltd., 4 pages, date unknown.

(Continued)

*Primary Examiner*—Benjamin H. Layno
(74) *Attorney, Agent, or Firm*—Jenkens & Gilchrist

(57) ABSTRACT

Gaming machines are disclosed having a basic mode defining a plurality of reels and a bonus mode defining a plurality of stations about a game board (e.g., MONOPOLY board) traversable by a token identifier. The disclosure describes a plurality of play features for the basic and/or bonus modes including (1) a feature allowing the player to select a game token; (2) a feature allowing the player to predict and wager on landing position(s) of the token identifier; (3) a feature allowing the player to obtain deferred-execution instruction (s) which are exercisable by the processor to override later-issued instruction(s) otherwise to be executed by the processor; (4) a feature in which movements of the token identifier are determined according to movement tables corresponding to the various stations of the game board; (5) a feature in which escalating bonuses are awarded for reaching a designated bonus square (e.g., the 'GO' square); (6) a feature in which bonuses are awarded for completing groups of stations (e.g., color groups); and (7) a feature in which the gaming machine includes two bonus modes, each entered upon certain symbol combinations in the basic game. The first bonus game provides an award selected from a plurality of fixed values and multipliers, and the second bonus game moves a token identifier on a game board and provides an award determined by the landing station of the token identifier.

17 Claims, 21 Drawing Sheets

U.S. PATENT DOCUMENTS

| | | | | | |
|---|---|---|---|---|---|
| 4,095,795 | A | | 6/1978 | Saxton et al. | 273/143 R |
| 4,306,768 | A | | 12/1981 | Egging | 350/174 |
| 4,335,809 | A | | 6/1982 | Wain | 194/1 R |
| 4,448,419 | A | | 5/1984 | Telnaes | 273/143 R |
| 4,508,345 | A | | 4/1985 | Okada | 273/143 R |
| 4,624,459 | A | | 11/1986 | Kaufman | 273/143 R |
| 4,721,307 | A | | 1/1988 | Okada | 273/143 R |
| 4,763,256 | A | | 8/1988 | DeMar | 364/410 |
| 4,772,023 | A | | 9/1988 | Okada | 273/143 R |
| 4,805,907 | A | | 2/1989 | Hagiwara | 273/138 A |
| 4,826,169 | A | | 5/1989 | Bessho et al. | 273/143 R |
| 4,871,171 | A | | 10/1989 | Rivero | 273/138 A |
| 5,083,785 | A | | 1/1992 | Okada | 273/143 R |
| 5,169,147 | A | | 12/1992 | Hamano | 273/138 A |
| 5,205,555 | A | | 4/1993 | Hamano | 273/143 R |
| 5,259,616 | A | | 11/1993 | Bergmann | 273/138 A |
| 5,292,127 | A | | 3/1994 | Kelly et al. | 273/138 R |
| 5,332,219 | A | | 7/1994 | Marnell, II et al. | 273/138.2 |
| 5,342,047 | A | | 8/1994 | Heidel et al. | 273/85 CP |
| 5,342,049 | A | | 8/1994 | Wichinsky et al. | 271/119 R |
| 5,362,052 | A | * | 11/1994 | Kubatsch | 273/145 R |
| 5,380,008 | A | | 1/1995 | Mathis et al. | 273/143 R |
| 5,393,057 | A | | 2/1995 | Marnell, II | 273/85 CP |
| 5,401,024 | A | | 3/1995 | Simunek | 273/138 A |
| 5,415,404 | A | | 5/1995 | Joshi et al. | 273/138 A |
| 5,429,361 | A | | 7/1995 | Raven et al. | 273/138 A |
| 5,431,408 | A | | 7/1995 | Adams | 273/306 |
| 5,449,173 | A | | 9/1995 | Thomas et al. | 273/143 R |
| 5,456,465 | A | | 10/1995 | Durham | 273/138 A |
| 5,456,466 | A | | 10/1995 | Miles | 273/143 R |
| 5,542,669 | A | | 8/1996 | Charron et al. | 463/13 |
| 5,547,192 | A | | 8/1996 | Ishibashi | 463/26 |
| 5,624,119 | A | | 4/1997 | Leake | 273/269 |
| 5,647,798 | A | | 7/1997 | Falciglia | 463/19 |
| 5,664,781 | A | | 9/1997 | Feola | 273/292 |
| 5,697,843 | A | | 12/1997 | Manship et al. | 463/20 |
| 5,704,835 | A | | 1/1998 | Dietz, II | 463/20 |
| 5,722,891 | A | | 3/1998 | Inoue | 463/20 |
| 5,779,545 | A | | 7/1998 | Berg et al. | 463/22 |
| 5,788,573 | A | | 8/1998 | Baerlocher et al. | 463/16 |
| 5,803,451 | A | * | 9/1998 | Kelly et al. | 273/118 R |
| 5,823,872 | A | * | 10/1998 | Prather et al. | 463/6 |
| 5,823,874 | A | | 10/1998 | Adams | 463/17 |
| 5,848,932 | A | | 12/1998 | Adams | 463/20 |
| 5,951,397 | A | | 9/1999 | Dickinson | 463/36 |

FOREIGN PATENT DOCUMENTS

| | | | | |
|---|---|---|---|---|
| DE | 40 14 477 | | | 7/1991 |
| EP | 0 142 371 | | | 5/1985 |
| EP | 0 148 001 | | | 7/1985 |
| EP | 0 333 338 | | | 8/1989 |
| EP | 0 577 415 | | | 1/1994 |
| FR | 1 474 617 | | | 3/1967 |
| GB | 1129607 | | | 10/1968 |
| GB | 1 476 848 | | | 6/1977 |
| GB | 1 591 623 | | | 6/1981 |
| GB | 2 066 991 | | | 7/1981 |
| GB | 2 072 395 | | | 9/1981 |
| GB | 2 083 936 | | | 3/1982 |
| GB | 2 084 371 | | | 4/1982 |
| GB | 2 096 376 | | | 10/1982 |
| GB | 2 097 160 | | | 10/1982 |
| GB | 2 105 891 | | | 3/1983 |
| GB | 2 106 685 | | | 4/1983 |
| GB | 2 117 952 | | | 10/1983 |
| GB | 2 147 442 | | | 5/1985 |
| GB | 2 147 773 | | | 5/1985 |
| GB | 2 152 262 | | | 7/1985 |
| GB | 2 153 572 | | | 8/1985 |
| GB | 2 157 047 | | | 10/1985 |
| GB | 2 165 385 | | | 4/1986 |
| GB | 2 170 636 | | | 8/1986 |
| GB | 2 180 087 | | | 3/1987 |
| GB | 2 181 589 | | | 4/1987 |
| GB | 2 183 882 | | | 6/1987 |
| GB | 2 191 030 | | | 12/1987 |
| GB | 2 197 974 | | | 6/1988 |
| GB | 2 202 984 | | | 10/1988 |
| GB | 2 204 436 | | | 11/1988 |
| GB | 2 210 191 | | | 6/1989 |
| GB | 2 222 712 | | | 3/1990 |
| GB | 2 226 907 | | | 7/1990 |
| GB | 2 229 565 | | | 9/1990 |
| GB | 2 230 373 | | | 10/1990 |
| GB | 2 233 806 | | | 1/1991 |
| GB | 2 242 300 | | | 9/1991 |
| GB | 2 253 154 | | | 9/1992 |
| GB | 2 262 642 | | | 6/1993 |
| GB | 2268415 | A | * | 1/1994 |
| GB | 2 270 787 | | | 3/1994 |
| GB | 2 273 384 | | | 8/1994 |
| GB | 2 287 567 | | | 9/1995 |
| GB | 2 297 857 | | | 8/1996 |
| GB | 2 298 508 | | | 9/1996 |
| WO | WO 88/08179 | | | 10/1988 |
| WO | WO 89/12875 | | | 12/1989 |
| WO | WO 92/10818 | | | 6/1992 |
| WO | WO 94/01840 | | | 1/1994 |

OTHER PUBLICATIONS

Product Sheet for “Big Money,” WMS Gaming Inc., 1 page, date unknown.

Product Sheet for “Piggy Bankin’,” WMS Gaming Inc., 1 page, date unknown.

Product Sheet for “Pirate’s Thunder,” WMS Gaming Inc., 1 page, date unknown.

Bally Circus Advertisement for excerpt from “Lemons, Cherries and Bell Fruit Gum,” Richard M. Bueschel, 3 pages, date unknown.

Bally Bingo Advertisement for excerpt from “Lemons, Cherries and Bell Fruit Gum,” Richard M. Bueschel, 1 page, date unknown.

Las Vegas Slot Machine Advertisement for excerpt from “Lemons, Cherries and Bell Fruit Gum,” Richard M. Bueschel, 1 page, date unknown.

Website Publication for “Phantom Haus,” Williams Electronics Games, Inc., 2 pages, date unknown.

Website Publication for “Arabian Riches,” Silicon Gaming Inc., 2 pages (Jul. 17, 1998).

Website Publication for “Buccaneer Gold,” Silicon Gaming Inc., 2 pages (Jul. 17, 1998).

Website Publication for “Fort Knox,” Silicon Gaming Inc., 2 pages (Jul. 17, 1998).

Website Publication for “Lady of Fortune,” Silicon Gaming Inc., 2 pages (Jul. 17, 1998).

Website Publication for “Riddle of the Sphinx,” Silicon Gaming Inc., 2 pages (Jul. 17, 1998).

Product Sheet for “Kaleidoscope,” Williams Electronics Games, Inc., 3 pages, date unknown.

Product Sheet for “Double Wild & Loose,” Williams Electronics Games, Inc., 3 pages, date unknown.

Product Sheet for “Wild Cherry (120A),” International Game Technology, 2 pages (Nov. 7, 1994).

Product Sheet for “Double Wild Cherry (195A),” International Game Technology, 3 pages (Nov. 7, 1994).

Chapters 10, 11 & 12, excerpts from “Lemons, Cherries and Bell-Fruit-Gum,” Richard M. Bueschel, 71 pages (1995).

Advertisement for “Club Vegas,” Barcrest, 1 page, date unknown.

Advertisement for "Viva Club Vegas!," 1 page, date unknown.
Advertisement for "Monopoly: Maygay There for the Taking," 2 pages, date unknown.
Advertisement for "The Big Breakfast," Channel Four Television Corporation, 2 pages (1993).
Advertisement for "Midas Touch," 2 pages, date unknown.
Advertisement for "Acropolis," Automatic (Fruit) Designs, Ltd., 2 pages, date unknown.
Advertisement for "Adders & Ladders," Barcrest, 2 pages, date unknown.
Advertisement for "The Wild West," Bell-Fruit Manufacturing, 2 pages, date unknown.
Advertisement for "Premier Club Manager," Bell-Fruit Manufacturing, 2 pages, date unknown.
Advertisement for "Fortune Wheel," Project Customer Services, 2 pages, date unknown.
Advertisement for "Road Hog," Barcrest, 2 pages, date unknown.
Advertisement for "Viva! Six! Las Vegas," Barcrest, 2 pages, date unknown.
Advertisement for "Golden Circle," Delta Automaten, 1 page, date unknown.
Advertisement for "Club Double," M-D-M Coin Sales Ltd., 2 pages, date unknown.
Advertisement for "Treasure Island," American Alpha, Inc., 1 page, date unknown.
Advertisement for "Bonus Card," Andries Robert Automatic s.p.r.l., 1 page, date unknown.
Advertisement for "Super Square," Maygay Machines Ltd., 2 pages, date unknown.
Advertisement for "Lucky Bank," 1 page, date unknown.
Advertisement for "Happy Clown," Andries Robert Automatic s.p.r.l., 1 page, date unknown.
Advertisement for "Jackpot Stampede," WMS Gaming Inc., 2 pages, date unknown.
Brochure for "Perfect Universal Slot Machines," Universal Co., Ltd., 16 pages, date unknown.
Advertisement for "Club Make a Million," Bell-Fruit Manufacturing Co., Ltd., 2 pages, date unknown.
Advertisement for "Instant Jackpots," Bell-Fruit Manufacturing Co., Ltd., 2 pages, date unknown.
Cover page, "Enter Disposable Gaming," *Euroslot. The International Coin-Operated Machine Journal*, 1 page (Apr. 1994).
Advertisement for Barcrest Limited, 1 page, date unknown.
Cover page for "Covers Your World," *Euroslot. The Currency of the Coin Machine Industry*, 1 page, date unknown.
Article titled "Bangkok on the Brink," *Euroslot. The International Coin-Operated Machine Journal*, 2 pages (Nov. 1993).
Article titled "Scandinavia on the Brink of the EU melting pot," *Euroslot. The International Coin-Operated Machine Journal*, 2 pages (Aug. 1994).
Advertisement for "Only Fools and Horses," Bell-Fruit Manufacturing Co., Ltd., 2 pages, date unknown.
Advertisement for "Main Attraction," Bell-Fruit Manufacturing Co., Ltd., 2 pages, date unknown.
Brochure for "World Players," Barcrest, 6 pages, date unknown.
Brochure for "JPM Presents MONOPOLY Deluxe," JPM International Ltd., 5 pages, date unknown.
Brochure for "The 50th Show," Ate International, 2 pages (Jan. 1994).
Advertisement for "Colossus," AFD, 1 page, date unknown.
Advertisement for "Wheel of Fortune," Project Creating Entertainment, 2 pages, date unknown.
Advertisement for "Lucky Horseshoes," JPM Automatic Machines Ltd., 2 pages, date unknown.
Advertisement for "Lucky Jackpots," JPM Automatic Machines Ltd., 2 pages, date unknown.
Advertisement for "MONOPOLY," JPM Automatic Machines Ltd., 2 pages, date unknown.
Operations Manual For "Phantom Haus," Williams Electronics Games, Inc., 69 pages (Jul. 1996).
Phantom Hau Operations Manual, Williams Electronic Games, Inc., Jul. 1996.

* cited by examiner

GAMING MACHINES WITH BOARD GAME THEME

REFERENCE TO RELATED APPLICATIONS

This application is a continuation of U.S. patent application Ser. No. 10/350,606 filed Jan. 24, 2003, which is a continuation of U.S. patent application Ser. No. 10/092,817, filed Mar. 7, 2002, and issued as U.S. Pat. No. 6,520,855 on Feb. 18, 2003, which is a divisional of U.S. patent application Ser. No. 09/940,813, filed Aug. 27, 2001, and issued as U.S. Pat. No. 6,508,707 on Jan. 21, 2003, which is a divisional of U.S. patent application Ser. No. 09/274,793, filed Mar. 23, 1999, and issued as U.S. Pat. No. 6,315,660 on Nov. 13, 2001, which claims the benefit of priority of U.S. Provisional Patent Application No. 60/079,143 filed Mar. 24, 1998.

FIELD OF THE INVENTION

The present invention relates generally to gaming machines and, more particularly, to a gaming machine having various play features relating to a board game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available, because such machines attract frequent play and hence increase profitability to the operator.

One concept which has been successfully employed to enhance the entertainment value of a game is the concept of a “secondary” or “bonus” game which may be played in conjunction with a “basic” game. The bonus game may comprise any type of game, either similar to or completely different from the basic game, which is entered upon the occurrence of a selected event or outcome of the basic game. Generally, bonus games provide a greater expectation of winning than the basic game and may also be accompanied with more attractive or unusual video displays and/or audio. Because the bonus game concept offers tremendous advantages in player appeal and excitement relative to other known games, and because such games are attractive to both players and operators, there is a continuing need to develop gaming machines with new types of bonus games to satisfy the demands of players and operators. The present invention is directed to satisfying this need.

SUMMARY OF THE INVENTION

In accordance with one aspect of the present invention, there is provided a gaming machine with a feature allowing the player to select a game token. The gaming machine comprises a processor, a selection element and a display. The processor is operable to execute a game program defining a plurality of stations about a game board traversable by a game token. The selection element is operable to select, in response to player input, a game token for illustrating movement between the stations, and the display is operable to display, under control of the processor, the selected game token at one or more stations on the game board determined by execution of the game program.

In accordance with another aspect of the present invention, there is provided a feature allowing the player to predict and wager on landing position(s) of the token identifier. The gaming machine comprises a processor operable to execute a game program defining a plurality of stations about a game board traversable by a token identifier. The feature comprises selecting, in response to player input, a predicted position of the token identifier to be determined by execution of the game program, the predicted position corresponding to one of the stations on the game board. Then, the game program is executed under processor control to determine a true position of the token identifier. The processor compares the predicted position of the token identifier to the true position of the token identifier, and a payoff is awarded to the player if the predicted position corresponds to the true position. In one embodiment, a bonus payoff is made if the predicted position was reached in response to a target movement value.

In accordance with still another aspect of the present invention, there is provided a gaming machine with a feature allowing the player to obtain deferred-execution instruction (s) which are exercisable by the processor to override later-issued instruction(s) otherwise to be executed by the processor. The gaming machine includes a processor operable in a basic mode and a bonus mode, respectively, to select basic game and bonus game outcomes. A display is provided for displaying indicia of the selected outcomes. The processor issues game control instructions associated with the respective indicia. The game control instructions include nominal executable instructions adapted for execution by the processor upon display of the respective indicia and at least one deferred executable instruction adapted for deferred execution by the processor. The deferred execution instruction might occur in the basic game and be exercised in the bonus game. In one embodiment, the game control instructions include an end-bonus instruction (e.g., GO TO JAIL) which nominally cause the processor to end the bonus game, and the deferred executions include an override command (e.g., GET OUT OF JAIL, FREE) executable to override the end-bonus instruction.

In accordance with yet another aspect of the present invention, there is provided a feature in which movements of the token identifier are determined according to movement tables corresponding to the various stations of the game board. The gaming machine includes a processor and a game memory. The processor is operable to execute a game program defining a plurality of stations about a game board traversable by a token identifier. Movements of the token identifier about the game board are determined according to movement tables stored in the game memory. Each of the movement tables correspond to one of the stations of the game board and define a set of possible movement outcomes from that station. After identifying the position (station) of the token identifier on the game board, the processor consults the movement table corresponding to that position to select a movement outcome. Then, the processor moves the token a number of steps on the game board corresponding to the selected movement outcome.

In accordance with still yet another aspect of the present invention, there is provided a feature in which escalating bonuses are awarded for reaching a designated bonus square on the game board. The gaming machine includes a processor operable to execute a game program defining a plurality of stations about a game board traversable by a token identifier, one of the stations being designated as a bonus station. As the token identifier is advanced along the game board, payoff(s) are made to the player when the token identifier reaches the bonus station, the payoffs escalating in value each successive time the token identifier reaches the bonus station.

In accordance with a still further aspect of the present invention, there is provided a feature in which bonuses are awarded for completing groups of stations (e.g., color groups) on the game board. The gaming machine includes a processor operable to execute a game program defining a plurality of stations about a game board traversable by a token identifier, the plurality of stations having at least one discernible subset defining a station group (e.g., a color group). As the token identifier is advanced along the game board, the processor identifies respective landing stations occupied by the token identifier. If the landing station is a member of a station group, the processor designates the landing station as a "completed" station. Then, the processor evaluates the station status of the other stations in the group. If each of the other stations in the group are also completed, the processor designates the group as a completed group and provides a reward to the player, which might comprise an extra "spin" or play of the game, or might increase the award otherwise associated with the station.

In accordance with a still yet further aspect of the present invention, there is provided a gaming machine with a processor operable in a basic mode and two bonus modes. In the basic mode, the processor is operable to display a basic game outcome defining a symbol group. If the symbol group includes a first bonus combination, the processor enters the first bonus mode and, if the symbol group includes a second bonus combination, the processor enters the second bonus mode. In the first bonus mode, the processor sets up the first bonus game by defining a plurality of first bonus selection elements including fixed values and multipliers. Then, the processor operates to select one of the selection elements and the player is awarded a credit based on the value of the selected selection element. In the second bonus mode, the processor operates to define a plurality of stations about a game board traversable by a token identifier. Then, the processor executes a movement of the token identifier to determine a landing station, and the player is awarded a credit based on the value of the landing station.

BRIEF DESCRIPTION OF THE DRAWINGS

The foregoing and other advantages of the invention will become apparent upon reading the following detailed description and upon reference to the drawings in which.

Figure 1:
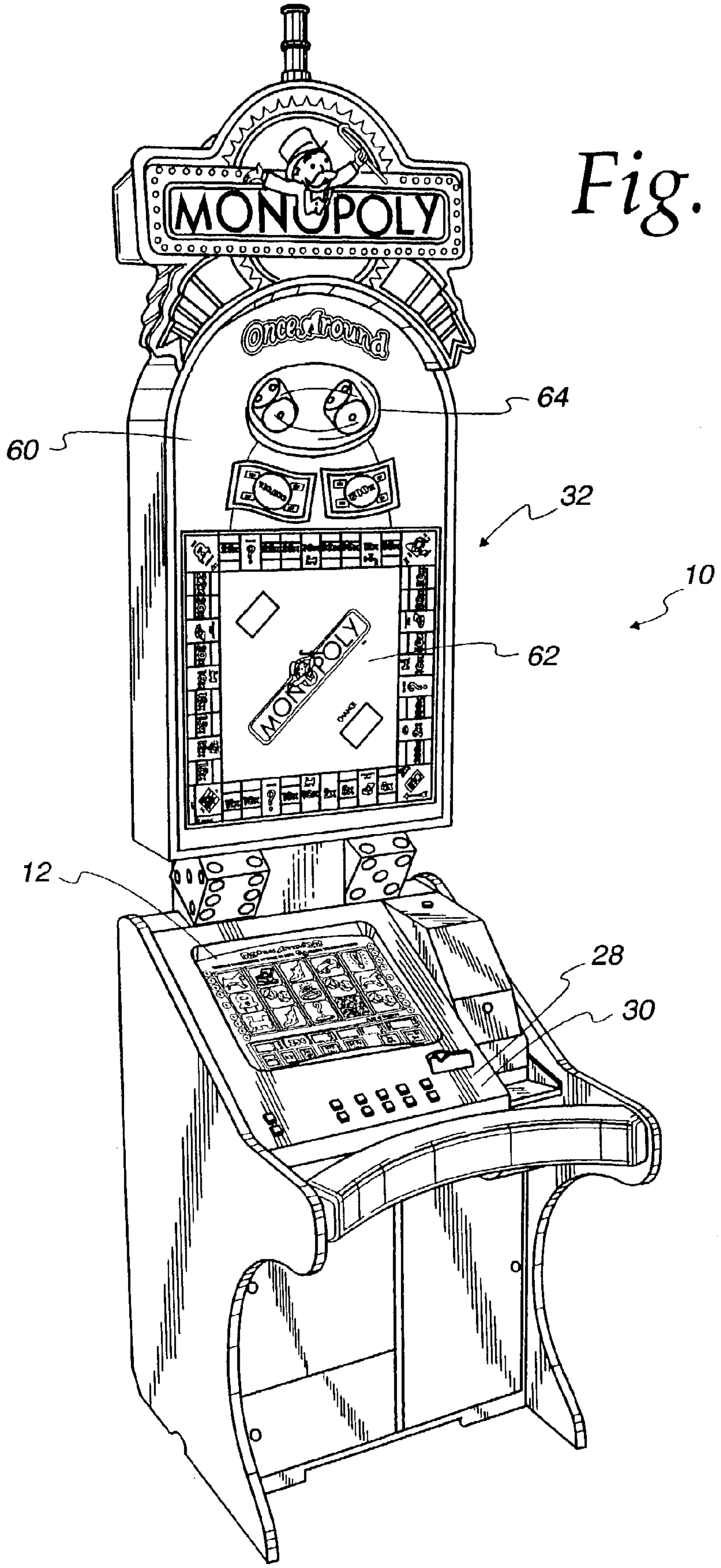
FIG. 1 is a perspective view of a video gaming machine with a board game theme according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a gaming machine 10 with a board game theme. In one embodiment, the gaming machine 10 is operable to play a game entitled MONOPOLY ONCE AROUND™, based on the popular MONOPOLY™ board game. MONOPOLY™ is a registered trademark owned by and used with permission by Hasbro, Inc. and Hasbro International, Inc., Pawtucket, R.I. Nevertheless, it will be appreciated that the gaming machine 10 may be implemented with any of several other board game themes other than MONOPOLY™.

The gaming machine 10 includes a video display 12 and a top box display 32. The video display 12 may comprise a dot matrix, CRT, LED, LCD, electro-luminescent display or generally any type of video display known in the art. The top box display 32 has a facing surface 60 comprising a partially translucent material such as glass, plastic, Plexiglas or the like which includes an adaptation of a game board 62 (e.g., MONOPOLY) displayed thereon. The game board 62 is backlit by a number of lights 66 (not visible in FIG. 1) in the top box display 32. A pair of mechanical dice 64 are displayed near the top of the top box display 32.

Figure 2:
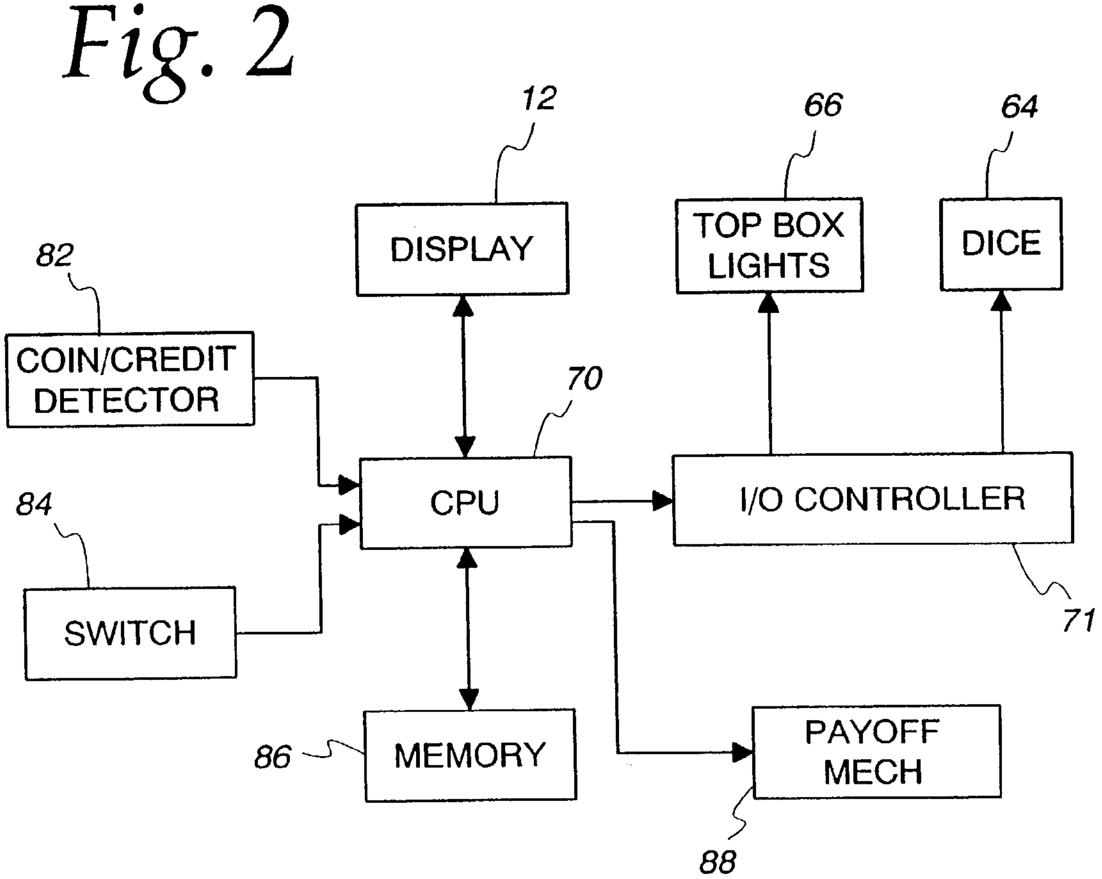
FIG. 2 is a block diagram of the gaming machine of FIG. 1.

FIG. 2 is a block diagram of a control system suitable for operating the slot machine 10. Coin/credit detector 82 signals a CPU 70 when a player has inserted a number of coins or played a number of credits. Then, after the player has activated a switch 84 (e.g., by pulling a lever or pushing a button), the CPU 70 operates to display reels 14, 16, 18, 20 and 22 on the video screen 12. Then, the player activates one or more selected paylines 72–80 and presses the "Spin Reels" button 36 or "Max Bet Spin" button 37 to "spin" the reels, as will be described in greater detail in relation to FIG. 4. The CPU 70 randomly selects a game outcome and causes the video display 12 to display indicia (e.g., symbols on reels 14, 16, 18, 20 and 22) corresponding to the pre-selected game outcome. In one embodiment, the symbols displayed on the reels define the basic game outcome.

A system memory 86 stores control software, operational instructions and data associated with the gaming machine 10. In one embodiment, the memory 86 comprises a separate read-only memory (ROM) and battery-backed random-access memory (RAM). However, it will be appreciated that the memory 86 may be implemented on any of several alternative types of memory structures or may be implemented on a single memory structure. A payoff mechanism 88 is operable in response to instructions from the CPU 70 to award a payoff of coins or credits to the player in response to certain winning combinations stored in memory 86. As will be described in detail hereinafter, the payoff amounts corresponding to certain combinations is predetermined according to a pay table stored in system memory 86. A separate I/O controller 71 coupled to the CPU 70 operates the mechanical dice 64 and top box lights 66.

The gaming machine 10 is operable to play a "basic" game and a secondary or "bonus" game. The basic game is implemented on the video display 12 on five video simulated spinning reels, 14, 16, 18, 20 and 22 (hereinafter "reels") with nine paylines 72–80, as best observed in FIG. 4. Generally, game play is initiated by inserting a number of coins or playing a number of credits, causing the CPU 70 (FIG. 2) to activate a number of paylines corresponding to the number of coins or credits played. After activation of the paylines, the reels 14, 16, 18, 20 and 22 are set in motion by either pulling a lever (not shown), pressing a push button, or touching a touch screen "key" on the video display 12.

Figure 4:
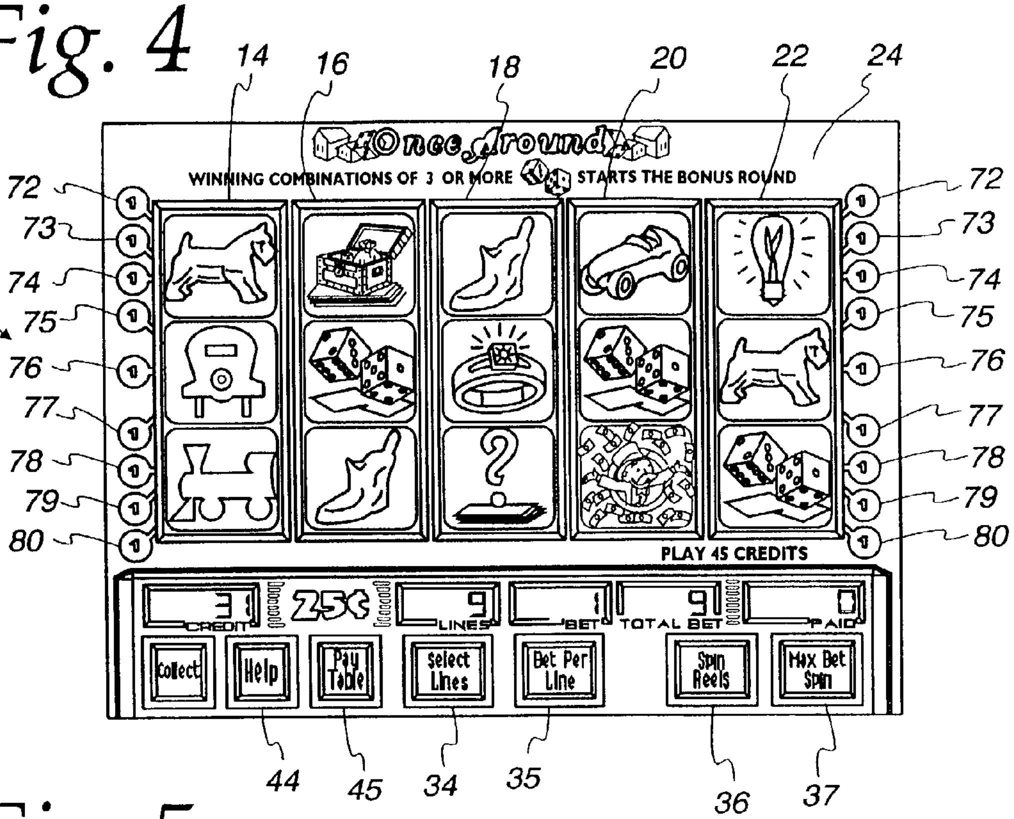
FIG. 4 is an illustration of a five-reel, nine-line video gaming machine basic game which may be implemented on the gaming machine of FIG. 1.

In the embodiment of FIG. 4, each of the paylines 72–80 extend through one symbol on each of the five reels 14, 16, 18, 20 and 22. Payline 72 starts at the upper left symbol (e.g., "DOG") on reel 14, extends through the center symbol (e.g., "DICE") on reel 16, the lower symbol (e.g., "CHANCE") on reel 18, the center symbol (e.g., "DICE") on reel 20 and terminates at the top symbol (e.g., "ELECTRIC CO.," hereinafter "LIGHT") on reel 22. Payline 73 starts at the upper left symbol (e.g., "DOG") on reel 14, extends through the center symbol (e.g., "DICE") on reel 16, the upper symbol (e.g., "SHOE") on reel 18, the center symbol (e.g., "DICE") on reel 20 and terminates at the top symbol (e.g., "LIGHT") on reel 22. Payline 74 extends through the top symbol on each reel (e.g., "DOG" on reel 14, "COMMUNITY CHEST," hereinafter "CHEST" on reel 16, "SHOE" on reel 18, "CAR" on reel 20 and "LIGHT" on reel 22.) Payline 75 starts at the center symbol (e.g., "FREE PARKING," hereinafter "PARK") on reel 14, extends through the lower symbol (e.g., "SHOE") on reel 16, the center symbol (e.g., "RING") on reel 18, the lower symbol (e.g., "RICH UNCLE PENNYBAGS," hereinafter "PENNY") on reel 20 and terminates at the center symbol (e.g., "DOG") on reel 22. Payline 76 extends through the center symbol on each reel (e.g., "PARK" on reel 14, "DICE" on reel 16, "RING" on reel 18, "DICE" on reel 20 and "DOG" on reel 22.) Payline 77 starts at the center symbol (e.g., "PARK") on reel 14, extends through the upper symbol (e.g., "CHEST") on reel 16, the center symbol (e.g., "RING") on reel 18, the upper symbol (e.g., "CAR") on reel 20 and terminates at the center symbol (e.g., "DOG") on reel 22. Payline 78 extends through the lower symbol on each reel (e.g., "TRAIN" on reel 14, "SHOE" on reel 16, "CHANCE" on reel 18, "PENNY" on reel 20 and "DICE" on reel 22.) Payline 79 starts at the lower symbol (e.g., "TRAIN") on reel 14, extends through the center symbol (e.g., "DICE") on reel 16, the lower symbol (e.g., "CHANCE") on reel 18, the center symbol (e.g., "DICE") on reel 20 and terminates at the lower symbol (e.g., "DICE") on reel 22. Payline 80 starts at the lower symbol (e.g., "TRAIN") on reel 14, extends through the center symbol (e.g., "DICE") on reel 16, the upper symbol (e.g., "SHOE") on reel 18, the center symbol (e.g., "DICE") on reel 20 and terminates at the lower symbol (e.g., "DICE") on reel 22.

In one embodiment, the player selects the number of paylines (between one and nine) to play by pressing one of the five buttons in the top row 28 or by using the "Select Lines" key 34 on the video display 12. The player then chooses one of the five buttons in the bottom row 30 that correspond to the number of coins or credits to bet on each of the nine paylines. Selecting one of the buttons in the bottom row 30 sets the five video reels, 14, 16, 18, 20 and 22 in "motion". As an alternative, the player may touch the "Bet Per Line" key 35 on the video display 12 until the desired bet is displayed and then touch the "Spin Reels" key 36 on the video display 12 to begin the game. As another alternative, if the player wishes to bet the maximum amount of lines and the maximum bet per line, the player may touch the "Max Bet Spin" key 37 on the video display 12 to begin the game. In one embodiment, the game can be set for a maximum bet of 5 or 10 credits on each payline for a maximum total bet of 45 or 90 credits per game. The CPU 70 assigns an equal amount of credits bet for each payline and then spins all five reels 14, 16, 18, 20 and 22.

The CPU 70 uses a random number generator (not shown) to select a game outcome (e.g., "basic" game outcome) corresponding to a particular set of reel "stop positions". The CPU 70 then causes each of the video reels 14, 16, 18, 20 and 22 to stop at a preselected stop position. Video symbols (see FIG. 4) are displayed on the reels 14, 16, 18, 20 and 22 to graphically illustrate the reel stop position and indicate whether the stop position of the reels represents a winning game outcome. Winning "basic" game outcomes (e.g., symbol combinations resulting in payment of coins or credits) are identifiable by a pay table (see Table A-1). In one embodiment, the pay table is affixed to the machine 10 and/or displayed by the video display 12 in response to a command by the player (e.g., by pressing the "PAY TABLE" button 45). The pay table enables the player to view the winning combinations and their associated payoff amounts. If the displayed symbols stop in a winning combination, the game awards the player the award corresponding to the award in the pay table for that combination multiplied by the amount of credits bet on the winning payline.

TABLE A-1

MONOPOLY - ONCE AROUND BASIC GAME

| TYPE | 9 LINE 5 REEL WIN COMBINATIONS | | | | R #1 | R #2 | R #3 | R #4 | R #5 | # OF HITS | PAY | Max Bet TOTAL | 9/18/45/90 PROB | EV |
|---|---|---|---|---|---|---|---|---|---|---|---|---|---|---|
| PENNYBAGS | | | | | 1 | 2 | 2 | 2 | 4 | | | | | |
| penny | penny | penny | penny | penny | 1 | 2 | 2 | 2 | 4 | 32 | 20000 | 640000 | 0.000000 | 0.25% |
| penny | penny | penny | penny | | 1 | 2 | 2 | 2 | 44 | 352 | 1000 | 352000 | 0.000001 | 0.145 |
| penny | penny | penny | | | 1 | 2 | 2 | 46 | 48 | 8552 | 200 | 1710400 | 0.000034 | 0.67% |
| penny | penny | | | | 1 | 2 | 40 | 48 | 48 | 178080 | 20 | 3561600 | 0.000699 | 1.40% |
| DICE | | | | | | | | | | | | | | |
| dice | dice | dice | dice | dice | 4 | 4 | 7 | 6 | 7 | 4704 | 250 | 1176000 | 0.000018 | 0.46% |
| dice | dice | dice | dice | | 4 | 4 | 7 | 6 | 41 | 27552 | 50 | 1377600 | 0.000108 | 0.54% |
| dice | dice | dice | | | 4 | 4 | 7 | 42 | 48 | 225792 | 10 | 2257920 | 0.000886 | 0.89% |
| dice | dice | | | | 4 | 4 | 41 | 48 | 48 | 1511424 | 5 | 7557120 | 0.005932 | 2.97% |
| CAR | | | | | 4 | 4 | 4 | 4 | 6 | | | | | |
| car | car | car | car | car | 4 | 4 | 4 | 4 | 6 | 1536 | 600 | 921600 | 0.000006 | 0.36% |
| car | car | car | car | | 4 | 4 | 4 | 4 | 42 | 10752 | 125 | 1344000 | 0.000042 | 0.53% |
| car | car | car | | | 4 | 4 | 4 | 44 | 48 | 125952 | 50 | 6297600 | 0.000494 | 2.47% |
| car | car | | | | 4 | 4 | 36 | 48 | 48 | 1327104 | 5 | 6635520 | 0.005208 | 2.60% |
| DOG | | | | | 4 | 4 | 4 | 4 | 6 | | | | | |
| dog | dog | dog | dog | dog | 4 | 4 | 4 | 4 | 6 | 1536 | 500 | 768000 | 0.000006 | 0.30% |
| dog | dog | dog | dog | | 4 | 4 | 4 | 4 | 42 | 10752 | 100 | 1075200 | 0.000042 | 0.42% |
| dog | dog | dog | | | 4 | 4 | 4 | 44 | 48 | 125952 | 30 | 3778560 | 0.000494 | 1.48% |
| dog | dog | | | | 4 | 4 | 36 | 48 | 48 | 1327104 | 3 | 3981312 | 0.005208 | 1.56% |
| SHOE | | | | | 4 | 4 | 4 | 4 | 6 | | | | | |
| shoe | shoe | shoe | shoe | shoe | 4 | 4 | 4 | 4 | 6 | 1536 | 500 | 768000 | 0.000006 | 0.30% |
| shoe | shoe | shoe | shoe | | 4 | 4 | 4 | 4 | 42 | 10752 | 100 | 1075200 | 0.000042 | 0.42% |
| shoe | shoe | shoe | | | 4 | 4 | 4 | 44 | 48 | 125952 | 30 | 3778560 | 0.000494 | 1.48% |
| shoe | shoe | | | | 4 | 4 | 36 | 48 | 48 | 1327104 | 3 | 3981312 | 0.005208 | 1.56% |
| ANY TOKEN | | | | | | | | | | | | | | |
| anyt | anyt | anyt | anyt | anyt | 12 | 12 | 12 | 12 | 18 | 359424 | 50 | 17971200 | 0.001411 | 7.05% |
| anyt | anyt | anyt | anyt | | 12 | 12 | 12 | 12 | 30 | 552960 | 20 | 11059200 | 0.002170 | 4.34% |
| anyt | anyt | anyt | | | 12 | 12 | 12 | 36 | 48 | 2654208 | 5 | 3981312 | 0.010417 | 5.21% |
| RING | | | | | 6 | 4 | 6 | 4 | 1 | | | | | |
| ring | ring | ring | ring | ring | 7 | 6 | 8 | 6 | 5 | 10040 | 300 | 3012000 | 0.000039 | 1.18% |
| ring | ring | ring | ring | | 7 | 6 | 8 | 6 | 43 | 85656 | 70 | 5995920 | 0.000336 | 2.35% |
| ring | ring | ring | | | 7 | 6 | 8 | 42 | 48 | 669312 | 20 | 13386240 | 0.002627 | 5.25% |
| TRAIN | | | | | 6 | 6 | 5 | 5 | 2 | | | | | |
| train | train | train | train | train | 7 | 8 | 7 | 7 | 6 | 16416 | 250 | 4104000 | 0.000064 | 1.61% |
| train | train | train | train | | 7 | 8 | 7 | 7 | 42 | 114072 | 60 | 6844320 | 0.000448 | 2.69% |
| train | train | train | | | 7 | 8 | 7 | 41 | 48 | 743904 | 15 | 11158560 | 0.002920 | 4.38% |
| FREE PARKING | | | | | 7 | 8 | 5 | 4 | 1 | | | | | |
| park | park | park | park | park | 8 | 10 | 7 | 6 | 5 | 16760 | 200 | 3352000 | 0.000066 | 1.32% |
| park | park | park | park | | 8 | 10 | 7 | 6 | 43 | 143448 | 50 | 7172400 | 0.000563 | 2.81% |
| park | park | park | | | 8 | 10 | 7 | 42 | 48 | 1100736 | 10 | 11007360 | 0.004015 | 4.32% |
| ELECTRIC CO. | | | | | 8 | 8 | 9 | 11 | 11 | | | | | |
| light | light | light | light | light | 8 | 8 | 9 | 11 | 11 | 69696 | 100 | 6969600 | 0.000274 | 2.74% |
| light | light | light | light | | 8 | 8 | 9 | 11 | 37 | 234432 | 40 | 9377280 | 0.000920 | 3.68% |
| light | light | light | | | 8 | 8 | 9 | 37 | 48 | 1022976 | 7 | 7160832 | 0.004015 | 2.81% |
| | | | | | | | | | | | | | | 73.05% |
| SCATTERED PAYS | | | | | | | | | | | | | | |
| COMMUNITY CHEST | | | | | 2 | 2 | 1 | 2 | 2 | | | | | |
| chest | chest | chest | chest | chest | 6 | 6 | 3 | 6 | 6 | 3888 | 200 | 777600 | 0.000015 | 0.03% |
| chest | chest | chest | chest | | 6 | 6 | 3 | 6 | 42 | 27216 | 20 | 544320 | 0.000107 | 0.02% |
| | chest | chest | chest | chest | 42 | 6 | 3 | 6 | 6 | 27216 | 20 | 544320 | 0.000107 | 0.02% |
| | | chest | chest | chest | 48 | 42 | 3 | 6 | 6 | 217728 | 7 | 1524096 | 0.000854 | 0.07% |
| | chest | chest | chest | | 42 | 6 | 3 | 6 | 42 | 190512 | 7 | 1333584 | 0.000748 | 0.06% |
| chest | chest | chest | | | 6 | 6 | 3 | 42 | 48 | 217728 | 7 | 1524096 | 0.000854 | 0.07% |
| CHANCE | | | | | 2 | 2 | 1 | 2 | 2 | | | | | |
| chance | chance | chance | chance | chance | 6 | 6 | 3 | 6 | 6 | 3888 | 200 | 777600 | 0.000015 | 0.03% |
| chance | chance | chance | chance | | 6 | 6 | 3 | 6 | 42 | 27216 | 20 | 544320 | 0.000107 | 0.02% |
| | chance | chance | chance | chance | 42 | 6 | 3 | 6 | 6 | 27216 | 20 | 544320 | 0.000107 | 0.02% |
| | | chance | chance | chance | 48 | 42 | 3 | 6 | 6 | 217728 | 7 | 1524096 | 0.000854 | 0.07% |
| | chance | chance | chance | | 42 | 6 | 3 | 6 | 42 | 190512 | 7 | 1333584 | 0.000748 | 0.06% |

TABLE A-1-continued

MONOPOLY - ONCE AROUND BASIC GAME

| TYPE | 9 LINE 5 REEL WIN COMBINATIONS | | R #1 | R #2 | R #3 | R #4 | R #5 | # OF HITS | PAY | Max Bet TOTAL | 9/18/45/90 PROB | EV |
|---|---|---|---|---|---|---|---|---|---|---|---|---|
| chance | chance | chance | 6 | 6 | 3 | 42 | 48 | 217728 | 7 | 1524096 | 0.000854 | 0.07% |
| | | | | | | | | | | | | 0.54% |
| TOTAL | | | 48 | 48 | 48 | 48 | 48 | 15515136 | | 198635008 | | 73.60% |

Table A-1 is a pay table identifying various winning combinations of symbols in the MONOPOLY ONCE AROUND™ basic game and their mathematical probabilities and expected values. The various symbols used in the MONOPOLY ONCE AROUND™ basic game include: "RICH UNCLE PENNYBAGS" ("PENNY"), "DICE," "CAR," "DOG," "SHOE," "RING," "TRAIN," "PARK," "LIGHT," "CHEST" and "CHANCE." The "WIN COMBINATIONS" column identifies the various win combinations which may occur by symbols stopping on an active payline. Generally, winning combinations require that at least two of five corresponding symbols be displayed, left to right, starting on reel 14 (designated "R #1" in Table A-1) on an active payline. For example, two "PENNY" symbols displayed on adjacent reels 14 ("R #1") and 16 would be a winning combination. The "ANY TOKEN" combination is satisfied by any combination of three or more "CAR," "DOG" and "SHOE" symbols stopping on an active payline, left to right, starting on reel 14 ("R #1"). For example, a "DOG" symbol on reel 14 ("R #1"), followed by a "SHOE" symbol on reel 16 ("R #2") and another "DOG" symbol on reel 18 ("R #3") would be a winning "ANY TOKEN" combination.

In one embodiment, the "PENNY" symbol acts as a wildcard for the "RING," "TRAIN," and "PARK" symbol combinations. Thus, for example, the combination of "RING," "PENNY" and "RING" on adjacent reels 14 ("R #1"), 16 ("R #2") and 18 ("R #3") is a winning combination.

The "SCATTERED PAYS" column identifies the various win combinations which may occur by symbols which are not necessarily aligned with an active payline. A winning combination of the scatter-pay type occurs when scatter-pay symbols are displayed, in any position, on the appropriate reels. In the MONOPOLY ONCE AROUND™ basic game, the "CHEST" and "CHANCE" symbols are scatter-pay symbols and winning combinations occur when three or more of these symbols are displayed on consecutive and adjacent interchangeable reels. For example, three "CHEST" symbols displayed on adjacent reels 16 ("R #2"), 18 ("R #3") and 20 ("R #4"), is a winning scatter-pay combination in the MONOPOLY ONCE AROUND™ game.

The "# OF HITS" column of Table A-1 identifies, for each winning combination, the product of the number of symbols on each reel supporting the combination. For example, consider the combination of five "PENNY" symbols. This combination is the highest value combination in the MONOPOLY ONCE AROUND™ basic game because there are relatively few "PENNY" symbols on each reel and, consequently, the probability of hitting a "PENNY" symbol on each reel is very low. Specifically, in the embodiment of Table A-1, there is one "PENNY" symbol on reel 14 ("R #1"), two "PENNY" symbols on reel 16 ("R #2"), two "PENNY" symbols on reel 18 ("R #3"), two "PENNY" symbols on reel 20 ("R #4") and four "PENNY" symbols on reel 22 ("R #5"). Thus, the "# OF HITS" for the combination of five consecutive "PENNY" symbols is 32 (i.e., 1×2×2×2×4).

The "PAY" column of Table A-1 identifies the amount of coin(s) or credit(s) awarded for the various winning combinations in the basic game, per unit wagered. Thus, for example, the "PENNY," "PENNY" combination appearing on reels 14, 16 ("R #1, R #2") will pay 20 coins or credits with one coin played; that same combination will pay 100 coins or credits with five coins played.

The "TOTAL" column of Table A-1 lists, for each winning combination, the product of the "# OF HITS" value and the "PAY" value. The five "PENNY" combination, for example, having 32 hits each paying 20,000 coins or credits, has a "TOTAL" value of 640,000.

In one embodiment, each of the reels 14, 16, 18, 20 and 22 have 48 symbol positions, thus the odds of hitting each unique combination relative to a single active payline is one in about 254 million (i.e., $1 \div (48)^5$). The "PROB" column identifies the probability of hitting the various winning combinations in a single spin. For example, there are only 32 symbol combinations out of about 250 million symbol combinations that will result in the combination of five consecutive "PENNY" symbols. Thus, the probability of hitting that combination is 32÷254 million or about $1.25 \times 10^{-7}$.

The "EV" column of Table A-1 identifies the expected value of the various winning combinations, which is computed as the product of the "PAY" and "PROB" values. Thus, for the five "PENNY" combination, the expected value is 0.0025 ($20{,}000 \times 1.25 \times 10^{-7}$). The payout rate of the basic game, identified at the bottom of the "EV" column, is computed by summing each of the expected values. In the embodiment of Table A-1, the payout rate of the basic game is 73.60%

The Bonus Game

The bonus game is triggered when a special "start-bonus" outcome occurs in the basic game. In the MONOPOLY ONCE AROUND™ game, a winning combination of three or more "DICE" symbols in the basic game represents a "start-bonus" outcome which causes the CPU 70 to execute a game control instruction which enters the bonus game. In one embodiment, the bonus game has a board-game (e.g., MONOPOLY) theme and is implemented on the top box game board 62 and video display 12. The board game defines a plurality of stations or squares about a game board traversable by a game token, or token "identifier" indicating the position of a token, or player. For example, a token "identifier" comprises in one embodiment an illuminated station of the top box game board 62 indicating the position of a token, or player otherwise not displayed on the top box game board 62. Hereinafter, references to displaying the position of a token, or player, shall be understood to mean the display of either an actual game token or a token identifier on a game board or portion thereof.

Figure 5:
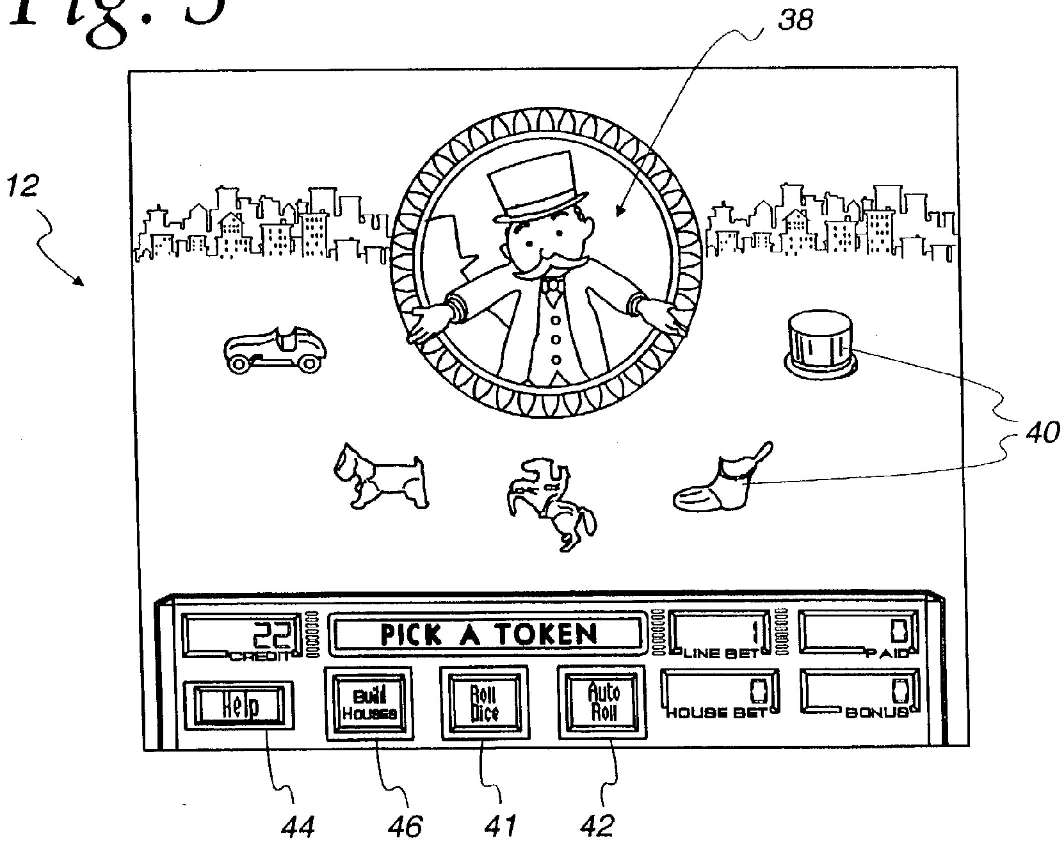
FIG. 5 is an illustration of a "Pick Token" screen which appears on the video display of the gaming machine of FIG. 1 according to one embodiment of the present invention.

Upon initially entering the bonus game, the CPU 70 operates to replace the display of reels 14, 16, 18, 20, 22 on video display 12 with a token selection screen (FIG. 5) offering a selection of board game tokens 40. In the MONOPOLY ONCE AROUND™ game, the token selection screen displays an animated Rich Uncle Pennybags symbol 38 above a selection of MONOPOLY tokens 40 (e.g., "CAR," "DOG," "HORSE," "SHOE" and "HAT"), and the player is prompted to select one of the game tokens 40. In one embodiment, the video display 12 comprises a touch-screen display and the selection of a game token 40 is accomplished by touching the desired token on the display 12. It will be appreciated, however, that any of several known player control devices may be used to implement the selection of a token 40. In another embodiment, the player scrolls through the tokens 40 and selects a particular token by depressing a designated "select" button on the gaming machine 10 when the desired token 40 is highlighted. Scrolling through the tokens 40 prior to the selection of the desired token may also be accomplished automatically according to the game program or may be controlled by the player pressing various buttons. Once the player selects a token 40, the CPU 70 operates to display a portion of the game board on the video display 12 with the selected token on a starting station of the game board. The CPU 70 also signals I/O controller 71 to illuminate the starting station on the top box game board 62. For example, in the MONOPOLY ONCE AROUND™ game, the starting station is the 'GO' square. The CPU 70 operates to display the selected MONOPOLY token on the GO square of a scrolling video MONOPOLY board on the video display 12, and also signals I/O controller 71 to illuminate the GO square on the top box MONOPOLY board 62.

Next, in one embodiment, the CPU 70 selects an integer movement value defining a number of stations or steps which the token is to be moved from the GO square. In one embodiment, the integer movement value is selected from a plurality of movement values corresponding to the sum of two dice. In this case, the selection of the movement value might comprise selecting two integer values, each corresponding to a possible outcome of one of the dies, then summing the integer values. For example, in one embodiment, the CPU 70 selects a first integer value, from one to six, corresponding to the faces of a six-sided first die, then selects a second integer value, from one to six, corresponding to the faces of a six-sided second die. The CPU 70 sums the two values to define the integer movement value, comprising a number from two to twelve. Alternatively, the CPU 70 might select an integer movement value from two to twelve without selecting and summing intermediate values.

Figure 6:
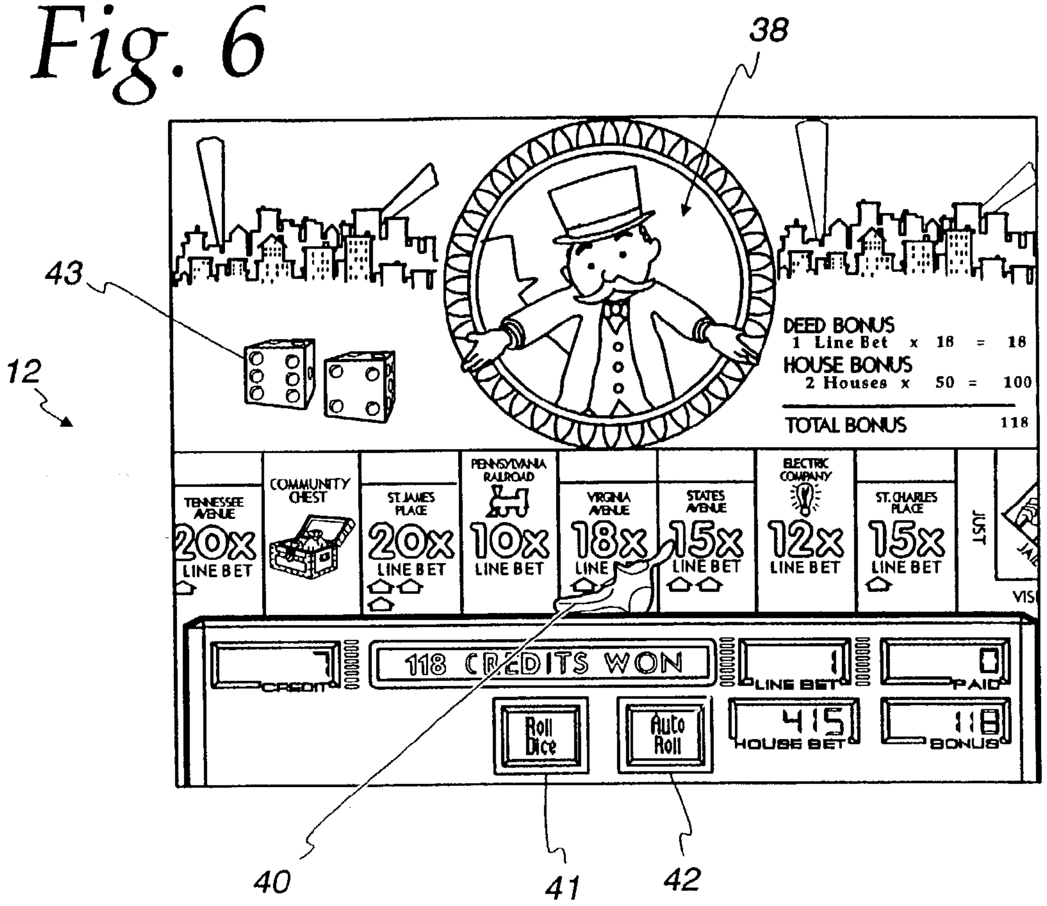
FIG. 6 is an illustration of a bonus round play screen which may appear on the video display of the gaming machine of FIG. 1 according to one embodiment of the present invention.

In one embodiment, the player "rolls" a pair of dice by touching a "Roll Dice" key 41 or "Auto Roll" key 42 on the video display 12. The outcome of each roll (e.g., the integer movement value) is selected by the CPU 70 which then issues game control instructions to display indicia of the pre-determined "roll." In one embodiment, the displayed indicia comprise mechanical dice 64 and a pair of "video" dice 43 on the video display 12 (FIG. 6). In one embodiment, the mechanical dice 64 are driven by I/O controller 71, in response to game control instructions from the CPU 70, to mechanically rotate and then stop to reveal the predetermined outcome of the roll. The video dice 43 similarly "rotate" and then stop to reveal the predetermined roll in response to instructions from the CPU 70. The outcome of the roll of dice 43 (FIG. 6) and 64 (FIG. 1) determines how many spaces the token will be moved from its previous position on the game board. On the top box display 32, movement is illustrated by the illumination, in step-wise fashion, of the appropriate stations (squares) on the game board 62 (e.g., MONOPOLY board) from the previous position to the position determined by the roll of dice. On the video display 12, movement is illustrated by the selected game token 40 (e.g., "SHOE" in FIG. 6) moving, one space at a time, a corresponding number of spaces on a scrolling portion of the game board.

In one embodiment, when the token 40 stops moving for each roll, an animated character icon (e.g., Rich Uncle Pennybags, in the MONOPOLY ONCE AROUND™ game) announces the name of the station (square) landed on by the token 40. The player is awarded the amount indicated on the station multiplied by the line bet. In one embodiment, the player might be awarded an additional amount resulting from a side bet, if any, associated with the station (which will be described in relation to FIG. 7). In one embodiment, the bonus game continues with consecutive rolls of the dice, with the player collecting various amounts corresponding to the landing stations determined by the rolls of dice, until the player's token has completed one trip around the game board. If the rolls are initiated by pressing the "Roll Dice" key 41, the game will pause between rolls until the player touches the key 41 or 42. If the rolls are initiated by the "Auto Roll" key 42, the CPU 70 causes the dice to roll automatically after a small delay following the previous roll.

In the MONOPOLY ONCE AROUND™ game, if the game token 40 lands on a "Chance" or "Community Chest" station (square) during the bonus round, the CPU 70 triggers an animation on video display 12 which shows the top card of a pile of cards flipping up to reveal the "Chance" or "Community Chest" outcomes. The art on the cards resembles the cards in an actual MONOPOLY™ game. Generally, the "Chance" and "Community Chest" outcomes comprise awards of fixed coin values (e.g., "BANK ERROR IN YOUR FAVOR, $100), or they can move the player to a new space (e.g., GO BACK ONE SPACE). If the player is moved to a property, the movement is indicated on the top box board 62 and the video display 12. The possible outcomes of the "Chance" and "Community Chest" squares in one embodiment of the MONOPOLY ONCE AROUND™ bonus game is shown in Table A-2, below.

TABLE A-2

CHANCE & COMMUNITY CHEST OUTCOMES

| Community Chest | Pay | Chance | Pay |
|---|---|---|---|
| Beuty Contest | 5 | 3rd Place in Dance Contest | 7 |
| Life Insurance Matures | 25 | Horse Wins the Derby | 35 |
| XMAS Fund Matures | 15 | You Win State Lottery | 100 |
| You Inherit Money | 60 | You Win at Roulette Table | 25 |
| Income Tax Refund | 25 | You Win at Blackjack Table | 20 |
| Bank Error in Your Favor | 100 | Lawsuit in your Favor | 40 |
| Receive Payment for Services | 12 | Find Lost Dog | 10 |
| Stock Increases in Value | 40 | Building and Loan Matures | 30 |
| Grand Opera Opening | 9 | Bank Pays You Dividend | 12 |
| Go Back One Space | 0 | Sell Rare Painting | 70 |
| Average | 32.33 | Average | 34.9 |
| Average with Go Back 1 Space | 29.10 | | |

Figure 3:
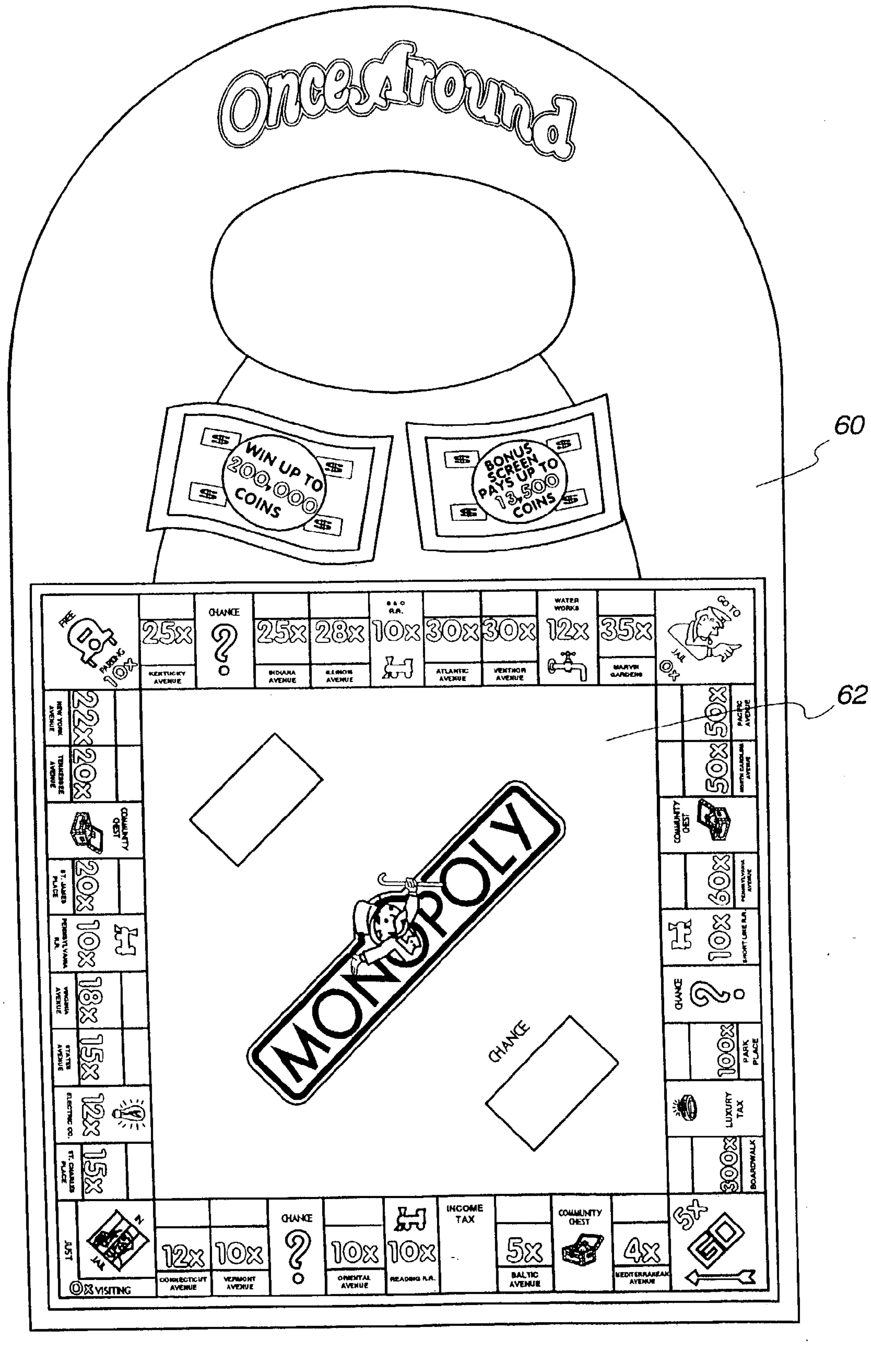
FIG. 3 shows the top box glass of the gaming machine of FIG. 1.

In one embodiment of the MONOPOLY ONCE AROUND™ game, if the game token 40 lands on station(s) other than "Chance" or "Community Chest," the CPU 70 causes the player to be awarded an amount of credits corresponding to the product of the coins or credits wagered per line in the basic game and a multiplier value associated with the respective station(s). Four of the stations (e.g., "INCOME TAX," "IN JAIL," "GO TO JAIL" and "LUXURY TAX") have zero value in the bonus game, that is, they are associated with zero multiplier amounts. All other stations have positive integer multiplier values which generally increase as the token progresses farther along the board. The multiplier values associated with the respective stations are shown in FIG. 3 and Table A-3, below.

TABLE A-3

MONOPOLY BONUS SQUARES

| MONOPOLY BONUS SQUARE | MULT | PROB | SNAKE EYES | Exp Pay | Exp Value | Cost/ House | House Pay | W/Snake Eyes | EV |
|---|---|---|---|---|---|---|---|---|---|
| Mediterranean Ave. | 4 | 0.0028 | 0.002778 | 0.01 | 0.001% | 5 | 75 | 1750 | 97.22% |
| Community Chest | 29.10 | 0.0278% | 0.027778 | 0.81 | 0.082% | | | | |
| Baltic Avenue | 5 | 0.0556 | 0.00008 | 0.28 | 0.028% | 5 | 75 | 2500 | 87.19% |
| Income Tax | 0 | 0.0843 | 0.00077 | 0.00 | 0.000% | | | | |
| Reading Railroad | 10 | 0.1144 | 0.00155 | 1.14 | 0.116% | | | | |
| Oriental Avenue | 10 | 0.1469 | 0.00234 | 1.47 | 0.149% | 5 | 25 | 400 | 91.03% |
| Chance | 34.9 | 0.1826 | 0.00318 | 6.37 | 0.646% | | | | |
| Vermont Avenue | 10 | 0.1669 | 0.00408 | 1.67 | 0.169% | 5 | 25 | 150 | 93.63% |
| Connecticut Avenue | 12 | 0.1560 | 0.00507 | 1.87 | 0.190% | 5 | 25 | 175 | 93.21% |
| In Jail | 0 | 0.1482 | 0.00463 | 0.00 | 0.000% | | | | |
| St. Charles Place | 15 | 0.1417 | 0.00433 | 2.13 | 0.215% | 10 | 50 | 600 | 94.67% |
| Electric Company | 12 | 0.1346 | 0.00412 | 1.62 | 0.164% | | | | |
| States Avenue | 15 | 0.1251 | 0.00394 | 1.88 | 0.190% | 10 | 50 | 800 | 92.06% |
| Virginia Avenue | 18 | 0.1389 | 0.00374 | 2.50 | 0.253% | 10 | 50 | 700 | 93.76% |
| Pennsylvania Railroad | 10 | 0.1462 | 0.00347 | 1.46 | 0.148% | | | | |
| St. James Place | 20 | 0.1488 | 0.00386 | 2.98 | 0.301% | 10 | 50 | 500 | 91.74% |
| Community Chest | 32.33 | 0.1483 | 0.00406 | 4.80 | 0.486% | | | | |
| Tennessee Avenue | 20 | 0.1461 | 0.00413 | 2.92 | 0.296% | 10 | 50 | 500 | 91.64% |
| New York Avenue | 22 | 0.1433 | 0.00412 | 3.15 | 0.319% | 10 | 50 | 600 | 94.30% |
| Free Parking | 10 | 0.1412 | 0.00406 | 4.80 | 0.486% | | | | |
| Kentucky Avenue | 25 | 0.1411 | 0.00398 | 3.53 | 0.357% | 15 | 75 | 900 | 92.46% |
| Chance | 34.9 | 0.1419 | 0.00392 | 4.95 | 0.502% | | | | |
| Indiana Avenue | 25 | 0.1429 | 0.00392 | 3.57 | 0.362% | 15 | 75 | 900 | 93.01% |
| Illinois Avenue | 28 | 0.1436 | 0.00394 | 4.02 | 0.407% | 15 | 75 | 900 | 93.51% |
| B & O Railroad | 10 | 0.1440 | 0.00397 | 1.44 | 0.146% | | | | |
| Atlantic Avenue | 30 | 0.1441 | 0.00399 | 4.32 | 0.438% | 15 | 75 | 900 | 93.98% |
| Ventnor Avenue | 30 | 0.1436 | 0.00400 | 4.31 | 0.436% | 15 | 75 | 900 | 93.81% |
| Water Works | 12 | 0.1432 | 0.00400 | 1.72 | 0.174% | | | | |
| Marvin Gardens | 35 | 0.1429 | 0.00399 | 5.00 | 0.507% | 15 | 75 | 900 | 93.40% |
| Go to Jail | 0 | 0.1429 | 0.00298 | 0.00 | 0.000% | | | | |
| Pacific Avenue | 50 | 0.1430 | 0.00397 | 7.15 | 0.724% | 20 | 100 | 1200 | 93.36% |
| North Carolina Avenue | 50 | 0.1432 | 0.00397 | 7.16 | 0.7255 | 20 | 100 | 1200 | 93.45% |
| Community Chest | 32.33 | 0.1434 | 0.00397 | 4.64 | 0.469% | | | | |
| Pennsylvania Avenue | 60 | 0.1434 | 0.00398 | 8.60 | 0.871% | 20 | 100 | 1200 | 93.58% |
| Short Line Railroad | 10 | 0.1434 | 0.00398 | 1.43 | 0.1455 | | | | |
| Chance | 34.9 | 0.1433 | 0.00398 | 5.00 | 0.506% | | | | |
| Park Place | 100 | 0.1432 | 0.00398 | 14.32 | 1.451% | 20 | 100 | 1200 | 93.52% |
| Luxury Tax | 0 | 0.1432 | 0.00398 | 0.00 | 0.000% | | | | |
| Boardwalk | 300 | 0.1432 | 0.00398 | 42.96 | 4.351% | 20 | 100 | 1200 | 93.48% |
| Go | 5 | 1.0000 | 0.00298 | 5.00 | 0.506% | | | | |
| Total Spaces | 39 | 6.2192 | | | | | | | |
| Average | 29.78 | 0.16 | | | | | | | |
| Expected Value | | | | 167.60 | 16.97% | | | | |

In one embodiment, the bonus game gives the player the opportunity to make side bets, apart from the coins or credits wagered in the basic game, on the stations of the game board which the player predicts will be landed on during the bonus game. The increments of the side bets which may be made on the various stations may be varied according to the game program. For example, in the MONOPOLY ONCE AROUND™ bonus game, the player has the opportunity to "build" houses (make side bets) on the properties of the MONOPOLY board which the player predicts will be landed on during the bonus game. The amount of the side bet corresponds to the "cost" of the houses built on the various properties, which generally varies according to the property selected.

If the player wishes to build house(s), the player touches the "Build Houses" key 46 on the video display 12 (FIG. 5) which appears at the beginning of the bonus round. If the "Build Houses" key 46 is selected, the CPU 70 operates to display a "Build Houses" screen (FIG. 7) on the video display. In one embodiment, the video display 12 comprises a touch-screen display and the player bets (builds houses) on a property by touching the desired property. It will be appreciated, however, that any of several alternative player control devices may be used to implement the selection and building of houses.

Figure 7:
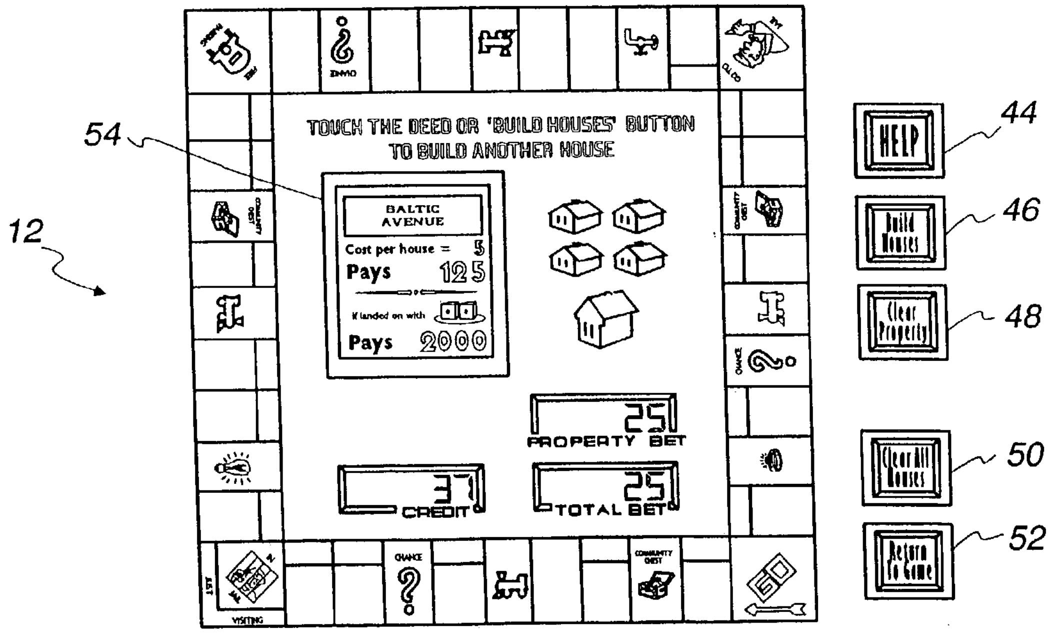
FIG. 7 is an illustration of a "Build Houses" screen which appears on the video display of the gaming machine of FIG. 1 according to one embodiment of the present invention.

After selection of a property, the CPU 70 operates to display a property deed 54 corresponding to the selected property on the video display 12. In FIG. 7, the property deed shown on the video display 54 is "Baltic Avenue," thus indicating that the player has elected to build houses on Baltic Avenue. More specifically, the player has identified the "Baltic Avenue" station as a predicted landing position of the token, to be determined by execution of the game program. The player builds houses on the selected property by touching the property again, by touching the deed 54, or by touching the "Build Houses" key 46. Up to five bets (houses) may be placed on each property. In one embodiment, the houses on the bottom side of the MONOPOLY™ board (from Mediterranean Ave. to Connecticut Ave.) cost 5 credits each, the houses on the left side of the board (St. Charles Place to New York Ave.) cost 10 credits each, the houses on the top side of the board (Kentucky Ave. to Marvin Gardens) cost 15 credits each and the houses on the right side of the board (Pacific Ave. to Boardwalk) cost 20 credits each.

The cost of the houses are subtracted from the credits previously earned or paid into the machine by the player. In one embodiment, the player may insert coins or bills into the machine 10 at any time during display of the "Build Houses" screen as desired to increase the credits available for building houses. If the player, having selected a property and placed house(s) on the property, wants to clear the house(s) on the selected property, the player touches a "Clear Property" key 48 on the display 12. If the player wants to clear houses (side bets) placed on the entire board, the player touches a "Clear All Houses" key 50 on the display 12.

In one embodiment, the video display 12 displays a number of house and hotel icons corresponding to the number of houses built on each selected property. In FIG. 7, for example, the video display 12 shows four green house icons and a red hotel icon adjacent to the Baltic Avenue property deed, thus indicating that the player has placed five bets on Baltic Avenue. The four house icons represent the first four bets and the hotel icon represents the fifth bet placed on Baltic Avenue. The displayed property deed 54 identifies the cost per house (e.g., 5 credits for Baltic Avenue) and the pay value of landing on the property (e.g., 125 credits for Baltic Avenue, with five houses).

In one embodiment, the game program defines a target integer movement value and a bonus is awarded to the player if the player "rolls" the target integer movement value to land on the selected property. The bonus comprises a higher value award, greater than the award which would otherwise be awarded by landing on the selected property. In the illustrated embodiment, the target integer movement value is two, corresponding to a roll of "Snake Eyes" (double ones). The displayed property deed 54 indicates the pay value of the "Snake Eyes" bonus, 2000 credits for Baltic Avenue (with five houses). The cost per house, pay value per house and Snake Eyes bonus value per house for the various properties in one embodiment of the MONOPOLY ONCE AROUND™ game is identifed in Table A-3.

In one embodiment, a "Help" key 44 is displayed on the "Build Houses" screen. If touched by the player, the "Help" key 44 allows the player to access various information and instructions associated with the build houses feature. For example, in one embodiment, the information associated with the "Help" key 44 may allow the player to determine how much the Snake Eyes bonus is worth for the various properties.

After the player has placed the desired number of side bets, the player touches a "Return to Game" key 52 on the display 12, causing the CPU 70 to replace the "Build Houses" screen with a display of the MONOPOLY board screen (FIG. 6) with the token starting on the GO square. Then, the player presses the "Roll Dice" button 41 or "Auto Roll" button 42 to roll the dice and commence the bonus game.

Then, the CPU 70 executes a game program, selecting integer movement values corresponding to a roll of dice to advance the game token, or token identifier along the game board. The landing station(s) of the token identifier determined by execution of the game program define "actual" or "true" position(s) of the token identifier, as opposed to the predicted positions selected via the "Build Houses" screen. After each "roll," the CPU 70 compares the true position to the predicted position(s) and, if the true position matches any of the predicted position(s), the player is paid an amount of coins or credits, as appropriate, corresponding to the cost of building the house(s) on that property. In one embodiment, the amount paid upon landing on an improved property is five times the cost of building houses on that property. The "Build Houses" award(s), if any, are supplemental to the awards given as a result of landing on the properties in the regular bonus game.

The award of coin(s) or credit(s) for the "Build Houses" feature or the regular bonus game may occur immediately upon the token 40 landing on a particular property or may be deferred until completion of the bonus game. In one embodiment, the animated Rich Uncle Pennybags will celebrate on the display 12 during all large bonus awards. After the bonus game is complete, the bonus screen will fade and the video reels screen will then be displayed on the display 12 so the player may resuming playing the basic game.

Figure 8:
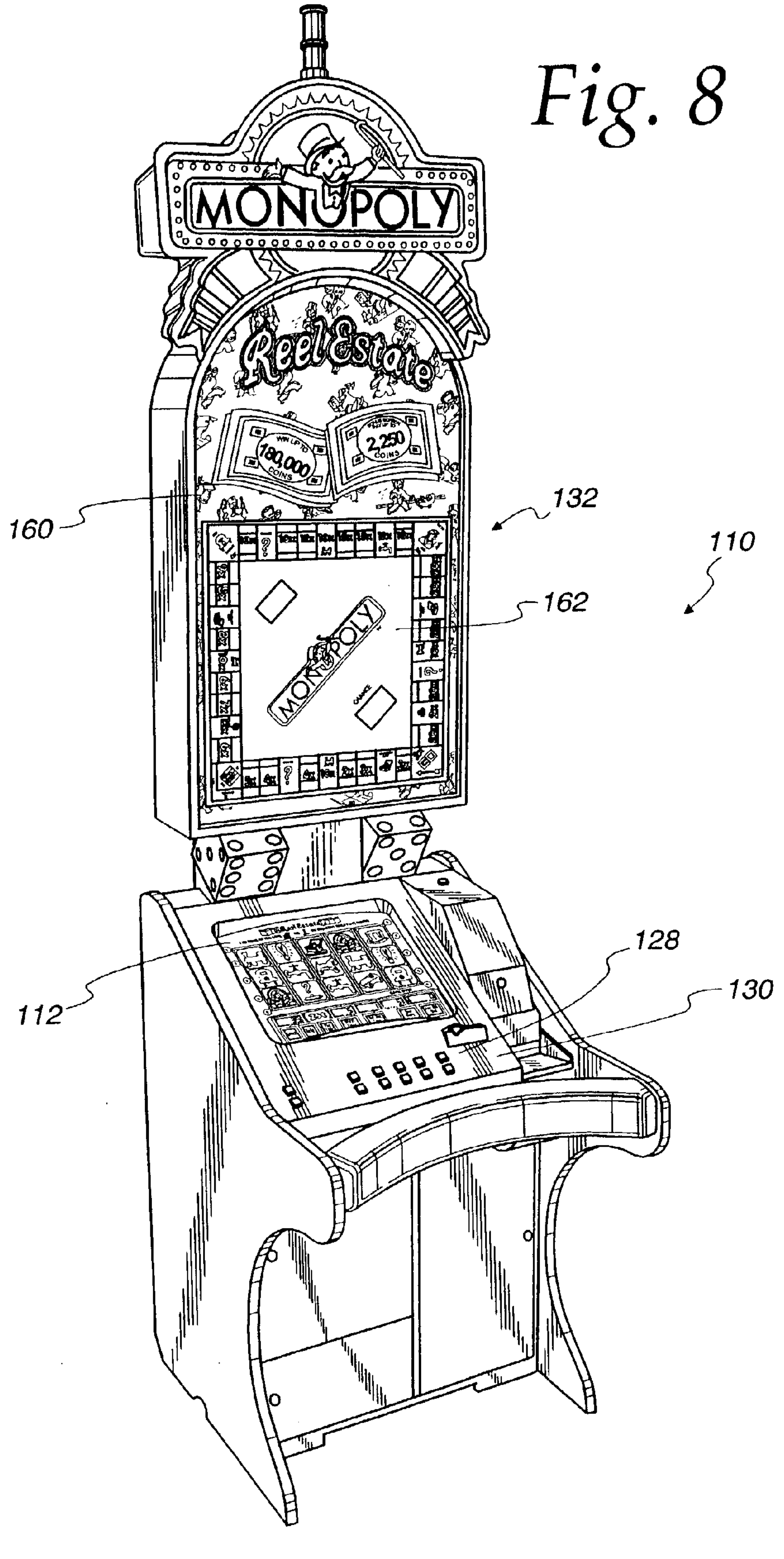
FIG. 8 is a perspective view of a video gaming machine with a board game theme according to another embodiment of the present invention.

Now turning to FIG. 8, there is depicted another gaming machine 110 with a board game theme. In one embodiment, the gaming machine 110 is operable to play a game entitled MONOPOLY REEL ESTATE™, based on the MONOPOLY™ board game. MONOPOLY™ is a registered trademark owned by and used with permission by Hasbro, Inc. and Hasbro International, Inc., Pawtucket, R.I. Alternatively, the gaming machine 110 may be implemented with any of several other board game themes other than MONOPOLY™.

The gaming machine 110 includes a video display 112 and a top box display 132. The video display 112 may comprise a dot matrix, CRT, LED, LCD, electro-luminescent display or generally any type of video display known in the art. The top box display 132 has a facing surface 160 comprising a partially translucent material such as glass, plastic, Plexiglas or the like which includes an adaptation of a game board 162 (e.g., MONOPOLY) displayed thereon. The game board 162 is backlit by a number of lights 166 (not visible in FIG. 1) in the top box display 132.

Figure 9:
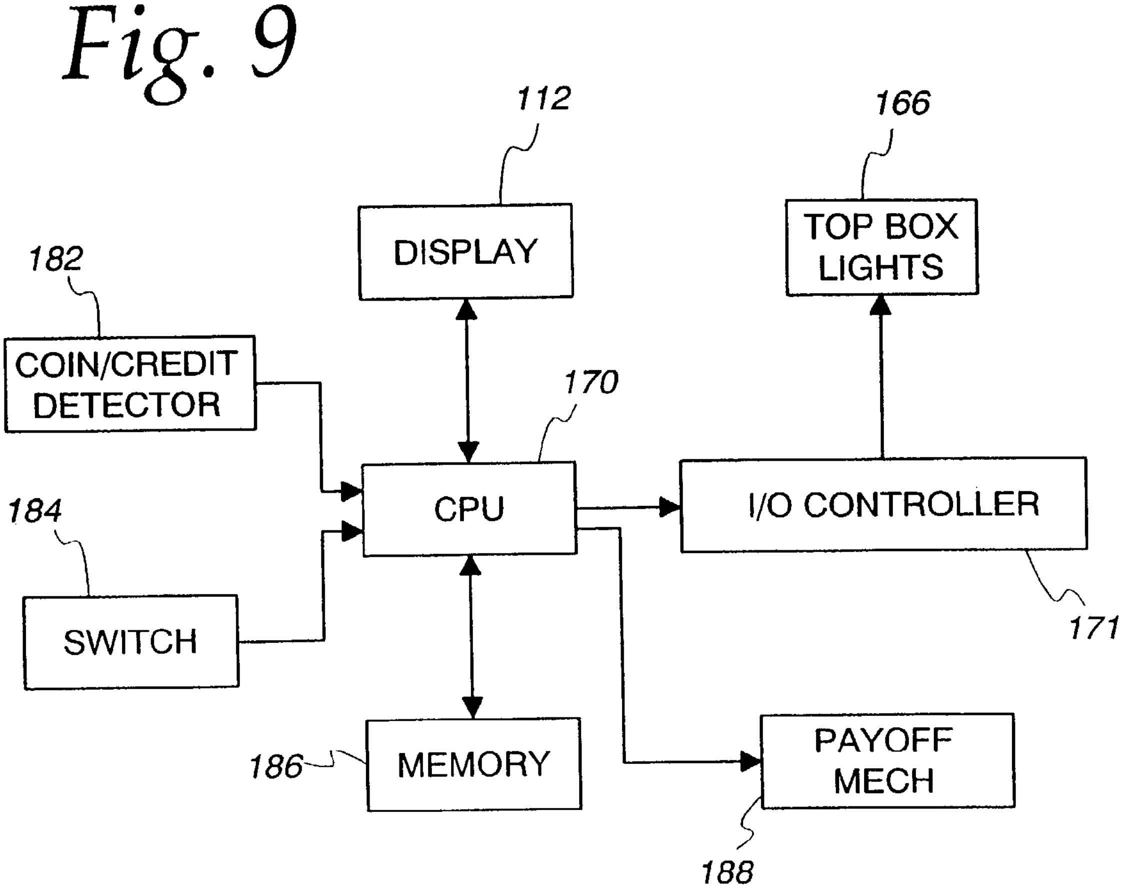
FIG. 9 is a block diagram of the gaming machine of FIG. 8.

FIG. 9 is a block diagram of a control system suitable for operating the slot machine 110 of FIG. 8. Coin/credit detector 182 signals a CPU 170 when a player has inserted a number of coins or played a number of credits. Then, after the player has activated a switch 184 (e.g., by pulling a lever or pushing a button), the CPU 170 operates to display reels 114, 116, 118, 120 and 122 (see FIG. 11) on the video screen 112. The player activates one or more selected paylines 172, 174, 176, 178, 180 and presses the "Spin Reels" button 136 or "Max Bet Spin" button 137 to "spin" the reels, as will be described in relation to FIG. 1. The CPU 170 randomly selects a game outcome and causes the video display 112 to display indicia (e.g., symbols on reels 114, 116, 118, 120 and 122) corresponding to the pre-selected game outcome. In one embodiment, the symbols displayed on the reels define the basic game outcome.

A system memory 186 stores control software, operational instructions and data associated with the gaming machine 110. In one embodiment, the memory 186 comprises a separate read-only memory (ROM) and battery-backed random-access memory (RAM). However, it will be appreciated that the memory 186 may be implemented on any of several alternative types of memory structures or may be implemented on a single memory structure. A payoff mechanism 188 is operable in response to instructions from the CPU 170 to award a payoff of coins or credits to the player in response to certain winning combinations stored in memory 186. As will be described in detail hereinafter, the payoff amounts corresponding to certain combinations is predetermined according to a pay table stored in system memory 186. A separate I/O controller 171 coupled to the CPU 170 operates the top box lights 266.

The gaming machine 110 is operable to play a basic game and a bonus game. The basic game is implemented on the video display 112 on five video simulated spinning reels, 114, 116, 118, 120 and 122 (hereinafter "reels") with five paylines 172, 174, 176, 178 and 180, as best observed in FIG. 11. Generally, game play is initiated by inserting a number of coins or playing a number of credits, causing the CPU 170 (FIG. 9) to activate a number of paylines corresponding to the number of coins or credits played. After activation of the paylines, the reels 114, 116, 118, 120 and 122 are set in motion by either pulling a lever (not shown), pressing a push button, or touching a touch screen "key" on the video display 112.

Figure 11:
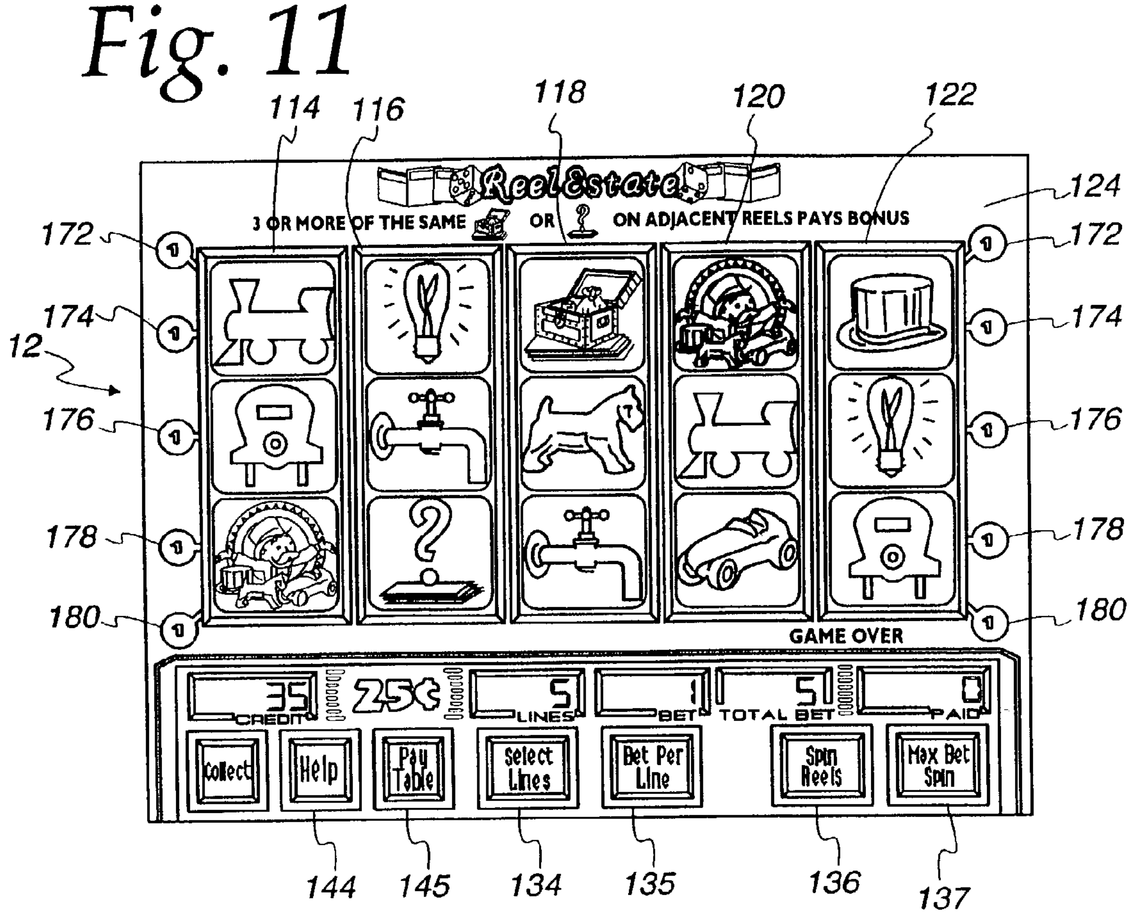
FIG. 11 is an illustration of a five-reel, five-line video gaming machine basic game which may be implemented on the gaming machine of FIG. 8.

In the embodiment of FIG. 11, each of the paylines 172, 174, 176, 178 and 180 extend through one symbol on each of the five reels 114, 116, 118, 120 and 122. Payline 172 starts at the upper left symbol (e.g., "TRAIN") on reel 114, extends through the center symbol (e.g., "WATER WORKS," hereinafter "WATER") on reel 116, the lower symbol (e.g., "WATER") on reel 118, the center symbol (e.g., "TRAIN") on reel 120 and terminates at the top symbol (e.g., "HAT") on reel 122. Payline 174 extends through the top symbol on each reel (e.g., "TRAIN" on reel 114, "ELECTRIC COMPANY," hereinafter "LIGHT" on reel 116, "COMMUNITY CHEST," hereinafter "CHEST" on reel 118, "RICH UNCLE PENNYBAGS," hereinafter "PENNY" on reel 120 and "HAT" on reel 122.) Payline 176 extends through the center symbol on each reel (e.g., "FREE PARKING," hereinafter "PARKING" on reel 114, "WATER" on reel 116, "DOG" on reel 118, "TRAIN" on reel 120 and "LIGHT" on reel 122.) Payline 178 extends through the lower symbol on each reel (e.g., "PENNY" on reel 114, "CHANCE" on reel 116, "WATER" on reel 118, "CAR" on reel 120 and "PARKING" on reel 122.) Payline 180 starts at the lower symbol (e.g., "PENNY") on reel 114, extends through the center symbol (e.g., "WATER") on reel 116, the upper symbol (e.g., "CHEST") on reel 118, the center symbol (e.g., "TRAIN") on reel 120 and terminates at the lower symbol (e.g., "PARKING") on reel 122.

In one embodiment, the player selects the number of paylines (between one and five) to play by pressing one of the five buttons in the top row 128 or by using the "Select Lines" key 134 on the video display 112. The player then chooses one of the five buttons in the bottom row 130 that correspond to the number of coins or credits to bet on each of the five paylines. Selecting one of the buttons in the bottom row 130 sets the five video reels, 114, 116, 118, 120 and 122 in "motion". As an alternative, the player may touch the "Bet Per Line" key 135 on the video display 112 until the desired bet is displayed and then touch the "Spin Reels" key 136 on the video display 112 to begin the game. As another alternative, if the player wishes to bet the maximum amount of lines and the maximum bet per line, the player may touch the "Max Bet Spin" key 137 on the video display 112 to begin the game. In one embodiment, the game can be set for a maximum bet of 5, 9 or 18 credits on each payline for a maximum total bet of 25, 45 or 90 credits per game. The CPU 70 assigns an equal amount of credits bet for each payline and then spins all five reels 114, 116, 118, 120 and 122.

The CPU 170 uses a random number generator (not shown) to select a game outcome (e.g., "basic" game outcome) corresponding to a particular set of reel "stop positions". The CPU 170 then causes each of the video reels 114, 116, 118, 120 and 122 to stop at a preselected stop position. Video symbols (see FIG. 1) are displayed on the reels 114, 116, 118, 120 and 122 to graphically illustrate the reel stop position and indicate whether the stop position of the reels represents a winning game outcome. Winning "basic" game outcomes (e.g., symbol combinations resulting in payment of coins or credits) are identifiable by a pay table (see Table B-1). In one embodiment, the pay table is affixed to the machine 110 and/or displayed by the video display 112 in response to a command by the player (e.g., by pressing the "PAY TABLE" button 145). The pay table enables the player to view the winning combinations and their associated payoff amounts. If the displayed symbols stop in a winning combination, the game awards the player the award corresponding to the award in the pay table for that combination multiplied by the amount of credits bet on the winning payline.

TABLE B-1

Pay Table for REEL ESTATE Basic Game

| TYPE: 5 REEL Win Combinations | | | | | R #1 | R #2 | R #3 | R #4 | R #5 | # OF HITS | PAY | TOTAL | MaxBet: PROB | 25/45/ 90 EV |
|---|---|---|---|---|---|---|---|---|---|---|---|---|---|---|
| PENNY-BAGS | | | | | 1 | 1 | 1 | 1 | 1 | | | | | |
| PENNY | PENNY | PENNY | PENNY | PENNY | 1 | 1 | 1 | 1 | 1 | 1 | 10000 | 10000 | 8.417E−08 | 0.08% |
| PENNY | PENNY | PENNY | PENNY | | 1 | 1 | 1 | 1 | 24 | 24 | 1000 | 24000 | 2.02E−06 | 0.20% |
| PENNY | PENNY | PENNY | | | 1 | 1 | 1 | 22 | 26 | 566 | 100 | 56600 | 4.764E−05 | 0.48% |
| PENNY | PENNY | | | | 1 | 1 | 17 | 26 | 26 | 11492 | 10 | 114920 | 0.0009672 | 0.97% |
| PENNY | | | | | 1 | 17 | 26 | 26 | 26 | 298792 | 2 | 597584 | 0.0251479 | 5.03% |
| CAR | | | | | 1 | 2 | 2 | 2 | 1 | | | | | |
| CAR | CAR | CAR | CAR | CAR | 2 | 3 | 3 | 3 | 2 | 107 | 1000 | 107000 | 9.006E−06 | 0.90% |
| CAR | CAR | CAR | CAR | | 2 | 3 | 3 | 3 | 24 | 1272 | 150 | 190800 | 0.0001071 | 1.61% |
| CAR | CAR | CAR | | | 2 | 3 | 3 | 23 | 26 | 10166 | 50 | 508300 | 0.0008556 | 4.28% |
| CAR | CAR | | | | 2 | 3 | 23 | 26 | 26 | 77740 | 5 | 388700 | 0.006543 | 3.27% |
| CAR | | | | | 2 | 23 | 26 | 26 | 26 | 404248 | 2 | 808496 | 0.0340237 | 6.80% |

TABLE B-1-continued

Pay Table for REEL ESTATE Basic Game

| TYPE: 5 REEL Win Combinations | | | | | R #1 | R #2 | R #3 | R #4 | R #5 | # OF HITS | PAY | TOTAL | MaxBet: PROB | 25/45/90 EV |
|---|---|---|---|---|---|---|---|---|---|---|---|---|---|---|
| HAT | | | | | 3 | 3 | 3 | 1 | 1 | | | | | |
| HAT | HAT | HAT | HAT | HAT | 4 | 4 | 4 | 2 | 2 | 254 | 500 | 127000 | 2.138E−05 | 1.07% |
| HAT | HAT | HAT | HAT | | 4 | 4 | 4 | 2 | 24 | 3048 | 100 | 304800 | 0.0002565 | 2.57% |
| HAT | HAT | HAT | | | 4 | 4 | 4 | 24 | 26 | 39312 | 30 | 1179360 | 0.0033087 | 9.93% |
| HAT | HAT | | | | 4 | 4 | 22 | 26 | 26 | 223080 | 2 | 446160 | 0.0187756 | 3.76% |
| DOG | | | | | 3 | 3 | 3 | 3 | 1 | | | | | |
| DOG | DOG | DOG | DOG | DOG | 4 | 4 | 4 | 4 | 2 | 510 | 300 | 153000 | 4.292E−05 | 1.29% |
| DOG | DOG | DOG | DOG | | 4 | 4 | 4 | 4 | 24 | 6048 | 60 | 362880 | 0.000509 | 3.05% |
| DOG | DOG | DOG | | | 4 | 4 | 4 | 22 | 26 | 36036 | 20 | 720720 | 0.003033 | 6.07% |
| DOG | DOG | | | | 4 | 4 | 22 | 26 | 26 | 223080 | 2 | 446160 | 0.0187756 | 3.76% |
| TRAIN | | | | | 4 | 4 | 3 | 4 | 4 | | | | | |
| TRAIN | TRAIN | TRAIN | TRAIN | TRAIN | 4 | 4 | 3 | 4 | 4 | 768 | 120 | 92160 | 6.464E−05 | 0.78% |
| TRAIN | TRAIN | TRAIN | TRAIN | | 4 | 4 | 3 | 4 | 22 | 4224 | 40 | 168960 | 0.0003555 | 1.42% |
| TRAIN | TRAIN | TRAIN | | | 4 | 4 | 3 | 22 | 26 | 27456 | 15 | 411840 | 0.0023108 | 3.47% |
| PARKING | | | | | 4 | 4 | 4 | 5 | 4 | | | | | |
| PARKING | PARKING | PARKING | PARKING | PARKING | 4 | 4 | 4 | 5 | 4 | 1280 | 100 | 128000 | 0.0001077 | 1.08% |
| PARKING | PARKING | PARKING | PARKING | | 4 | 4 | 4 | 5 | 22 | 7040 | 30 | 211200 | 0.0005925 | 1.78% |
| PARKING | PARKING | PARKING | | | 4 | 4 | 4 | 21 | 26 | 34944 | 12 | 419328 | 0.0029411 | 3.53% |
| WATER | | | | | 4 | 4 | 4 | 4 | 5 | | | | | |
| WATER | WATER | WATER | WATER | WATER | 4 | 4 | 4 | 4 | 5 | 1280 | 80 | 102400 | 0.0001077 | 0.86% |
| WATER | WATER | WATER | WATER | | 4 | 4 | 4 | 4 | 21 | 5376 | 25 | 134400 | 0.0004525 | 1.13% |
| WATER | WATER | WATER | | | 4 | 4 | 4 | 22 | 26 | 36608 | 10 | 366080 | 0.0030811 | 3.08% |
| LIGHT | | | | | 4 | 3 | 4 | 4 | 6 | | | | | |
| LIGHT | LIGHT | LIGHT | LIGHT | LIGHT | 4 | 3 | 4 | 4 | 6 | 1152 | 60 | 69120 | 9.696E−05 | 0.58% |
| LIGHT | LIGHT | LIGHT | LIGHT | | 4 | 3 | 4 | 4 | 20 | 3840 | 20 | 76800 | 0.0003232 | 0.65% |
| LIGHT | LIGHT | LIGHT | | | 4 | 3 | 4 | 22 | 26 | 27456 | 5 | 137280 | 0.0023108 | 1.16% |
| | | | | | | | | | | | | | | 74.50% |
| SCATTERED PAYS | | | | | | | | | | | | | | |
| CHEST | | | | | 1 | 1 | 1 | 1 | 1 | | | | | |
| CHEST | CHEST | CHEST | CHEST | CHEST | 3 | 3 | 3 | 3 | 3 | 243 | 50 | 12150 | 2.045E−05 | 0.10% |
| CHEST | CHEST | CHEST | CHEST | | 3 | 3 | 3 | 3 | 23 | 1863 | 10 | 18630 | 0.0001568 | 0.16% |
| | CHEST | CHEST | CHEST | CHEST | 23 | 3 | 3 | 3 | 3 | 1863 | 10 | 18630 | 0.0001568 | 0.16% |
| CHEST | CHEST | CHEST | | | 3 | 3 | 3 | 23 | 26 | 16146 | 2 | 32292 | 0.0013589 | 0.27% |
| | CHEST | CHEST | CHEST | | 23 | 3 | 3 | 3 | 23 | 14283 | 2 | 28566 | 0.0012021 | 0.24% |
| | | CHEST | CHEST | CHEST | 26 | 23 | 3 | 3 | 3 | 16146 | 2 | 32292 | 0.0013589 | 0.27% |
| CHANCE | | | | | 1 | 1 | 1 | 1 | 2 | | | | | |
| CHANCE | CHANCE | CHANCE | CHANCE | CHANCE | 3 | 3 | 3 | 3 | 6 | 486 | 50 | 24300 | 4.09E−05 | 0.20% |
| CHANCE | CHANCE | CHANCE | CHANCE | | 3 | 3 | 3 | 3 | 20 | 1620 | 10 | 16200 | 0.0001363 | 0.14% |
| | CHANCE | CHANCE | CHANCE | CHANCE | 23 | 3 | 3 | 3 | 6 | 3726 | 10 | 37260 | 0.0003136 | 0.31% |
| CHANCE | CHANCE | CHANCE | | | 3 | 3 | 3 | 23 | 26 | 16146 | 2 | 32292 | 0.0013589 | 0.27% |
| | CHANCE | CHANCE | CHANCE | | 23 | 3 | 3 | 3 | 20 | 12420 | 2 | 24840 | 0.0010453 | 0.21% |
| | | CHANCE | CHANCE | CHANCE | 26 | 23 | 3 | 3 | 6 | 32292 | 2 | 64584 | 0.0027179 | 0.54% |
| | | | | | | | | | | | | | 0.9867% | 2.88% |
| TOTAL | | | | | 26 | 26 | 26 | 26 | 26 | 1604434 | | 9206084 | | 3.42% |

Table B-1 is a pay table identifying various winning combinations of symbols in the MONOPOLY REEL ESTATE™ basic game and their mathematical probabilities and expected values. The various symbols used in the MONOPOLY REEL ESTATE basic game include: "RICH UNCLE PENNYBAGS" ("PENNY"), "CAR," "HAT," "DOG," "TRAIN," "PARKING," "WATER," "LIGHT," "CHEST" and "CHANCE."

The "WIN COMBINATIONS" column identifies the various win combinations which may occur by symbols stopping on an active payline. Generally, winning combinations can occur when one to five corresponding symbols are displayed, left to right, starting on reel 114 (designated "R #1" in Table B-1) on an active payline. For example, one "PENNY" symbol displayed on reel 114 is a winning outcome, as is two "PENNY" symbols displayed on adjacent reels 114 ("R #1") and 116 ("R #2").

In one embodiment, the "PENNY" symbol acts as a wildcard for combinations of game tokens "CAR," "HAT" and "DOG." Thus, for example, the combination of "CAR," "PENNY" and "CAR" on adjacent reels 114 ("R #1"), 116 (R #2) and 118 (R #3) is a winning combination.

The "SCATTERED PAYS" column identifies the various win combinations which may occur by symbols which are not necessarily aligned with an active payline. A winning combination of the scatter-pay type occurs when scatter-pay symbols are displayed, in any position, on the appropriate reels. In the MONOPOLY REEL ESTATE™ basic game, the "CHEST" and "CHANCE" symbols are scatter-pay symbols and winning combinations occur when three or more of these symbols are displayed on adjacent reels. For example, three "CHEST" symbols displayed on adjacent reels 116 ("R #2"), 118 (R #3) and 120 (R #4), is a winning scatter-pay combination in the MONOPOLY REEL ESTATE™ game.

The "# OF HITS" column of Table B-1 identifies, for each winning combination, the product of the number of symbols on each reel supporting the combination. For example, consider the combination of five "PENNY" symbols. This combination is the highest value combination in the MONOPOLY REEL ESTATE™ basic game because there are relatively few "PENNY" symbols on each reel and, consequently, the probability of hitting a "PENNY" symbol on each reel is very low. Specifically, in the embodiment of Table B-1, there is one "PENNY" symbol on each of reels 114 ("R #1"), 116 ("R #2"), 118 ("R #3"), 120 ("R #4") and 122 ("R #5"). Thus, the "# OF HITS" for the combination of five consecutive "PENNY" symbols is 1 (i.e., $1\times1\times1\times1\times1$).

The "PAY" column of Table B-1 identifies the amount of coin(s) or credit(s) awarded for the various winning combinations in the basic game, per unit wagered. Thus, for example, the "PENNY," "PENNY" combination appearing on reels 114, 116 ("R #1, R #2") will pay 10 coins or credits with one coin played; that same combination will pay 50 coins or credits with five coins played.

The "TOTAL" column of Table B-1 lists, for each winning combination, the product of the "# OF HITS" value and the "PAY" value. The five "PENNY" combination, for example, having 1 hit paying 10,000 coins or credits, has a "TOTAL" value of 10,000. As another example, the four "PENNY" combination, having 24 hits paying 1,000 coins or credits, has a "TOTAL" value of 24,000.

In one embodiment, each of the reels 114, 116, 118, 120 and 122 have 26 symbol positions, thus the odds of hitting each unique combination relative to a single active payline is one in about 12 million (i.e., $1\div(26)^5$). The "PROB" column identifies the probability of hitting the various winning combinations in a single spin. For example, there is only 1 symbol combination out of about 12 million symbol combinations that will result in the combination of five consecutive "PENNY" symbols. Thus, the probability of hitting that combination is 1÷12 million or about $8.4\times10^{-8}$.

The "EV" column of Table B-1 identifies the expected value of the various winning combinations, which is computed as the product of the "PAY" and "PROB" values. Thus, for the five "PENNY" combination, the expected value is 0.08% ($10{,}000\times8.4\times10^{-8}$). The payout rate of the basic game, identified at the bottom of the "EV" column, is computed by summing each of the expected values. In the embodiment of Table B-1, the payout rate of the basic game is 74.6%

The Bonus Game

The bonus game is triggered when a special "start-bonus" outcome occurs in the basic game. In one embodiment of the MONOPOLY REEL ESTATE™ game, the bonus game is triggered when three or more "CHEST" or "CHANCE" symbols are displayed in scatter-pay format on adjacent ones of the reels 114, 116, 118, 120 and 122. Alternatively, depending on the game program, the bonus game might be triggered when the "CHEST" or "CHANCE" symbols are displayed on an active payline on the reels 114, 116, 118, 120 and 122. The bonus game has a board-game (e.g., MONOPOLY) theme and is implemented on the top box game board 162 and video display 112.

Figure 12:
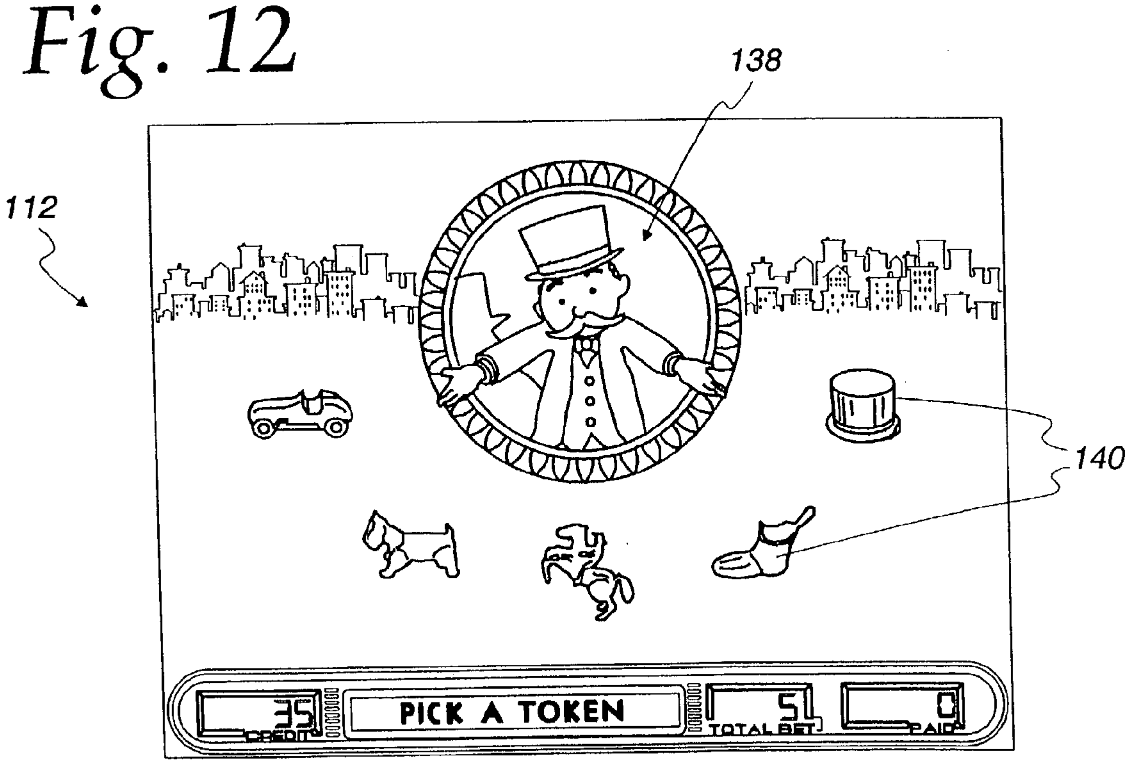
FIG. 12 is an illustration of a "Pick Token" screen which appears on the video display of the gaming machine of FIG. 8 according to one embodiment of the present invention.

Upon initially entering the bonus game, the CPU 170 operates to replace the display of reels 114, 116, 118, 120, 122 on video display 112 with a token selection screen (FIG. 12) offering a selection of board game tokens 140. In the MONOPOLY REEL ESTATE™ game, the token selection screen displays an animated Rich Uncle Pennybags symbol 138 above a selection of MONOPOLY tokens 140 (e.g., "CAR," "DOG," "HORSE," "SHOE" and "HAT"), and the player is prompted to select one of the game tokens 140. In one embodiment, the video display 112 comprises a touch-screen display and the selection of a game token 140 is accomplished by touching the desired token on the display 112. It will be appreciated, however, that any of several known player control devices may be used to implement the selection of a token 140. In another embodiment, the player scrolls through the tokens 140 and selects a particular token by depressing a designated "select" button on the gaming machine 110 when the desired token 140 is highlighted. Scrolling through the tokens 140 prior to the selection of the desired token may also be accomplished automatically according to the game program or may be controlled by the player pressing various buttons. Once the player selects a token 140, Once the player selects a token 140, the CPU 170 signals the I/O controller 171 to illuminate a starting station on the top box game board 162 and then illuminate successive stations around the board in step-wise fashion, rapidly at first and then, after a couple of revolutions, slowing down and stopping on an indicated station. Generally, the indicated station is randomly determined by the CPU 170 prior to the illumination of successive stations on the top box game board 162. At a certain point, as the light on the top box game board 162 begins slowing down, the CPU 170 operates to generate a corresponding display on the video display 112, in which the selected token 140 "moves" on a scrolling portion of the game board before ultimately stopping on the indicated station. The movement of the game token 140 on the video display 112 corresponds exactly to the illumination of stations on the top box game board 162.

Figure 13:
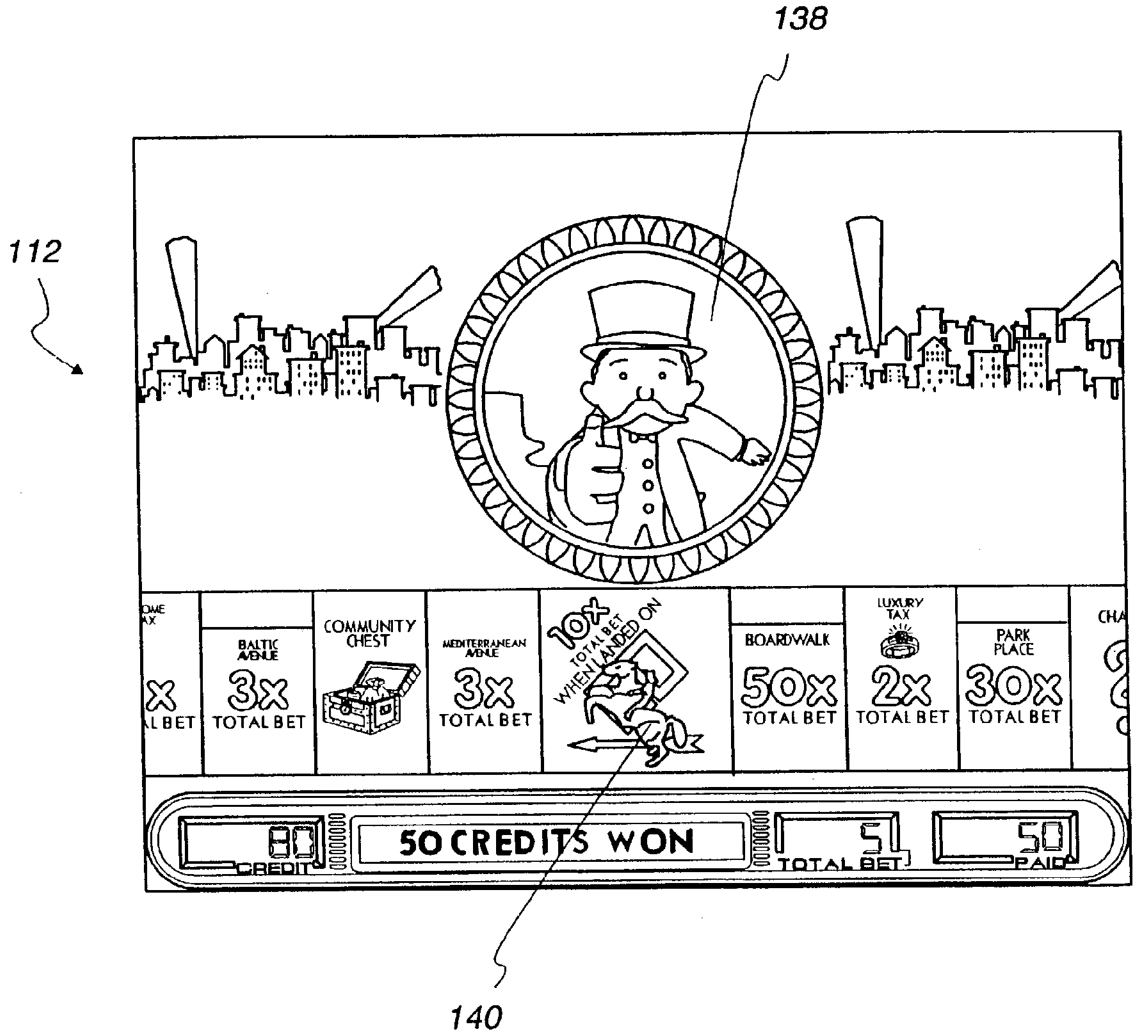
FIG. 13 is an illustration of a bonus round play screen which may appear on the video display of the gaming machine of FIG. 1 according to one embodiment of the present invention.

For example, in the MONOPOLY REEL ESTATE™ game, once the player selects a token, the stations (squares) of the top box MONOPOLY board 162 are illuminated in step-wise fashion, starting with the GO square. The illumination of stations starts rapidly, then slows down and stops to reveal an indicated station of the MONOPOLY board. On the corresponding video display 112 (FIG. 13), the selected MONOPOLY token 140 (e.g., "HORSE") is shown advancing on a scrolling MONOPOLY board and then stopping on the indicated station (e.g., the "GO" square in FIG. 13).

In one embodiment, when the token 140 "lands" on the indicated station, an animated character icon (e.g., Rich Uncle Pennybags, in the MONOPOLY REEL ESTATE™ game) announces the name of the indicated station and the player is awarded an amount associated with the station. If the game token 140 lands on a "Chance" or "Community Chest" square, the CPU 170 triggers an animation on video display 112 which shows the top card of a pile of cards flipping up to reveal the "Chance" or "Community Chest" outcome. The art on the cards resembles the cards in an actual MONOPOLY™ game. Generally, the "Chance" and "Community Chest" outcomes comprise awards of fixed coin values (e.g., "LIFE INSURANCE MATURES, $12), or they move the player to a new space (e.g., ADVANCE TO BOARDWALK). If the player is moved to a property, the movement is indicated on the top box board 62 and the video display 12. The possible outcomes of the "Chance" and "Community Chest" squares in one embodiment of theMONOPOLY REEL ESTATE™ bonus game is shown in Table B-2, below.

TABLE B-2

| Chance and Community Chest Outcomes/Pay Values | | | |
|---|---|---|---|
| Community Chest | Pay | Chance | Pay |
| Beauty Contest | 3 | Your Win 3rd Place in Dance Contest | 4 |
| Life Insurance Matures | 12 | Your Horse Wins the Derby | 12 |
| XMAS Fund Matures | 8 | You Win State Lottery | 25 |
| You Inherit Money | 15 | Your Number Hits at Roulette Wheel | 15 |
| Income Tax Refund | 9 | Lawsuit in your Favor | 12 |
| Bank Error In Your Favor | 25 | Find Lost Dog | 3 |
| Receive For Services | 6 | Your Build and Load Matures | 10 |
| From Sale of Stock You Get | 10 | Bank Pays You Dividend | 8 |
| Grand Opera Opening | 5 | Sell Rare Painting at Auction | 10 |

TABLE B-2-continued

| Chance and Community Chest Outcomes/Pay Values | | | |
|---|---|---|---|
| Community Chest | Pay | Chance | Pay |
| Advance to Boardwalk | 50 | Advance to Park Place | 30 |
| Average | 14.30 | Average | 12.90 |

Figure 10:
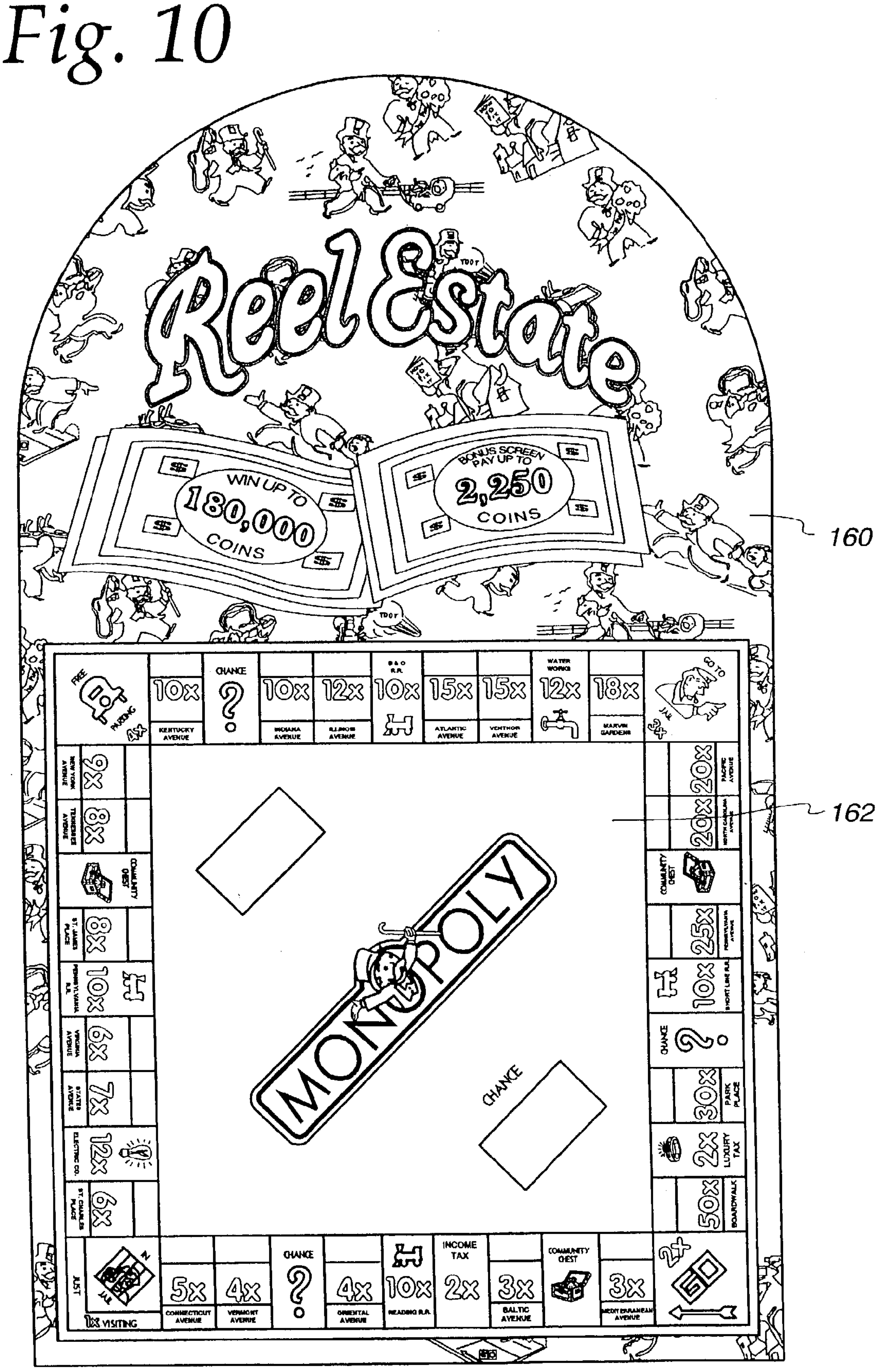
FIG. 10 shows the top box glass of the gaming machine of FIG. 8.

In one embodiment of the MONOPOLY REEL ESTATE™ game, if the game token 140 lands on station(s) other than “Chance” or “Community Chest,” the CPU 170 causes the player to be awarded an amount of credits corresponding to the product of the coins or credits wagered in the basic game and a multiplier value associated with the respective station(s). All of the stations have positive integer multiplier values which generally increase as the token progresses farther along the board. The multiplier values associated with the respective stations are shown in FIG. 10 and Table B-3, below.

TABLE B-3

| MONOPOLY BONUS SQUARES | | | | | | | |
|---|---|---|---|---|---|---|---|
| | | Number of Scatter Symbols in Win | | | | | |
| MONOPOLY BONUS | Mult | No monos | Weight | | | EV | EV w/Bonus |
| Mediterranean | 3 | 0.667 | 1 | 1 | | 0.02% | 0.03% |
| Community Chest | 14.30 | 0.967 | 2 | | | 0.24% | 0.27% |
| Baltic | 3 | 0.667 | 1 | 1 | | 0.02% | 0.03% |
| Income Tax | 2 | 1.000 | 2 | | | 0.03% | 0.04% |
| Reading Railroad | 10 | 1.000 | 2 | | | 0.16% | 0.19% |
| Oriental | 4 | 0.818 | 2 | 2 | | 0.07% | 0.07% |
| Chance | 12.90 | 0.967 | 2 | | | 0.215 | 0.24% |
| Vermont | 4 | 0.818 | 2 | 2 | | 0.07% | 0.07% |
| Connecticut | 5 | 0.818 | 2 | 2 | | 0.08% | 0.09% |
| Jail | 2 | 1.000 | 2 | | 18 | 0.03% | 0.04% |
| St. Charles | 6 | 0.818 | 2 | 2 | | 0.10% | 0.11% |
| Electric Company | 12 | 1.000 | 2 | | | 0.20% | 0.22% |
| States Ave | 6 | 0.818 | 2 | 2 | | 0.10% | 0.11% |
| Virginia Avenue | 7 | 0.818 | 2 | 2 | | 0.12% | 0.13% |
| Pennsylvania RR | 10 | 1.000 | 2 | | | 0.16% | 0.19% |
| St. James Place | 8 | 0.818 | 3 | 3 | | 0.20% | 0.22% |
| Community Chest | 14.30 | 0.967 | 2 | | | 0.24% | 0.27% |
| Tennessee Ave | 8 | 0.818 | 3 | 3 | | 0.20% | 0.22% |
| New York Ave | 9 | 0.818 | 3 | 3 | | 0.22% | 0.25% |
| Free Parking | 4 | 1.000 | 2 | | 23 | 0.07% | 0.07% |
| Kentucky Ave | 10 | 0.818 | 3 | 3 | | 0.25% | 0.28% |
| Chance | 12.90 | 0.967 | 1 | | | 0.11% | 0.12% |
| Indiana Ave | 10 | 0.818 | 3 | 3 | | 0.25% | 0.28% |
| Illinois Ave | 12 | 0.818 | 3 | 3 | | 0.30% | 0.34% |
| B & O Railroad | 10 | 1.000 | 3 | | | 0.25% | 0.28% |
| Atlantic Ave | 15 | 0.818 | 4 | 4 | | 0.49% | 0.56% |
| Ventor Ave | 15 | 0.818 | 4 | 4 | | 0.49% | 0.56% |
| Water Works | 12 | 1.000 | 4 | | | 0.395 | 0.45% |
| Marvin Gardens | 18 | 0.818 | 4 | 4 | | 0.59% | 0.67% |
| Goto Jail | 2 | 1.000 | 4 | | 33 | 0.07% | 0.07% |
| Pacific Ave | 20 | 0.818 | 4 | 4 | | 0.66% | 0.75% |
| North Carolina Ave | 20 | 0.818 | 4 | 4 | | 0.66% | 0.75% |
| Community Chest | 14.30 | 0.967 | 4 | | | 0.47% | 0.53% |
| Pennsylvania Ave | 25 | 0.818 | 4 | 4 | | 0.82% | 0.93% |
| Short Line | 10 | 1.000 | 5 | | | 0.41% | 0.47% |
| Chance | 12.90 | 0.967 | 5 | | | 0.53% | 0.60% |
| Park Place | 30 | 0.667 | 5 | 5 | | 1.23% | 1.40% |
| Luxury Tax | 2 | 1.000 | 5 | | | 0.08% | 0.09% |
| Boardwalk | 50 | 0.667 | 5 | 5 | | 2.06% | 2.34% |
| Go | 10 | 1.000 | 5 | 0.55 | 46 | 0.41% | 0.47% |
| Total Spaces | 40 | | 120 | Total | | 13.05% | 14.83% |
| Expected Value | 13.05% | 0.115 | | | | | |
| Bonus Spins | | 1 | 2 | 3 | 4 | Extra Spins | Total |
| Chance of Bonus Spins | 1.0000 | 0.1202 | 0.0144 | 0.0017 | 0.0002 | 1.1365 | |
| Expected Value of Bonus Spins | 13.0459% | 1.5675% | 0.1883% | 0.0226% | 0.0027% | 1.78% | 14.83% |

The bonus game nominally consists of only one indicated outcome ("spin") resulting in a single bonus award, after which the CPU 170 returns to the basic game. In one embodiment, an animated Rich Uncle Pennybags will celebrate on the video display 112 during all large bonus awards. After the bonus game is complete, the CPU 170 causes the bonus screen to fade and the video reels to be displayed so the player may resume playing the basic game.

In one embodiment, certain of the stations of the game board 162 have characteristics which identify them as members of a discernible subset or group of the stations. For example, in the MONOPOLY REEL ESTATE™ game, as in the actual MONOPOLY board game, the various properties of the game board are associated with color groups: Mediterranean Ave. and Baltic Ave. define a purple color group, Oriental Ave, Vermont Ave. and Connecticut Ave. define a light blue color group and so forth. In one embodiment, additional spins may be awarded by "completing" all the stations of a particular color group. Upon each play of the bonus game, if the token 140 lands on a station (e.g., property square) that is part of a color group, the CPU 170 identifies the station as a "completed" station and stores the outcome of that spin in game memory. Then, in one embodiment, the CPU 170 causes the I/O controller 171 to light an indicator light associated with that property on the game board 162, thereby indicating that the property is a "completed" property.

After each movement of the token, or token identifier, on the game board 162, the CPU 170 assigns a "completed" status to the landing station, as appropriate, then evaluates the status of the other stations in the group. If the other stations in the group also have been completed, the CPU 170 identifies that group as a completed group and provides a reward to the player. The reward might comprise an additional bonus game "spin" or an enhanced payoff relative to the base value of the property landed on. For example, if the token lands on Mediterranean Ave., which is a member of the purple color group, the CPU 170 assigns a completed status to the Mediterranean Avenue station and then evaluates the status of the other purple station, Baltic Avenue. Continuing the present example, if Baltic Avenue were also "completed," the CPU 170 would identify the purple group as a completed group and reward the player as appropriate, with perhaps an additional bonus game "spin." Alternatively or additionally, other incentives might be provided for completing color groups. For example, in one embodiment, if a player's token 140 lands on a property space that completes a color group, the player might be awarded double the value otherwise associated with that property. For instance, Meditteranean Avenue in one embodiment is associated with a "3×" multiplier, and the CPU 170 might cause the payoff to be doubled, effectively to a "6×" multiplier upon the game token landing on Mediterranean Avenue and completing the purple color group.

In one embodiment, once a station is completed, it retains its completed status (and its indicator light remains lit) when the bonus round ends and throughout additional bonus rounds until such time as all of the stations in that group are completed, thus defining a completed group. The bonus game might be played several times, by several players, before completing any station groups. Upon the completion of a group, the CPU 170 rewards the player as appropriate and then removes the completed status of the stations in the station group, causing the indicator lights to be extinguished.

For example, in the MONOPOLY REEL ESTATE™ game, a first player might enter the bonus game five times landing, respectively, on Illinois Ave. (red), Ventnor Ave. (yellow), Community Chest (no color), St. James Place (orange) and Pacific Ave. (green), causing the CPU 170 to assign completed status and illuminate indicator lights associated with those properties. A second player might then enter the bonus game three times, landing respectively on North Carolina Ave. (green) and Tennessee Ave. (orange), again causing the CPU 170 to assign completed status and illuminate indicator lights associated with those properties. A third player might then enter the bonus game and land on New York Ave. (orange), thus completing the orange color group. After identifying that New York Ave. is completed and that it completes the orange color group, the CPU 170 might then award the player a free bonus spin and clear or remove the completed status and extinguish the indicator lights on the orange properties. If the player were to land on Pennsylvania Ave. (green) in the free spin, thus completing the green color group, the CPU 170 would award the player another free bonus spin, clear the completed status and extinguish the indicator lights on the green properties. Otherwise, any other outcome would cause the CPU 170 to end the bonus game and return to the basic game.

In one embodiment, the free spin feature has a relatively low total payback of 1.9%, so that players will not feel compelled to keep playing the game until completing a color group (or conversely, to immediately leave the game after completing a color group), and so that other players will not be enticed to "sit out" and wait for machines which have a large proportion of lit properties.

Figure 14:
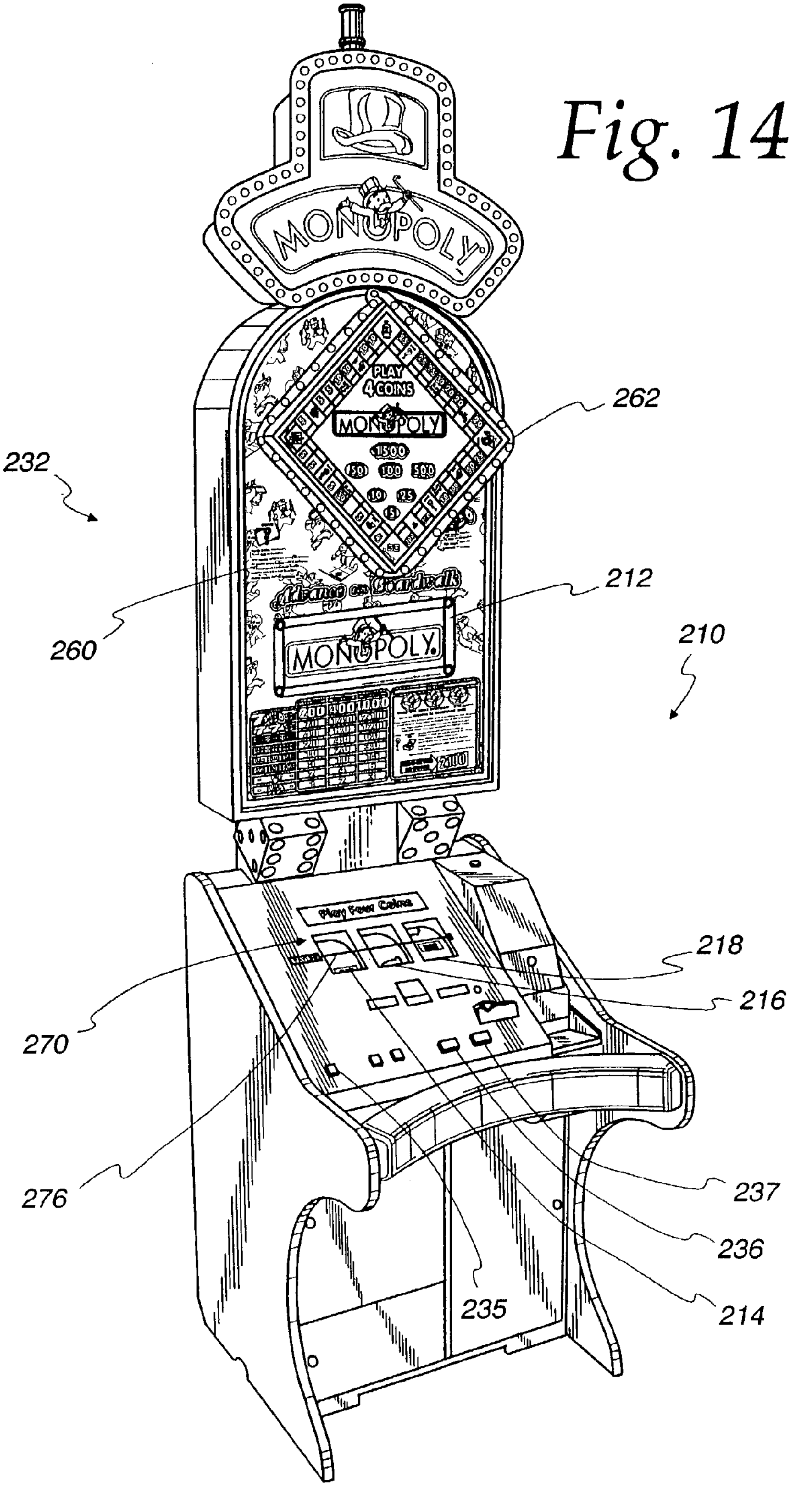
FIG. 14 is a perspective view of a spinning reel gaming machine with board game theme according to yet another embodiment of the present invention.

Now turning to FIG. 14, there is depicted another gaming machine 210 with a board game theme. In one embodiment, the gaming machine 210 is operable to play a game entitled MONOPOLY ADVANCE TO BOARDWALK™, based on the MONOPOLY™ board game. MONOPOLY™ is a registered trademark owned by and used with permission by Hasbro, Inc. and Hasbro International, Inc., Pawtucket, R.I. Alternatively, the gaming machine 210 may be implemented with any of several other board game themes other than MONOPOLY™.

The gaming machine 210 includes a display window 270 through which a player may observe three mechanical reels, 214, 216 and 218. The gaming machine 210 includes a top box 232 which includes a graphics display 212 and an adaptation of a game board 262 (e.g., MONOPOLY). The graphics display 12 may comprise a dot matrix, CRT, LED, LCD, electro-luminescent display or generally any type of video display known in the art. The game board 262 comprises a partially translucent material such as glass, plastic, Plexiglas or the like which is backlit by a number of lights 266 (not visible in FIG. 14) in the top box 232. As best observed in FIG. 16*a*, the facing surface 260 of the top box is imprinted with various artwork, symbols and text associated with the MONOPOLY ADVANCE TO BOARDWALK™ game, including a pay table 250 and instruction table 252.

Figure 15:
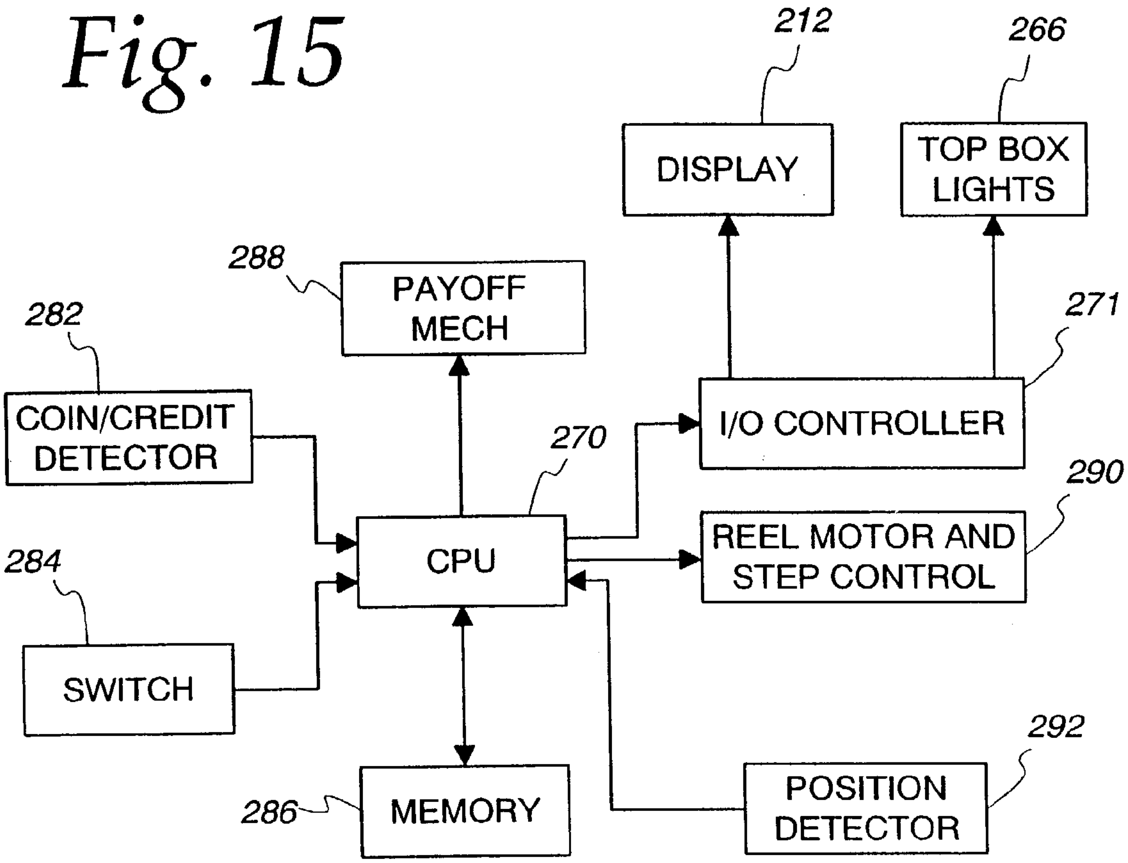
FIG. 15 is a block diagram of the gaming machine of FIG. 14.

FIG. 15 is a block diagram of a control system suitable for operating the slot machine 210 of FIG. 14. Coin/credit detector 282 signals a CPU 270 when a player has inserted a number of coins or played a number of credits. Then, after the player has activated a switch 284 (e.g., by pulling a lever or pushing a button), the CPU 270 initiates game play by setting reels 214, 216, 218 in motion, randomly selecting a game outcome and, using technology well known in the art, causes a reel motor and step controller 290 to stop the reels 214, 216, 218 at a stop position corresponding to the pre-selected game outcome. A rotational position detector 292 provides feedback to the CPU 270 to ensure that the reels 214, 216, 218 are stopped at the correct stop position.

The symbols displayed on the reels at the preselected stop position define indicia of the pre-selected game outcome. In one embodiment, the symbols displayed on the reels define the basic game outcome.

A system memory 286 stores control software, operational instructions and data associated with the gaming machine 210. In one embodiment, the memory 286 comprises a separate read-only memory (ROM) and battery-backed random-access memory (RAM). However, it will be appreciated that the memory 286 may be implemented on any of several alternative types of memory structures or may be implemented on a single memory structure. A payoff mechanism 288 is operable in response to instructions from the CPU 270 to award a payoff of coins or credits to the player in response to certain winning combinations stored in memory 286. As will be described in detail hereinafter, the payoff amounts corresponding to certain combinations is predetermined according to a pay table stored in system memory 286. A separate I/O controller 271 coupled to the CPU 270 operates the graphics display 212 and top box lights 266.

The gaming machine 210 is operable to play a basic game and a bonus game. In the embodiment of FIG. 14, the basic game is implemented on the three mechanical reels, 214, 216, 218 with a center payline 276. In one embodiment, the player can observe three symbol positions (e.g., an upper, center and lower display position) on each reel 214, 216, 218 thus defining a symbol group of nine symbols visible through the display window 270. Payline 276 extends through the center display position on each reel.

In one embodiment, the symbol group displayed on reels 214, 216, 218 may indicate any of four possible basic game outcomes, including (1) a standard winning outcome causing the CPU 270 to award the player a predetermined amount of coin(s) or credit(s) corresponding to a displayed pay table; (2) a surprise winning outcome causing the CPU 270 to award the player a predetermined amount of coin(s) or credit(s) corresponding to a "surprise" winning outcome not identified on a displayed pay table; (3) a start-bonus outcome causing the CPU 270 to enter a bonus game; and (4) a losing outcome causing the processor 40 to continue operation in the basic mode without awarding any coin(s) or credit(s).

Generally, both the standard and surprise winning outcomes are characterized by the display of one or more predefined combinations of symbols. The symbols and payoffs defining the standard and surprise winning combinations are stored in the game memory 286. In one embodiment, the symbols and payoffs defining the standard winning combinations are shown in the pay table 250 (FIG. 16*a*) on the face of the slot machine 210 so that they may be observed by the player, whereas the symbols defining the surprise winning combinations are not shown on the top box 232 and hence will likely "surprise" the player when they result in a payoff. In the MONOPOLY ADVANCE TO BOARDWALK™ game, the symbols defining the surprise winning combinations are identified only generally on the top box 232 as a "mystery blank combination" which starts the ADVANCE TO BOARDWALK™ bonus game. The specific combination of BLANK symbols which define the "mystery blank combination" is predefined and stored in game memory 286.

Figure 16A:
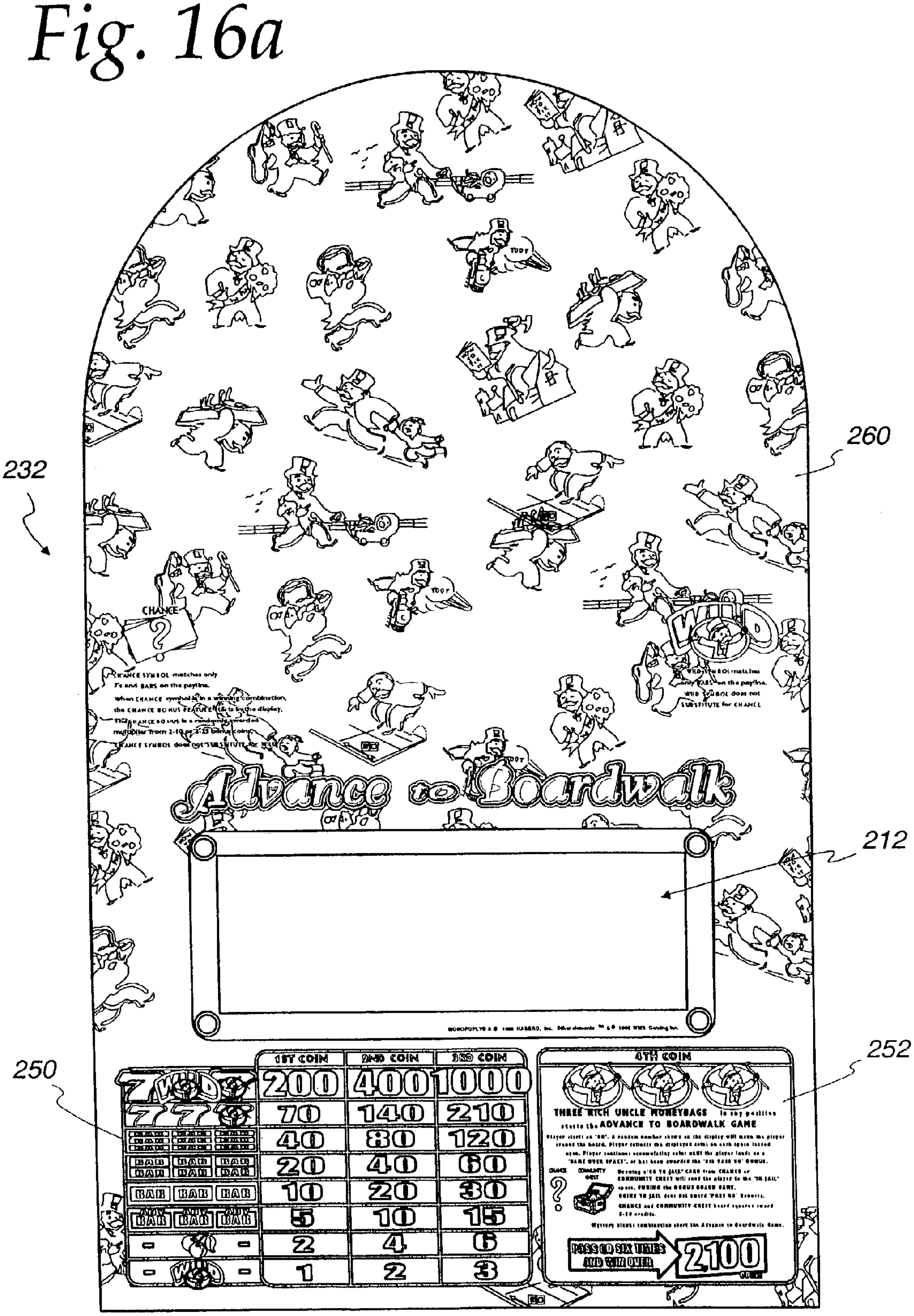
FIG. 16*a* shows a portion of the top box glass of the gaming machine of FIG. 14.

The symbols defining the start-bonus combinations are preferably identified on the pay table or other portion(s) of the top box display 232. For example, as will be described in greater detail hereinafter, the MONOPOLY ADVANCE TO BOARDWALK™ game has two bonus features: a CHANCE bonus feature and an ADVANCE TO BOARDWALK bonus feature. In the embodiment of FIG. 16*a*, the CHANCE bonus feature and the symbols (i.e., start-bonus combinations) which trigger the CHANCE bonus feature are explained in the text underlying the CHANCE icon at the center-left of the top box display 232. Specifically, the display 232 includes the following description of the CHANCE bonus feature in the illustrated embodiment:

CHANCE SYMBOL matches only 7's and BARS on the payline. When CHANCE symbol is in a winning combination, the CHANCE BONUS FEATURE starts in the display. The CHANCE BONUS is a randomly awarded multiplier from 2–10 or 2–25 bonus coins. CHANCE SYMBOL does not substitute for WILD.

The ADVANCE TO BOARDWALK bonus feature and the symbols (i.e., start-bonus combinations) which trigger the ADVANCE TO BOARDWALK bonus feature are explained in the field 252 at the lower-right of the top box display 232, as follows:

THREE RICH UNCLE MONEYBAGS in any position starts the ADVANCE TO BOARDWALK GAME. Player starts on 'GO'. A random number shown on the display will move the player around the board. Player collects the displayed coins on each space landed upon. Player continues accumulating coins until the player lands on a 'GAME OVER SPACE', or has been awarded the '6th PASS GO' BONUS. Drawing a 'GO TO JAIL' CARD from CHANCE or COMMUNITY CHEST will send the player to the 'IN JAIL' space, ENDING the BONUS BOARD GAME. GOING TO JAIL does not award 'PASS GO' Bonuses. CHANCE and COMMUNITY CHEST board squares award 5–50 credits. Mystery blanks combination start the Advance to Boardwalk Game. PASS GO SIX TIMES AND WIN OVER 2,100 COINS.

Figure 17:
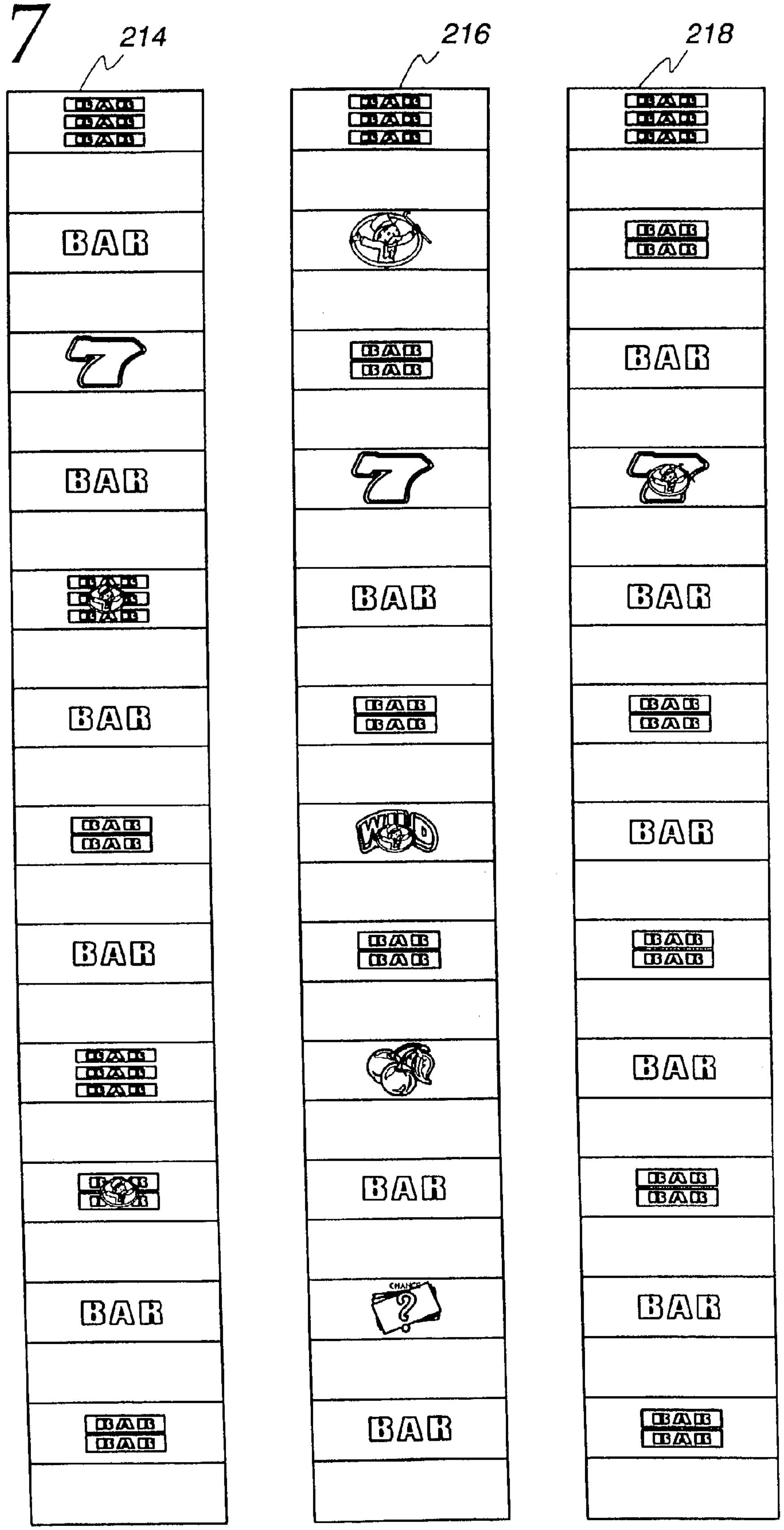
FIG. 17 is an illustration of three reel strips associated with a basic game which may be implemented on the gaming machine of FIG. 14.

FIG. 17 shows a set of reel strips for use with the slot machine 210 to implement the MONOPOLY ADVANCE TO BOARDWALK™ game. The reel strips correspond to the reels 214, 216, 218 in FIG. 14 and will be identified by corresponding reference numerals 214, 216, 218. Each of the reel strips 214, 216, 218 include twenty-four symbols (including blanks) corresponding to twenty-four available reel stopping positions. The symbols include WILD, SEVEN, CHANCE, 3-BAR, 2-BAR, 1-BAR, BLANK and CHERRY which, if displayed in certain predefined combinations relative to payline 22, define the standard and surprise winning combinations. Three of the BLANK symbols on each reel define mystery blanks which, if aligned on the payline, will trigger a "surprise" winning outcome Also shown on the reel strips 214,216,218 are small RICH UNCLE PENNYBAGS (hereinafter "PENNY") symbols which are displayed on top of (and thereby share the same reel stopping position as) some of the other symbols. In one embodiment, the PENNY symbols do not form the basis of standard winning combinations in the basic game define start-bonus combination(s), if displayed in scatter-pay format on the reels 214, 216, 218.

Specifically, the symbols which appear on reel strip 214 include, in sequence 3-BAR, Blank, 1-BAR, Blank, SEVEN, Blank, 1-BAR, Blank, 3-BAR/PENNY, Blank, 1-BAR, Blank, 2-BAR, Blank, 1-BAR, Blank, 3-BAR, Blank, 2-BAR/PENNY, Blank, 1-BAR, Blank, 2-BAR and Blank. The symbols which appear on reel strip 216 include, in sequence, 3-BAR, Blank, Blank/PENNY, Blank, 2-BAR, Blank, SEVEN, Blank, 1-BAR, Blank, 2-BAR, Blank, WILD/PENNY, Blank, 2-BAR, Blank, CHERRY, Blank, 1-BAR, Blank, CHANCE, Blank, 1-BAR and Blank.

Finally, the symbols which appear on reel strip 218 include, in sequence, 3-BAR, Blank, 2-BAR, Blank, 1-BAR, Blank, SEVEN/PENNY, Blank, 1-BAR, Blank, 2-BAR, Blank, 1-BAR, Blank, 2-BAR, Blank, 1-BAR, Blank, 2-BAR, Blank, 1-BAR, Blank, 2-BAR and Blank.

combination of three "2-BAR" symbols, corresponding to the number of coins played. In one embodiment, the "CHANCE" symbol acts as a wildcard for "SEVEN" and "BAR" combinations and also triggers the CHANCE bonus feature (to be described later) if it is in a winning combi-

TABLE C-1

Pay Table for ADVANCE TO BOARDWALK Basic Game

| | | | 1st COIN | 2nd COIN | 3rd COIN | 4th COIN |
|---|---|---|---|---|---|---|
| SEVEN | WILD | SEVEN | 200 | 400 | 1000 | 3 RICH UNCLE PENNYBAGS in |
| SEVEN | SEVEN | SEVEN | 70 | 140 | 210 | any position |
| 3BAR | 3BAR | 3BAR | 40 | 80 | 120 | starts the ADVANCE TO |
| 2BAR | 2BAR | 2BAR | 20 | 40 | 60 | BOARDWALK bonus game. |
| 1BAR | 1BAR | 1BAR | 10 | 20 | 30 | (further disclaimers below) |
| anyBAR | anyBAR | anyBAR | 5 | 10 | 15 | |
| — | CHERRY | — | 2 | 4 | 6 | |
| — | WILD | — | 1 | 2 | 3 | |

Table C-1 is a pay table identifying various winning combinations of symbols in the MONOPOLY ADVANCE TO BOARDWALK™ game. The winning combinations include various standard symbol combinations (e.g., SEVEN, WILD, SEVEN) and start-bonus combinations (e.g., "Three Rich Uncle Pennybags Starts the Advance to Boardwalk Bonus Game). In one embodiment, the game accepts from one to four coins. The winning standard combinations can occur for any number of one to four coins played if the indicated symbols are displayed on reels 214, 216, 218 in alignment with the center payline 276. For example, three "1-BAR" symbols displayed on reels 214, 216, 218 on the center payline 276 is a standard winning combination which will pay 10 credits for 1 coin played, 20 credits for 2 coins played and 30 credits for 3 or 4 coins played. The "Any Bar" combination is satisfied by any combination of three or more "1-BAR," "2-BAR" and "3-BAR" symbols stopping on the center payline 276.

In one embodiment, the "WILD" symbol acts as a wildcard for all of the BAR combinations. Thus, for example, the combination of "2-BAR," "WILD" and "2-BAR" is a standard winning combination which would pay the same as the nation. Thus, for example, the combination of "2-BAR," "CHANCE" and "2-BAR" is a standard winning combination which would pay the same as the combination of three "2-BAR" symbols, corresponding to the number of coins played and also is a start-bonus combination which starts the CHANCE bonus feature.

In one embodiment, if the player wagers 4 coins, and if three Rich Uncle Pennybags ("PENNY") symbols are displayed in scatter-pay format on reels 214, 216, 218, the game starts the ADVANCE TO BOARDWALK bonus feature (to be described later). In the scatter-pay format, the PENNY symbols are not required to be aligned with the center payline 276. Rather, the ADVANCE TO BOARDWALK bonus starts if reel 214 displays PENNY in either of the upper, center or lower display positions, reel 216 displays PENNY in either of the upper, center or lower display positions (which need not correspond to the display position of PENNY on reel 214) and reel 218 displays PENNY in either of the upper, center or lower display positions (which need not correspond to the display positions of PENNY on reels 214 or 216).

TABLE C-2

ADVANCE TO BOARDWALK Pay Information

| Pays | Pay/1Coin | Pay/2Coin | Pay/3Coi | Pay/4Coin | 1–3 prob | 4cn prob |
|---|---|---|---|---|---|---|
| non-win | 0 | 0 | 0 | 0 | 0.83775 | 0.82928 |
| 1 Wild | 1 | 2 | 3 | 3 | 0.03284 | 0.03154 |
| 1 Cherry | 2 | 4 | 6 | 6 | 0.04167 | 0.04167 |
| anybar | 5 | 10 | 15 | 15 | 0.06496 | 0.06496 |
| 1 Bars | 10 | 20 | 30 | 30 | 0.00904 | 0.00904 |
| anybar/Ch | 16.75385 | 33.50769 | 50.26154 | 50.26154 | 0.00564 | 0.00564 |
| 2 Bars | 20 | 40 | 60 | 60 | 0.00434 | 0.00434 |
| 1 Bar/Ch | 29.50385 | 59.00769 | 88.51154 | 88.51154 | 0.00181 | 0.00181 |
| 3 Bars | 40 | 80 | 120 | 120 | 0.00043 | 0.00043 |
| 2 Bar/Ch | 55.00385 | 110.0077 | 165.0115 | 165.0115 | 0.00109 | 0.00109 |
| Sevens | 70 | 140 | 210 | 210 | 7.2E–05 | 7.2E–05 |
| 3 Bar/Ch | 106.0038 | 212.0077 | 318.0115 | 318.0115 | 0.00022 | 0.00022 |
| Seven/Ch | 182.5038 | 365.0077 | 547.5115 | 547.5115 | 7.2E–05 | 7.2E–05 |
| 7-Wild-7 | 200 | 400 | 1000 | 1000 | 7.2E–05 | 7.2E–05 |
| | | | 1st to 3rd coin totals: | | Hit Rate 0.16225 | |
| Uncles | 0 | 0 | 0 | 98.41212 | | 0.00781 |
| Surprise | 0 | 0 | 0 | 98.41212 | | 0.00195 |
| | | | | 4th Coin totals: | | Hit Rate 0.17072 |

TABLE C-2-continued

| | | | | Pay/4Coin<br>2100+ | | 4cn<br>prob<br>1.3E−05 |
|---|---|---|---|---|---|---|
| **Pays** | **1 cn EV** | **2 cn EV** | **3 cn EV** | **4cn EV** | **4th coin Pulls/Hit** | **Mx.Contr** |
| non-win | 0 | 0 | 0 | 0 | 1.205862 | 0 |
| 1 Wild | 0.032841 | 0.032841 | 0.032841 | 0.023655 | 31.70642 | 0.025693 |
| 1 Cherry | 0.083333 | 0.083333 | 0.083333 | 0.0625 | 24 | 0.067885 |
| anybar | 0.324797 | 0.324797 | 0.324794 | 0.243598 | 15.39421 | 0.264587 |
| 1 Bars | 0.090422 | 0.090422 | 0.090422 | 0.067817 | 110.592 | 0.07366 |
| anybar/Ch | 0.094531 | 0.094531 | 0.070898 | 0.070898 | 177.2308 | 0.077007 |
| 2 Bars | 0.086806 | 0.086806 | 0.086806 | 0.065104 | 230.4 | 0.070714 |
| 1 Bar/Ch | 0.053356 | 0.053356 | 0.053356 | 0.040017 | 552.96 | 0.043465 |
| 3 Bars | 0.017361 | 0.017361 | 0.017361 | 0.013021 | 2304 | 0.014143 |
| 2 Bar/Ch | 0.059683 | 0.059683 | 0.059683 | 0.044762 | 921.6 | 0.048619 |
| Sevens | 0.005064 | 0.005064 | 0.005064 | 0.003798 | 13824 | 0.004125 |
| 3 Bar/Ch | 0.023004 | 0.023004 | 0.023004 | 0.017253 | 4608 | 0.01874 |
| Seven/Ch | 0.013202 | 0.013202 | 0.013202 | 0.009901 | 13824 | 0.010755 |
| 7-Wild-7 | 0.014468 | 0.014468 | 0.024113 | 0.018084 | 13824 | 0.019643 |
| | Coin 1% | Coin 2% | Coin 3% | | Pulls/Hit | |
| | 0.898869 | 0.898869 | 0.908514 | | 6.163174 | |
| Uncles | | | | 0.192211 | 128 | 0.208772 |
| Surprise | | | | 0.048053 | 512 | 0.052193 |
| | | | | Coin 4% | Pulls/Hit | |
| | | | | 0.920673 | 5.857627 | |
| | | | | | Pulls/Hit | |
| | | | | | 79701.54 | |

Table C-2 summarizes payoffs, probabilities and expected values associated with various combinations of the ADVANCE TO BOARDWALK™ game. The combinations are designated, in order of appearance: "non-win," "1 Wild," "1 Cherry," "anybar," "1 Bars," "anybar/Ch," "2 Bars," "1 Bar/Ch," "3 Bars," "2 Bar/Ch," "Sevens," "3 Bar/Ch," "Seven/Ch," "7-Wild-7," "Uncles" and "Surprise."

The "Pay/1 Coin," "Pay/2 Coin," "Pay/3 Coin" and "Pay/4 coin" columns identify payoff amounts associated with the respective combinations in Table C-2. In the case of the standard winning combinations, the payoff amounts are predetermined amounts stored in system memory. For example, the "1 Cherry" combination is a standard winning combination which will award 2 coins or credits in a 1-coin game, 4 coins or credits in a 2-coin game and 6 coins or credits in a 3- or 4-coin game.

In the case of the "start-bonus" combinations, the payoff amounts represent average payoff amounts which may be expected in the bonus game. For example, the "anybar/Ch" combination (i.e., a winning "anybar" combination with a CHANCE wildcard symbol) will start the CHANCE bonus and will pay, on average, 16.75 coins or credits in a 1-coin game, 33.5 coins or credits in a 2-coin game and 50.26 coins or credits in a 3- or 4-coin game. The "Uncles" and "Surprise" combinations represent combinations of RICH UNCLE PENNYBAGS ("PENNY") symbols and mystery blank symbols which trigger the ADVANCE TO BOARDWALK bonus. Both of these combinations are available only with 4 coins played and will pay, on average 98.4 coins or credits.

The "1–3 prob" column identifies the probabilities of hitting the various outcomes of Table C-2 associated with a 1-coin, 2-coin and 3-coin game in a single spin. The "4 cn prob" column identifies the probabilities of hitting the various outcomes of Table C-2 associated with a 4-coin game in a single spin. Where the reels each have twenty-four reel stop positions, as in the ADVANCE TO BOARDWALK™ game, there are 13,824 (24×24×24) possible symbol combinations. The probability of hitting any particular combination in a single spin is determined by dividing the number of possible "hits" associated with that combination (which is a function of the number of reel positions of the symbols supporting that combination) by the total number of possible combinations (i.e., 13,824). For example, consider the "7-Wild-7" combination. Because there is only one SEVEN symbol on reel 214, one WILD symbol on reel 216 and one SEVEN symbol on reel 218, there is only one "hit" associated with that combination. The probability of hitting that combination is therefore $7.2\times10^{-5}$ (i.e. 1÷13,824). In a 4-coin game, the probability of hitting an "Uncles" combination is 0.00781 and the probability of hitting a "Surprise" combination is 0.00195.

The "1 cn EV," "2 cn EV," "3 cn EV" and "4 cn EV" columns identify the normalized expected values of the outcomes of Table C-2 for a 1-coin game, 2-coin game, 3-coin game and 4-coin game, respectively. These values are computed for each outcome by taking the product of the pay value (or average pay value) associated with that outcome and the probability associated with that outcome, then dividing by the number of coin(s) played. Thus, for example, the "Sevens" outcome has a 1-coin expected value of 0.005064 ($70\times7.2\times10^{-5}\div1$), a 2-coin expected value of 0.005064 ($140\times7.33\ 10^{-5}\div2$), a 3-coin expected value of 0.005064 ($210\times7.2\times10^{-5}\div3$) and a 4-coin expected value of 0.003798 ($210\times7.2\times10^{-5}\div4$). The "Uncles" outcome has a 4-coin expected value of 0.192211 (98.41212×0.00781÷4) and the "Surprise" outcome has a 4-coin expected value of 0.048053 (98.41212×0.00195÷4).

The payout rate of the basic game is computed independently for a 1-coin, 2-coin, 3-coin and 4-coin game by summing the normalized expected values in the respective "1 cn EV," "2 cn EV," "3 cn EV" and "4 cn EV" columns. In the embodiment shown in Table C-2, the payout rates for a 1-coin and 2-coin game are 0.898869 (89.89%), the payout rate for a 3-coin game is 0.908514 (90.85%) and the payout rate for a 4-coin game is 0.920673 (92.07%).

The "4th coin Pulls/Hit" column indicates how many pulls, on average, would be expected to hit the respective combinations in a 4-coin game. This is computed by taking the inverse of the probability values associated with a 4-coin game.

The "Max Contribution" column indicates, for a 4-coin game, the percentage contribution of the respective "4 cn EV" values to the total payout rate for a 4-coin game. Thus, for example, for the "Uncles" outcome, the contribution is 20.88% (0.192211÷0.920673). The remaining "Max Contribution" values are computed in similar fashion.

The CHANCE Bonus Feature

In the MONOPOLY ADVANCE TO BOARDWALK™ game, if the "CHANCE" symbol is displayed on the payline and is included in a basic winning combination, the CHANCE bonus game begins. In one embodiment, there is only one "CHANCE" symbol on reel 216 (the center reel) and, according to the game rules, it matches only SEVENs and BARs on the payline, thus the combinations which would trigger the CHANCE bonus are: SEVEN, CHANCE, SEVEN; 3 BAR, CHANCE, 3 BAR; 2 BAR, CHANCE, 2 BAR; 1 BAR, CHANCE, 1 BAR; and ANYBAR, CHANCE, ANYBAR.

The Chance bonus game can be activated by playing from one-four coins. In one embodiment, the CPU 270 sets up the CHANCE bonus game by first selecting, from a weighted table, one of several possible sets of selection elements. Generally, the sets of selection elements comprise a combination of multiplier values and/or fixed coin amounts. The magnitude of the respective multiplier values and/or fixed coin amounts are unique to each particular set of selection elements. The selection elements themselves may be varied according to the game program. In one embodiment, each set includes 10 selection elements but otherwise the numbers and/or values of multipliers and fixed coin awards may be varied from set to set. For example, one of the sets of selection elements might include 2×, 3×, 4×, 5× and 10× multipliers, and 2, 5, 10, 20, and 25 coin awards, whereas another set might include 2×, 3×, 4×, 5× and 10× multipliers and 5, 10, 25, 50 and 100 coin awards. Still another set might include 2×, 3×, 5× and 1033 multipliers and 2, 5, 10, 25, 50 and 100 coin awards.

Figure 18:
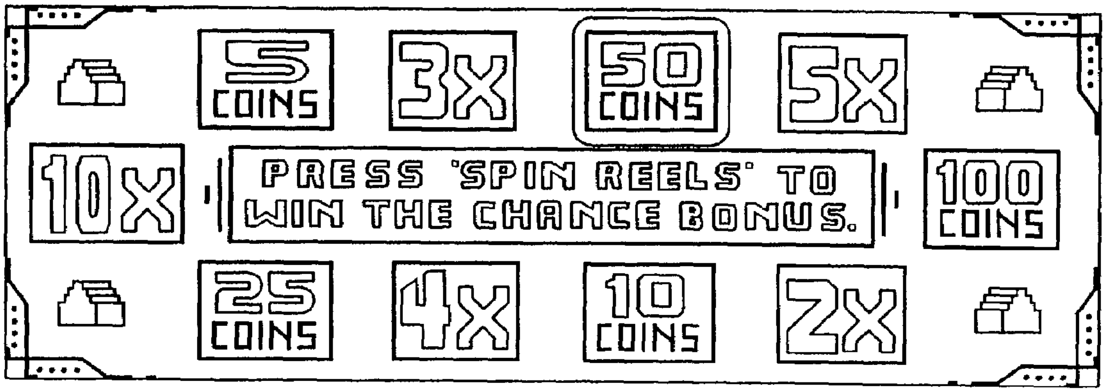
FIG. 18 is an illustration of a CHANCE bonus screen which may appear on the dot matrix display of the gaming machine of FIG. 14.

In one embodiment, as shown in FIG. 18, the CPU 270 causes the selected set of selection elements to be displayed on the graphics display 212 in roughly an oval shape around a center area where messages are displayed. In the illustrated embodiment, the message area prompts the player to "PRESS 'SPIN REELS' TO WIN THE CHANCE BONUS." From the display screen shown in FIG. 18, the CHANCE bonus is initiated by the player pressing the "Spin Reels" button or pulling a lever (not shown). The CPU 270 then operates according to its game program (stored in system memory 286) to randomly select one of the selection elements from the set. In one embodiment, the various selection elements have generally different probabilities of being selected, as determined by a table stored in system memory 286. In one embodiment having a set of selection elements including 2×, 3×, 4×, 5× and 10× multipliers and 2, 5, 10, 20 and 25 coin awards, the probabilities of selecting the respective selection elements are: 0.219231 for the 2× multiplier; 0.153846 for the 3× multiplier; 0.061538 for the 4× multiplier; 0.053846 for the 5× multiplier; 0.069231 for the 10× multiplier; 0.126923 for the 2 coin award; 0.138462 for the 5 coin award; 0.076923 for the 10 coin award; 0.042308 for the 20 coin award; and 0.057692 for the 25 coin award.

In one embodiment, the selection of the CHANCE bonus award element is depicted on the graphic display 212 by highlighting, one at a time, consecutive selection elements in a clockwise sequence, quickly at first and then slowing down and stopping to reveal the selected award element, which might be a fixed coin amount or a multiplier. At this point, the message area will display the total amount of coins or credits won. For example, if the award from the basic game reels was 10 credits, and the highlight stopped on a 25 Coin amount, the message area will contain "10+25=35 COINS". If, however, the award from the basic game reels was 10 credits, and the highlight stopped on a 4× multiplier, the message area will contain "10×4=40 COINS". The game would then total the amount won on the win meter and show a total screen on the display 112 announcing how many coins were won in the CHANCE bonus game. If the amount won is over the selected handpay level, a jackpot display and animation will then be shown on the display 112. In one embodiment, after the amount won is credited or payed out, the CHANCE bonus feature ends and the game returns to the basic game.

In one embodiment of a 4-coin game, the coin awards are multiplied by two for two coins bet and multiplied by three for three or four coins were bet. The fourth coin allows the player the opportunity to play the MONOPOLY ADVANCE TO BOARDWALK™ bonus game and does not increase the value of the CHANCE bonus.

The ADVANCE TO BOARDWALK™ Bonus Game

In one embodiment, the CPU 270 enters the ADVANCE TO BOARDWALK™ bonus game when the player is betting four coins and a special "start-bonus" combination of three RICH UNCLE PENNYBAGS ("PENNY") symbols occurs on the reels 214, 216, 218, in scatter-pay format, in the basic game. As described earlier, scatter-pay format means that the scatter pay symbols (e.g., "PENNY" symbols in the ADVANCE TO BOARDWALK™ game) may be displayed in either the upper, lower or center position on the respective reels.

The ADVANCE TO BOARDWALK™ bonus game has a board-game (e.g., MONOPOLY) theme and is implemented on the top box game board 262 and graphics display 212. Upon initially entering the bonus game, the CPU 70 causes an introductory animation to be displayed on the graphics display 212 with an audio fanfare and then signals I/O controller 271 to illuminate the GO square on the top box MONOPOLY board 262. The player is prompted to spin the reels to to play the bonus game. Then, in one embodiment, the CPU 270 operates to select an integer-value movement indicator and causes the selected movement indicator to be displayed on the graphics display 212.

In one embodiment, the movement indicator is not immediately shown on the graphics display 212 but is revealed slowly so as to heighten the player's anticipation of the indicator. In one embodiment, the graphics display 212 shows the movement indicator on a display field which is intentionally fuzzy or cloudy at first, so as to "hide" the indicator but which is slowly cleared up to reveal the selected indicator. In one embodiment of the MONOPOLY ADVANCE TO BOARDWALK™ game, for example, the graphics display shows an animation of a Rich Uncle Pennybags character seated at a desk-type "control panel." A message area on the control panel includes an animated computer or television-type monitor adapted to reveal the selected indicator. The monitor is filled with "static" at first so as to obscure the movement indicator. For example, the message area on the control panel might read, "YOU MOVE [blank] SPACES," where the blank is filled in by the number to be displayed on the monitor. After a short time, the Rich Uncle Pennybags character twiddles dials and levers on the control board to clear up the static and reveal the selected indicator. At this point, for example, the message area might read "YOU MOVE [7] SPACES," where the "7" is displayed on the animated monitor.

In one embodiment, the movement indicator (e.g., "7") identifies an amount of spaces, from two to twelve, which the token will be moved from its previous position on the game board, in much the same manner as would a roll of dice. In one embodiment, the CPU 270 selects the movement indicator pseudo-randomly, that is, certain indicator values might occur more frequently than other indicator values, depending on the space the player is presently "on." For example, the CPU 270 might be more likely to select a movement indicator of "7" if the player were on INDIANA AVENUE (thus landing the player on GO TO JAIL), than if the player were on ILLINOIS AVENUE. In one embodiment, a plurality of movement tables is stored in game memory, wherein each movement table corresponds to a particular square of the MONOPOLY board. The CPU 270 selects, from the movement table corresponding to present space, a movement indicator by first picking a random number, then consulting the movement table to determine the movement indicator corresponding to the random number.

In one embodiment, the movement tables define, for each square, a number of occurrences of each possible outcome from two to twelve. For example, one movement table might define a set of 46 possible occurrences, including 2 occurrences associated with a movement of 2 spaces, 2 occurrences associated with a movement of 3 spaces, 3 occurrences associated with a movement of 4 spaces, 5 occurrences associated with a movement of 5 spaces, 8 occurrences associated with a movement of 6 spaces, 6 occurrences associated with a movement of 7 spaces, 5 occurrences associated with a movement of 8 spaces, 7 occurrences associated with a movement of 9 spaces, 6 occurrences associated with a movement of 10 spaces, 1 occurrence associated with a movement of 11 spaces and 1 occurrence associated with a movement of 12 spaces.

The CPU 270 might select a movement indicator from the example table by selecting a random number from one to 46, then stepping through each occurrence until it finds the movement indicator corresponding to that random number. For example, for the example movement table above, a random number of 5 might indicate that the selected movement indicator would be "4," since the first two "step throughs" are 2, the next two "step throughs" are 3 and the fifth step ends on an indicator of 4.

After the selection of a movement indicator number and display of the indicator on the graphics display 212, the CPU 270 operates to illuminate, one space at a time, the appropriate squares on the game board 262 (e.g., MONOPOLY board) from the previous position to the position determined by the movement indicator.

In one embodiment, when the lights stops moving for each roll, an animated character icon (e.g., Rich Uncle Pennybags) on the graphics display 212 announces the name of the square landed on and the amount of coins or credits, if any, associated with the square. In one embodiment, the bonus game continues with consecutive selections of movement indicators, and corresponding movement around the game board, until the player "lands" on a designated square which ends the bonus game. In one embodiment, the CPU 270 will end the bonus game if the player lands on the IN JAIL, INCOME TAX or LUXURY TAX squares, otherwise will continue the bonus game.

Figure 19:
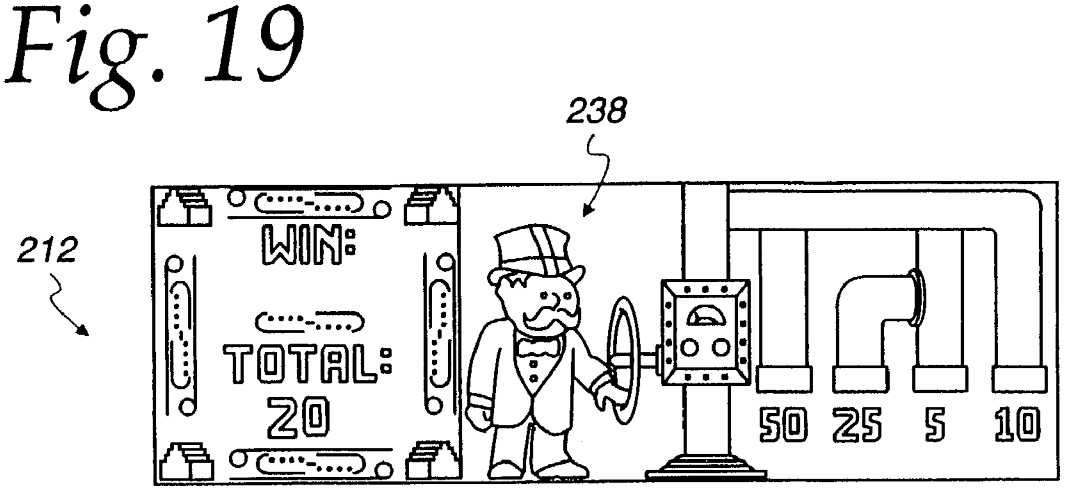
FIG. 19 is an illustration of a WATER WORKS screen which may appear on the dot matrix display of the gaming machine of FIG. 14.
Figure 20:
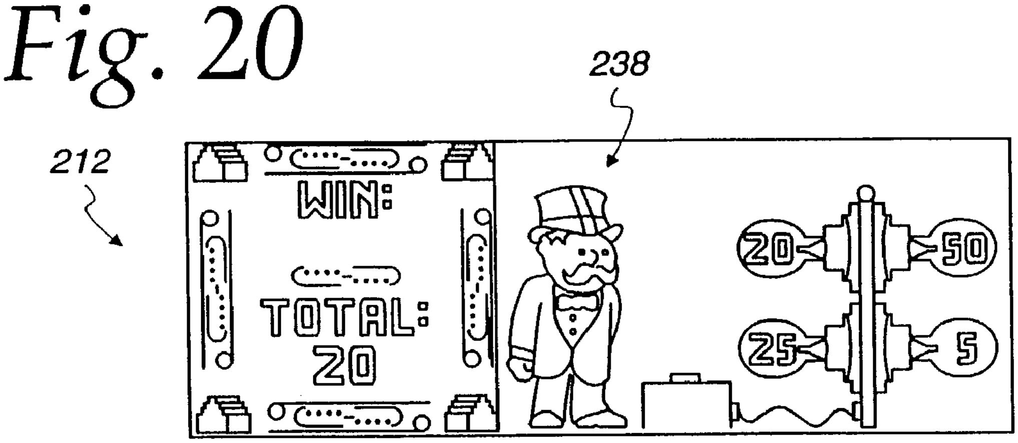
FIG. 20 is an illustration of an ELECTRIC COMPANY screen which may appear on the dot matrix display of the gaming machine of FIG. 14.
Figure 21:
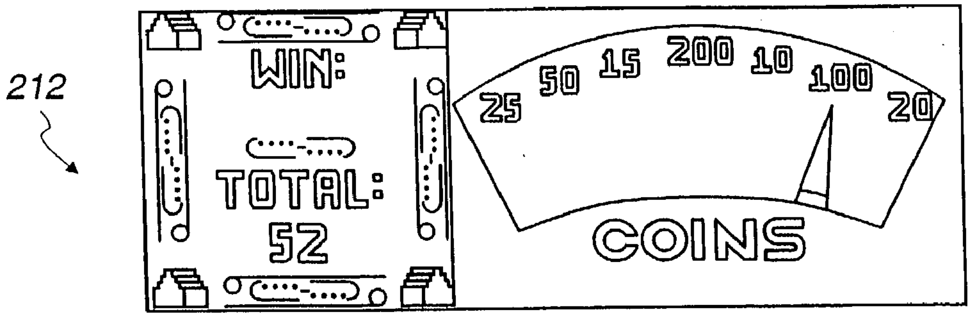
FIG. 21 is an illustration of a FREE PARKING screen which may appear on the dot matrix display of the gaming machine of FIG. 14.

If the player lands on an ELECTRIC COMPANY, WATER WORKS or FREE PARKING square during the bonus round, the CPU 270 selects a win amount from a plurality of possible win amounts associated with the square. In one embodiment, the CPU 270 triggers an appropriate animation on the graphics display 212 to illustrate the selection of a win amount. FIGS. 19, 20 and 21, show exemplary displays which might occur in response to the player landing on WATER WORKS, ELECTRIC COMPANY or FREE PARKING, respectively.

Generally, each of the WATER WORKS, ELECTRIC COMPANY and FREE PARKING displays show a preselected award value and a number of other, different values at various graphical locations. The display animation appears to "select" an award value, which has already been pre-selected by the CPU 270, by pointing to the pre-selected value or "erasing" the other values. In FIG. 19 (WATER WORKS), for example, there are four possible award values (e.g., 5, 10, 25 and 50) displayed at four graphical locations (e.g., underneath four pipes). An animated Rich Uncle Pennybags character turns a valve, causing water to come out of one of the pipes and "wash away" the underlying displayed value. He will do this three times, causing three of the award values to be "washed away," and the player will be awarded the remaining award value. In FIG. 20 (ELECTRIC COMPANY), there are four possible award values (e.g., 5, 20, 25 and 50) displayed on four light bulbs. An animated Rich Uncle Pennybags character presses a button, causing one of the light bulbs to light up then explode, so as to erase the award value associated with the exploded bulb. As in FIG. 19, he will do this three times, causing three of the award values to be erased, and the player will be awarded the remaining award value. In FIG. 21 (FREE PARKING), there are seven possible award values (e.g., 10, 15, 20, 25, 50, 100 and 200) displayed on an animated parking meter. A pointer in the parking meter moves back and forth, then slowly comes to a stop so as to point to one of the award values, and the player is awarded the indicated award value.

In one embodiment, the indicated award values for the ELECTRIC COMPANY, WATER WORKS and FREE PARKING squares are pre-selected by the CPU 270 from weighted tables of award values stored in game memory. The CPU 270 selects, from the award table corresponding to the ELECTRIC COMPANY, WATER WORKS or FREE PARKING space, an award by first picking a random number, then consulting the appropriate award table to determine the award corresponding to the random number.

Suppose, for example, an ELECTRIC COMPANY square has five possible awards: 5, 10, 20, 25 or 50 coins. An award table associated with the ELECTRIC COMPANY square might define a set of eight possible occurrences of the various awards: 2 occurrences associated with an award of 5 coins, 2 occurrences associated with an award of 10 coins, 2 occurrences associated with an award of 20 coins, 1 occurrence associated with an award of 25 coins and 1 occurrence associated with an award of 50 coins. The CPU 270 might select an award from the award table by selecting a random number from one to 8, then stepping through each occurrence until it finds the award corresponding to that random number. Continuing the above example, a random number of 5 might indicate that the selected award would be 20 coins, since the first two "step throughs" are 5 coins, the next two "step throughs" are 10 coins and the next step ends on an award of 20 coins.

Similarly, suppose the FREE PARKING square has seven possible awards: 10, 15, 20, 25, 50, 100 and 200 coins. An award table associated with the FREE PARKING square might define a set of nine possible occurrences of the various awards: 1 occurrence associated with an award of 10 coins, 1 occurrence associated with an award of 15 coins, 2 occurrences associated with an award of 20 coins, 2 occurrences associated with an award of 25 coins, 1 occurrence associated with an award of 50 coins, 1 occurrence associated with an award of 100 coins and 1 occurrence associated with an award of 200 coins. The CPU 270 might select an award from the award table by selecting a random number from one to 9, then stepping through each occurrence until it finds the award corresponding to that random number. Continuing the above example, a random number of 5 might indicate that the selected award would be 25 coins, since the first "step through" is 10 coins, the next "step through" is 15 coins, the next two "step throughs" are 20 coins and the next step ends on an award of 25 coins.

If the player lands on CHANCE or COMMUNITY CHEST, the CPU 270 triggers an animation on graphics display 212 which shows the top card of a pile of cars flipping up to reveal the "Chance" or "Community Chest" outcomes. The art on the cards resembles the cards in an actual MONOPOLY™ game. Generally, the "Chance" and "Community Chest" outcomes comprise awards of fixed coin values (e.g., "BANK PAYS YOU DIVIDEND OF 25 COINS), or move the player to a new space (e.g., ADVANCE TO NEAREST RAILROAD). If the player is moved to a property, the movement is indicated on the top box board 262 and an animation associated with the property is shown on the graphics display 212.

If the player draws a GO TO NEAREST UTILITY card, the light will move to either ELECTRIC COMPANY or WATER WORKS clockwise (whichever is nearest). In one embodiment, if movement to the nearest utility causes the player to pass GO, the player will be awarded a "passing GO bonus," in addition to the award, if any, associated with the nearest utility.

If the player draws a GO TO JAIL card, the game will play an animation of RICH UNCLE PENNYBAGS going to jail, and the light will quickly move counter-clockwise to the IN JAIL space. If the player stops on LUXURY TAX, INCOME TAX or IN JAIL, the display 212 will show an appropriate animation including a display of the total coins won in the bonus game. The CPU 270 will cause the payoff mechanism 288 to award coins or credits as appropriate, corresponding to the amount won in the bonus game and then return to the basic spinning reel game.

Figure 16B:
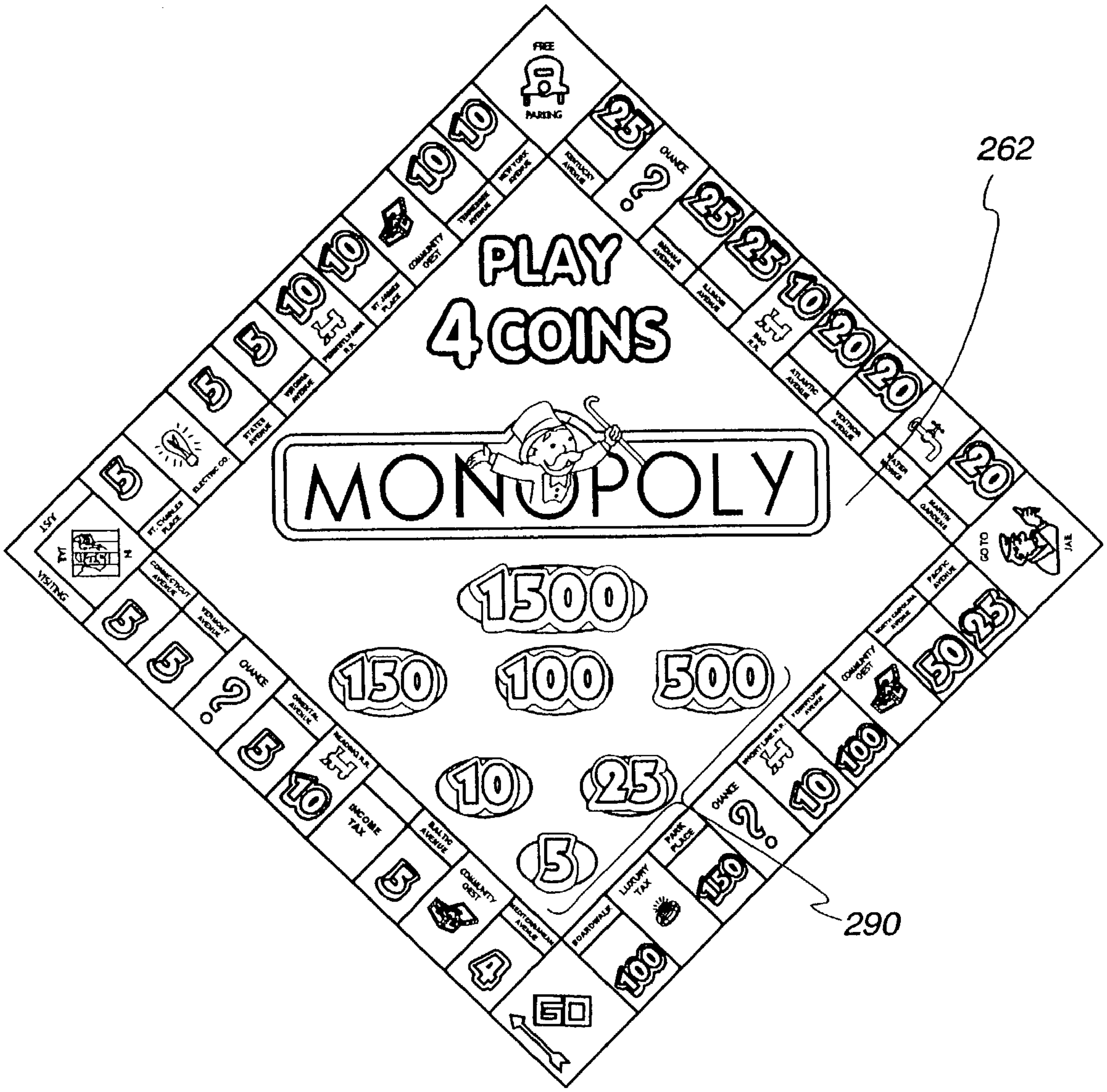
FIG. 16*b* shows a game board portion of the gaming machine of FIG. 14.

In one embodiment, a bonus is awarded whenever the player passes, or lands on, the GO square. As best observed in FIG. 16*b*, the bonuses are enumerated by a number of indicator lights 290 on the top box MONOPOLY board 262. In the illustrated embodiment, there are seven indicator lights associated with escalating 5, 10, 25, 100, 150, 500 and 1,500 coin bonuses. When the game begins, the player receives an automatic 5 coin bonus for being on GO and, accordingly, the 5 COIN indicator is lit on the board 262. If the player passes GO on his first cycle 1 around the board, the 10 COIN indicator will light, and the player will be awarded with 10 coins. If the player cycles around the board again, then the 25 COIN indicator will light, and the player will be awarded with 25 coins. If the player continues to pass GO a third, fourth, fifth and sixth time, the respective 100 COIN, 150 COIN, 500 COIN and 1500 COIN bonus indicators will become lit and the player will be awarded with 100 coins, 150 coins, 500 coins and 1500 coins respectively.

In one embodiment, the board may be cycled a maximum of six times. If a player successfully cycles the board six times, the bonus game will end and player will receive all accumulated awards, plus the 1500 coin bonus, plus the award, if any, associated with the final space. If the final space causes the player to move to another square (e.g., GO TO NEAREST UTILITY), the player will be awarded the bonus, if any associated with that other square. For example, suppose the player has completed five trips around the board and has accumulated 1754 coins or credits so far in the bonus game. Suppose further that the player is currently on PARK PLACE and Rich Uncle Pennybags selects a movement indicator of "5," causing the player to pass GO and land on the COMMUNITY CHEST square. The player will be awarded the 1500 coin bonus for passing GO the sixth time plus an amount associated with the COMMUNITY CHEST square. Continuing the example, suppose Rich Uncle Pennybags selects a COMMUNITY CHEST card of GO TO NEAREST UTILITY. The player will move to the next utility, ELECTRIC COMPANY, and will be awarded a selected value, say 25 coins. The bonus game will end after displaying, and then paying (in the present example), a win amount of 3279 coins (e.g., 1754+1500+25).

Figure 22:
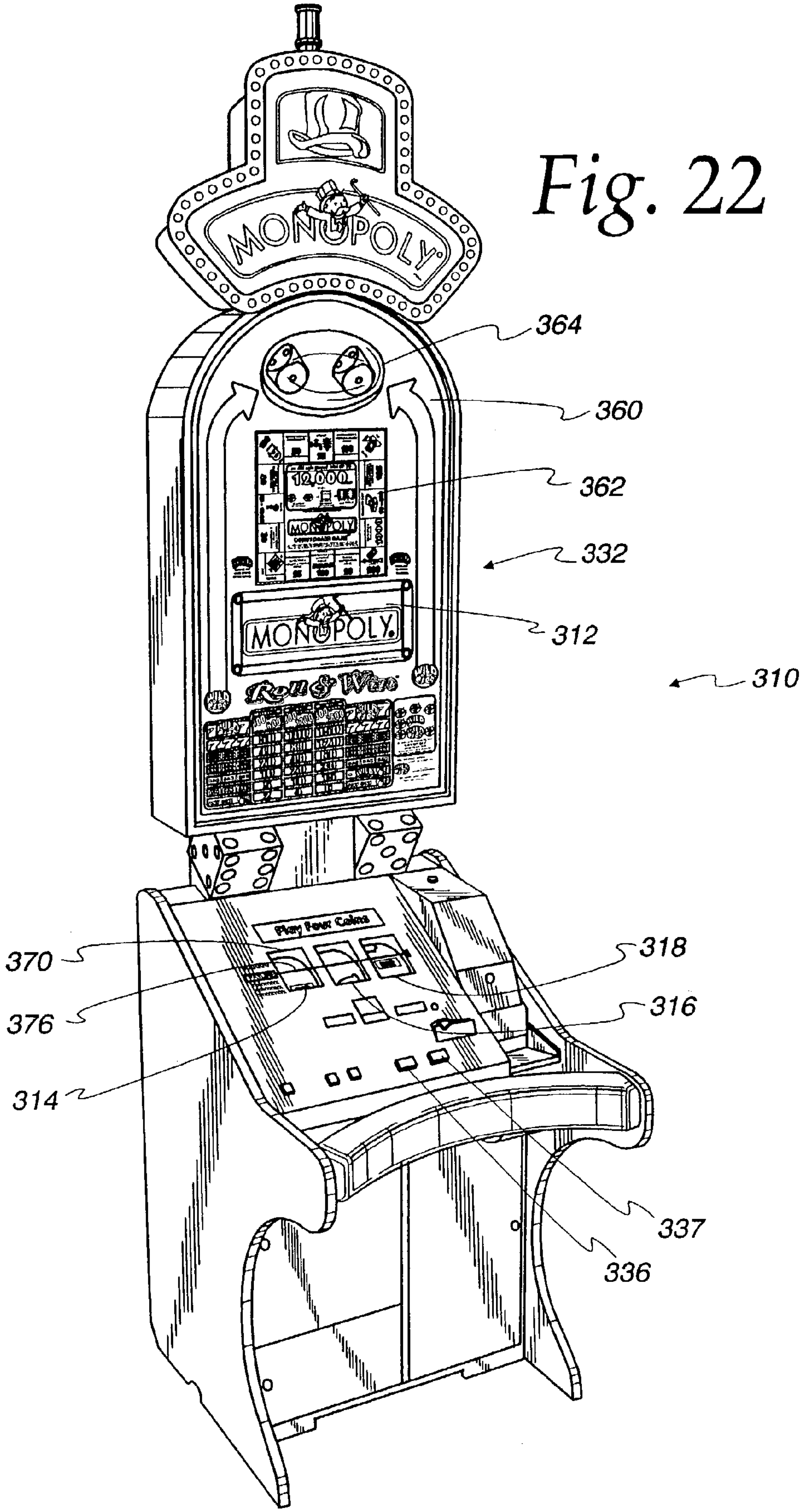
FIG. 22 is a perspective view of a spinning reel gaming machine with board game theme according to yet another embodiment of the present invention.

Now turning to FIG. 22, there is depicted another gaming machine 310 with a board game theme. In one embodiment, the gaming machine 310 is operable to play a game entitled MONOPOLY ROLL & WIN™, based on the MONOPOLY™ board game. MONOPOLY™ is a registered trademark owned by and used with permission by Hasbro, Inc. and Hasbro International, Inc., Pawtucket, R.I. Alternatively, the gaming machine 110 may be implemented with any of several other board game themes other than MONOPOLY™.

Figure 24:
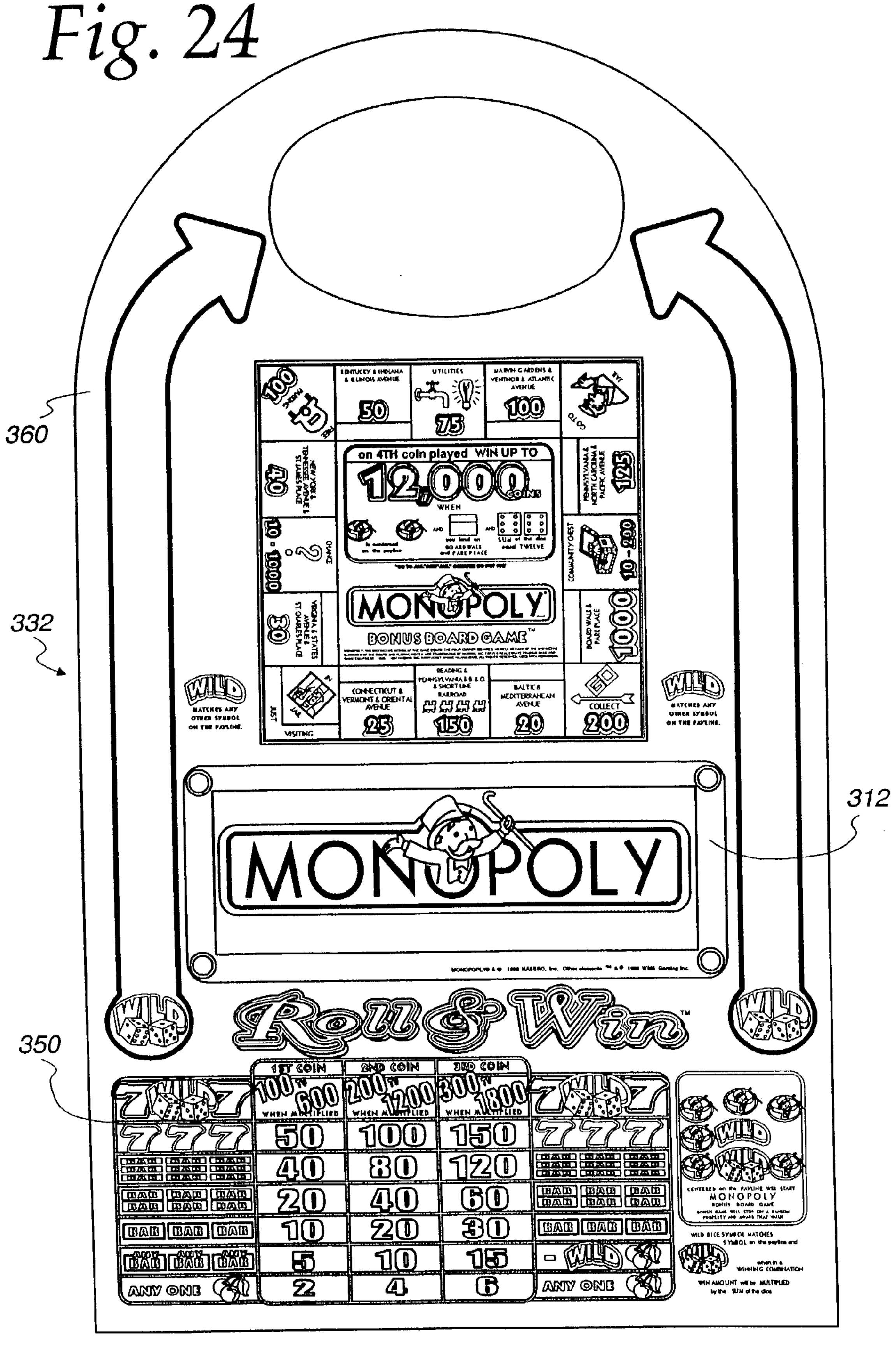
FIG. 24 shows a portion of the top box glass of the gaming machine of FIG. 22.

The gaming machine 310 includes a display window 370 through which a player may observe three mechanical reels, 314, 316 and 318. The gaming machine 310 includes a top box 332 which includes a graphics display 312, mechanical dice 364 and an adaptation of a game board 362 (e.g., MONOPOLY). The graphics display 312 may comprise a dot matrix, CRT, LED, LCD, electro-luminescent display or generally any type of video display known in the art. The game board 362 comprises a partially translucent material such as glass, plastic, Plexiglas or the like which is backlit by a number of lights 366 (not visible in FIG. 22) in the top box 332. As best observed in FIG. 24, the facing surface 360 of the top box is imprinted with various artwork, symbols and text associated with the MONOPOLY ROLL & WIN™ game, including a pay table 350.

Figure 23:
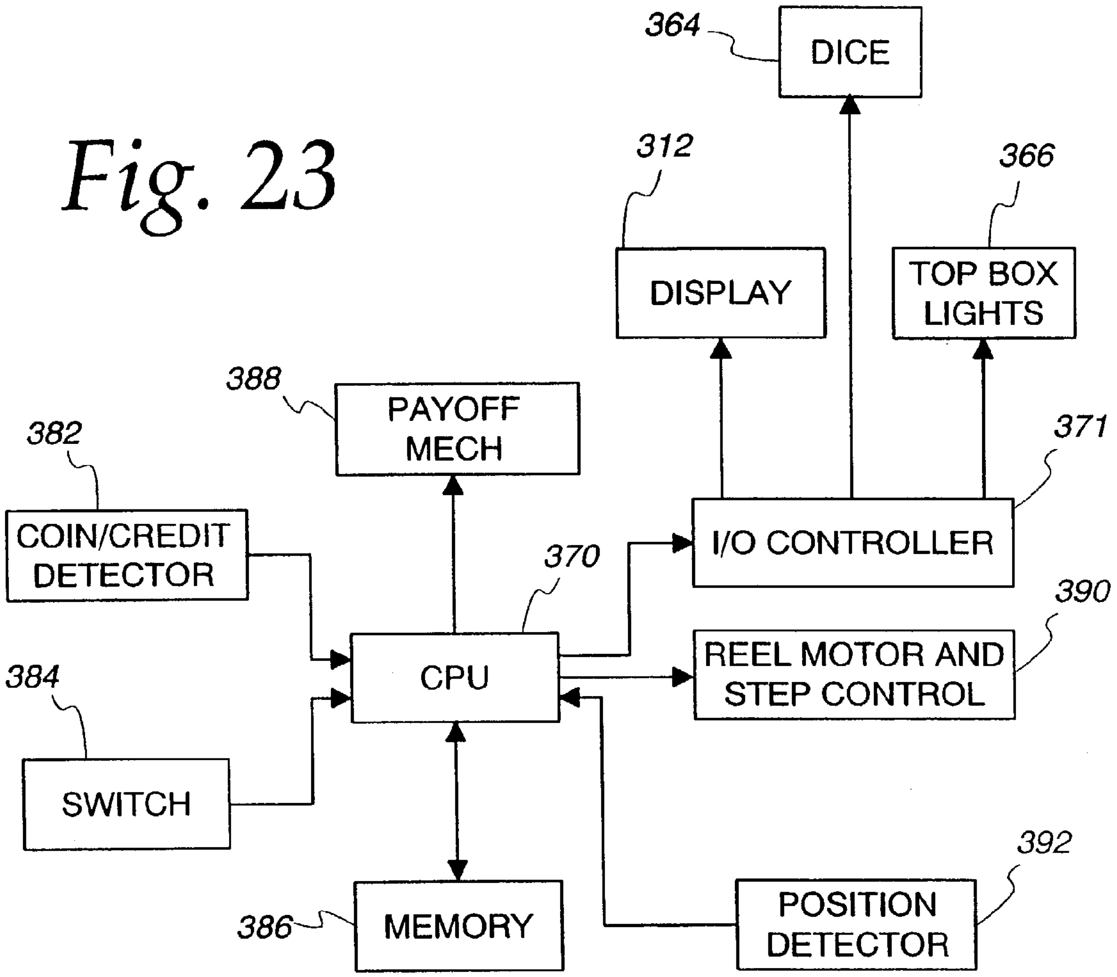
FIG. 23 is a block diagram of the gaming machine of FIG. 22.

FIG. 23 is a block diagram of a control system suitable for operating the slot machine 310 of FIG. 22. Coin/credit detector 382 signals a CPU 370 when a player has inserted a number of coins or played a number of credits. Then, after the player has activated a switch 384 (e.g., by pulling a lever or pushing a button), the CPU 370 initiates game play by setting reels 314, 316, 318 in motion, randomly selecting a game outcome and, using technology well known in the art, causes a reel motor and step controller 390 to stop the reels 314, 316, 318 at a stop position corresponding to the pre-selected game outcome. A rotational position detector 392 provides feedback to the CPU 370 to ensure that the reels 314, 316, 318 are stopped at the correct stop position. The symbols displayed on the reels at the preselected stop position define indicia of the pre-selected game outcome. In one embodiment, the symbols displayed on the reels define the basic game outcome.

A system memory 386 stores control software, operational instructions and data associated with the gaming machine 310. In one embodiment, the memory 386 comprises a separate read-only memory (ROM) and battery-backed random-access memory (RAM). However, it will be appreciated that the memory 386 may be implemented on any of several alternative types of memory structures or may be implemented on a single memory structure. A payoff mechanism 388 is operable in response to instructions from the CPU 370 to award a payoff of coins or credits to the player in response to certain winning combinations stored in memory 386. As will be described in detail hereinafter, the payoff amounts corresponding to certain combinations is predetermined according to a pay table stored in system memory 386. A separate I/O controller 371 coupled to the CPU 370 operates the graphics display 312, mechanical dice 364 and top box lights 366.

The gaming machine 310 is operable to play a basic game and a bonus game. In the embodiment of FIG. 22, the basic game is implemented on the three mechanical reels, 314, 316, 318 with a center payline 376. In one embodiment, the player can observe three symbol positions (e.g., an upper, center and lower display position) on each reel 314, 316, 318 thus defining a symbol group of nine symbols visible through the display window 370. Payline 376 extends through the center display position on each reel.

In one embodiment, the symbol group displayed on reels 314, 316, 318 may indicate any of three possible basic game outcomes, including (1) a standard winning outcome causing the CPU 370 to award the player a predetermined amount of coin(s) or credit(s) corresponding to a displayed pay table; (2) a multiplier bonus outcome (e.g., a ROLL THE DICE feature) causing the CPU 370 to award the player the product of a predetermined amount of coin(s) or credit(s) and a randomly determined multiplier; (3) a start-bonus outcome causing the CPU 370 to enter a bonus game (e.g., the ROLL & WIN bonus); and (4) a losing outcome causing the CPU 370 to continue operation in the basic mode without awarding any coin(s) or credit(s).

Generally, the standard winning outcomes are characterized by the display of one or more predefined combinations of symbols. The symbols and payoffs defining the standard winning combinations are stored in the game memory 386. In one embodiment, the symbols and payoffs defining the standard winning combinations are shown in the pay table 350 (FIG. 24) on the face of the slot machine 310 so that they may readily be observed by the player. Preferably, the symbols defining the ROLL THE DICE feature and ROLL & WIN bonus are also identified on the pay table or other portion(s) of the top box display 332.

Figure 25:
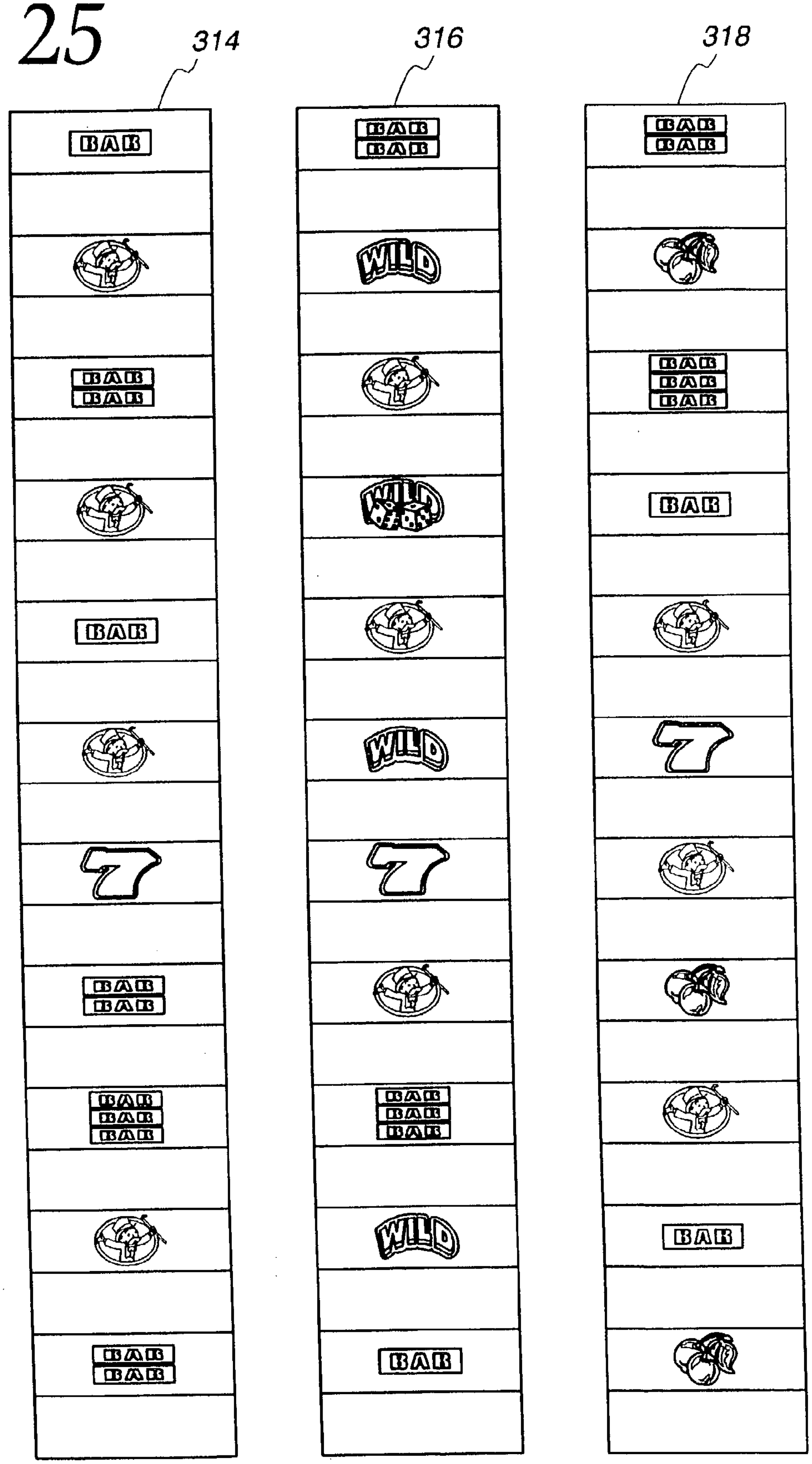
FIG. 25 is an illustration of three reel strips associated with a basic game which may be implemented on the gaming machine of FIG. 22.

FIG. 25 shows a set of reel strips for use with the slot machine 310 to implement the MONOPOLY ROLL & WIN™ game. The reel strips correspond to the reels 314, 316, 318 in FIG. 14 and will be identified by corresponding reference numerals 314, 316, 318. Each of the reel strips 314, 316, 318 include twenty-two symbols (including blanks) corresponding to twenty-two available reel stopping positions. The symbols include RICH UNCLE PENNYBAGS ("PENNY"), WILD, WILD DICE, SEVEN, 3-BAR, 2-BAR, 1-BAR, BLANK and CHERRY which, if displayed in certain predefined combinations relative to payline 376, define the standard and surprise winning combinations.

Specifically, the symbols which appear on reel strip 314 include, in sequence 1-BAR, Blank, PENNY, Blank, 2-BAR, Blank, PENNY, Blank, 1-BAR, Blank, PENNY, Blank, SEVEN, Blank, 2-BAR, Blank, 3-BAR, Blank, PENNY, Blank, 2-BAR and Blank. The symbols which appear on reel strip 316 include, in sequence 2-BAR, Blank, WILD, Blank, PENNY, Blank, WILD DICE, Blank, PENNY, Blank, WILD, Blank, SEVEN, Blank, PENNY, Blank, 3-BAR, Blank, WILD, Blank, 1-BAR and Blank. Finally, the symbols which appear on reel strip 318 include, in sequence 2-BAR, Blank, CHERRY, Blank, 3-BAR, Blank, 1-BAR, Blank, PENNY, Blank, SEVEN, Blank, PENNY, Blank, CHERRY, Blank, PENNY, Blank, 1-BAR, Blank, CHERRY and Blank.

TABLE D-1

Pay Table for ROLL & WIN™ Basic Game

| Reel1 | Reel2 | Reel3 | 1Coin | 2Coin | 3Coin | 4Coin |
|---|---|---|---|---|---|---|
| Seven | Seven | Seven | 50 | 100 | 150 | 150 |
| 3Bar | 3Bar | 3Bar | 40 | 80 | 120 | 120 |
| 2Bar | 2Bar | 2Bar | 20 | 40 | 60 | 60 |
| 1Bar | 1Bar | 1Bar | 10 | 20 | 30 | 30 |
| AnyBar | AnyBar | Anybar | 5 | 10 | 15 | 15 |
| Anything | Wild | Cherry | 5 | 10 | 15 | 15 |
| Anything | Anything | Cherry | 2 | 4 | 6 | 6 |

Table D-1 is a pay table identifying various standard winning combinations of symbols in the MONOPOLY ROLL & WIN™ game. In one embodiment, the game accepts from one to four coins. The winning standard combinations can occur for any number of one to four coins played if the indicated symbols are displayed on reels 314, 316, 318 in alignment with the center payline 376. For example, three "1-BAR" symbols displayed on reels 314, 316, 318 on the center payline 376 is a standard winning combination which will pay 10 credits for 1 coin played, 20 credits for 2 coins played and 30 credits for 3 or 4 coins played. The "AnyBar" combination is satisfied by any combination of three or more "1-BAR," "2-BAR" and "3-BAR" symbols stopping on the center payline 376.

In one embodiment, the "WILD" and "WILD DICE" symbols acts as wildcards for any other symbol on the payline 376. Where the "WILD" symbol is used to complete a winning combination, the payout will be the same as the standard winning combination as if completed without the WILD symbol. Thus, for example, the combination of "2-BAR," "WILD" and "2-BAR" is a standard winning combination which would pay the same as the combination of three "2-BAR" symbols, corresponding to the number of coins played. Where the "WILD DICE" symbol is used to complete a winning combination, the ROLL THE DICE FEATURE is triggered to identify a multiplier value, as heretofore described, and the multiplier value is used to multiply the amount otherwise associated with the combination.

The ROLL THE DICE Multiplier Feature

In the MONOPOLY ROLL & WIN™ game, if the "WILD DICE" symbol is displayed on the payline 376 and is included in a wining combination, the ROLL THE DICE multiplier feature begins. In one embodiment, there is only one "WILD DICE" symbol on reel 316 (the center reel) and the combinations which would trigger the ROLL THE DICE feature are: SEVEN, WILD DICE, SEVEN; 3 BAR, WILD DICE, 3 BAR; 2 BAR, WILD DICE, 2 BAR; 1 BAR, WILD DICE, 1 BAR; ANYBAR, WILD DICE, ANYBAR and PENNY, WILD DICE, PENNY. The PENNY, WILD DICE, PENNY combination also triggers the ROLL & WIN bonus game, to be described later.

The ROLL THE DICE feature can be activated by playing from one-four coins. When the WILD DICE symbol appears in a standard winning combination, the CPU 370 activates the ROLL THE DICE feature by randomly selecting a multiplier value, then multiplies the base amount associated with the standard winning combination by the selected multiplier value. When the WILD DICE symbol appears in the PENNY, WILD DICE, PENNY combination, a "start-bonus" combination which also triggers the ROLL & WIN bonus game, the CPU 370 enters the ROLL & WIN bonus game first and then, after the bonus game has ended, randomly selects a multiplier value and multiplies the amount won in the bonus game by the selected multiplier value.

In one embodiment, the CPU 370 selects the multiplier value by selecting a number corresponding to the roll of two six-sided dice. This is accomplished in one embodiment by randomly selecting two integer values from one to six (each corresponding to a roll of a single six-sided die), then summing the integer values to arrive at the multiplier value. Specifically, there are 36 possible outcomes of the two integer values which might occur: (1,1), (1,2), (1,3), (1,4), (1,5), (1,6), (2,1), (2,2), (2,3), (2,4), (2,5), (2,6), (3,1), (3,2), (3,3), (4,3), (4,4), (4,5), (4,6), (5,1), (5,2), (5,3), (5,4), (5,5), (5,6), (6,1), (6,6). These outcomes correspond to 1 possible sums: 2 (1 occurrence), 3 (2 occurrences), 4 (3 occurrences), 5 (4 occurrences), 6 (5 occurrences), 7 (6 occurrences), 8 (5 occurrences), 9 occurrences), 10 (3 occurrences), 11 (2 occurrences) and 12 (1 occurrence).

In one embodiment, each of the possible outcomes of integer values (corresponding to the roll of two dice) has an equal probability of occurrence and consequently, the probability of the CPU 370 selecting the various multiplier values (corresponding to the sum of two fair dice) is as follows: 2.7% (i.e., 1÷36) for the "2×" and "12×" multipliers; 5.5% (i.e., 2÷36) for the "2×" and "11×" multipliers; 8.3% (i.e., 3÷36) for the "4×" and "10× multipliers; 11.1% (i.e., 4÷36) for the "5×" and "9× multipliers; 13.9% (i.e., 5÷36) for the "6×" and "8× multipliers; and 16.7% (i.e., 6÷36) for the "7×" multiplier.

In one embodiment, the selection of the ROLL THE DICE multiplier is depicted both graphically, on the graphic display 312 and mechanically, by the mechanical dice 364. On the graphics display 312, the CPU 370 generates a display of two dice-which are rolling at first, then stop, one at a time to reveal two die faces. The die faces selected for display correspond to the integer values from one to six selected by the CPU 370. For example, having selected integer values of "1" and "6," the CPU 370 will display a pair of dice, one of which indicates a roll of "1" and the other indicating a roll of "6." The CPU 370 then adds the two integer values to determine the multiplier value (e.g., "7×") which in one embodiment is displayed adjacent to the two die faces on the graphics display 312. Similarly, the CPU 370 causes the two mechanical dice 364 to rotate or "roll" at first, then stop, one at a time to reveal two die faces. The die faces on the mechanical dice 364 correspond to the die faces on the graphics display 312.

Then, the CPU 370 then generates a screen on the graphics display 312 showing the total win. For example, suppose a "7×" multiplier is selected by the CPU 370 in a ROLL THE DICE feature which resulted from a SEVEN, WILD DICE, SEVEN symbol combination. In one embodiment, the graphics display shows the basic win amount associated with the SEVEN, WILD DICE, SEVEN symbol combination (e.g., 150 coins with 3 coins played), the selected multiplier (e.g., "7×") and the product of the multiplier and basic win amount (e.g., 1050 coins).

The ROLL & WIN™ Bonus Game

In one embodiment, the CPU 370 enters the ROLL & WIN™ bonus game when the player is betting four coins and a special "start-bonus" combination of three RICH UNCLE PENNYBAGS ("PENNY") symbols occurs on the center payline 376 of reels 314, 316, 318 in the basic game. The ROLL & WIN™ bonus game has a board-game (e.g., MONOPOLY) theme and is implemented on the top box game board 362 and graphics display 312. Upon initially entering the bonus game, the CPU 370 causes an introductory animation to be displayed on the graphics display 312 with a musical jingle and then operates to display an animation of a game token traveling around a MONOPOLY board. The CPU 370 also signals I/O controller 371 to illuminate the appropriate to illuminate a starting square on the top box game board 362 and then illuminate successive squares around the board in step-wise fashion, rapidly at first and then, after a couple of revolutions, slowing down and stopping on an indicated square. Generally, the indicated square is randomly determined by the CPU 370 prior to the illumination of successive squares on the top box game board 362.

In one embodiment, when the player "lands" on the indicated square, the graphics display 312 shows an animation for that square. As best observed in FIG. 24, the squares of the game board 362 in one embodiment of the MONOPOLY ROLL & WIN game are: "GO," "BALTIC & MEDITTERANEAN AVENUE" (hereinafter "BALTIC"), "READING & PENNSYLVANIA & B. & O. & SHORT LINE RAILROAD" (hereinafter "RAILROAD"), "CONNECTICUT & VERMONT & ORIENTAL AVENUE" (hereinafter "VERMONT"), "IN JAIL," "VIRGINIA & STATES AVENUE & ST. CHARLES PLACE" (hereinafter "VIRGINIA"), "CHANCE," NEW YORK & TENNESSEE AVENUE & ST. JAMES PLACE" (hereinafter "NEW YORK"), "FREE PARKING," "KENTUCKY & INDIANA & ILLINOIS AVENUE" (hereinafter "ILLINOIS"), "UTILITIES," "MARVIN GARDENS & VENTNOR & ATLANTIC AVENUE" (hereinafter "MARVIN GARDENS"), "GO TO JAIL," "PENNSYLVANIA & NORTH CAROLINA & PACIFIC AVENUE" (hereinafter "PENNSYLVANIA"), "COMMUNITY CHEST" and "BOARD WALK & PARK PLACE" (hereinafter "BOARDWALK").

When the player lands on a square, the CPU 370 causes the player to be awarded the amount, if any, associated with the square. If the player is moved to a property, the movement is indicated on the top box board 362, an animation of the property is shown on the graphics display 312 and the player is awarded an amount, if any associated with the square. In one embodiment, the CPU 370 returns to the basic game after landing on a property square. If the game token 140 lands on a CHANCE or COMMUNITY CHEST square, the CPU 370 randomly selects an outcome from a plurality of possible CHANCE and COMMUNITY CHEST outcomes, and causes the graphics display 312 to display the selected outcome. If the CHANCE or COMMUNITY CHEST outcome is a fixed coin award, the graphics display 312 shows an animation of the award, the player is awarded the designated amount and then the CPU 370 returns to the basic game. If the player is moved to a new space as a result of a CHANCE or COMMUNITY CHEST outcome, the movement is indicated on the top box board 362, an animation of the square is shown on the graphics display 312, the player is awarded an amount, if any associated with the square and then the CPU 370 returns to the basic game.

TABLE D-2

MONOPOLY ROLL & WIN Square Values

| Pay | Occ | Prob | EV | Pulls/Hit | |
|---|---|---|---|---|---|
| 200 | 480 | 0.037494142 | 7.49882831 | 26.670833 | Go |
| 20 | 480 | 0.037494142 | 0.74988283 | 26.670833 | Baltic |
| 150 | 640 | 0.049992189 | 7.49882831 | 20.003125 | RailRoad |
| 25 | 540 | 0.037494142 | 0.93735354 | 26.670833 | Vermont |
| 0 | 1 | 7.81128E−05 | 0 | 12802 | Jail |
| 30 | 480 | 0.037494142 | 1.12482425 | 26.670833 | Virginia |
| 62.45 | 2080 | 0.162474613 | 10.1465396 | 6.1548077 | Chance |
| 40 | 960 | 0.074988283 | 2.99953132 | 13.335417 | NewYork |
| 100 | 1120 | 0.08748633 | 8.74863303 | 11.430357 | Free parking |
| 50 | 960 | 0.074988283 | 3.74941415 | 13.335417 | Illinois |
| 75 | 1120 | 0.08748633 | 6.56147477 | 11.430357 | Utilities |
| 100 | 1120 | 0.08748633 | 8.74863303 | 11.430357 | Marvin Gardens |
| 0 | 1 | 7.81128E−05 | 0 | 12802 | Go to Jail |
| 125 | 736 | 0.057491017 | 7.18637713 | 17.394022 | Pennsylvania |
| 62.4 | 2080 | 0.162474613 | 10.1384159 | 6.1548077 | Comm Chest |
| 1000 | 64 | 0.004999219 | 4.99921887 | 200.03125 | Boardwalk |
| | 12802 | 1 | 81.087955 | | |

Table D-2 identifies various pay values, probabilities and expected values associated with the squares of the fame board 362 in one emobidment of the MONOPOLY ROLL & WIN bonus game. The "Pay" column of Table D-2 identifies payoff amounts associated with the various squares. Other than the CHANCE and COMMUNITY CHEST squares, the payoff amounts are predetermined amounts stored in system memory. For example, the "GO" square will pay 200 coins or credits, the "BALTIC" square will pay 20 coins or credits, and so forth. In one embodiment, the IN JAIL and GO TO JAIL squares have zero value, consequently a player landing on those squares will not be paid any credits in the bonus game. In the case of the CHANCE and COMMUNITY CHEST squares, the payoff amounts represent average payoff amounts which may be expected by landing on CHANCE or COMMUNITY CHEST, respectively. In one embodiment, both the CHANCE and COMMUNITY CHEST squares will pay, on average 62.4 coins or credits in the bonus game.

TABLE D-3

COMMUNITY CHEST Pay Information

| Pay | Occ | Prob | EV | Pulls/Hit | |
|---|---|---|---|---|---|
| 50 | 15 | 0.15 | 7.5 | 6.6666667 | Opera |
| 100 | 5 | 0.05 | 5 | 20 | Inherit |
| 45 | 15 | 0.15 | 6.75 | 6.6666667 | Sell Stock |
| 10 | 5 | 0.05 | 0.5 | 20 | Beauty |
| 200 | 4 | 0.04 | 8 | 25 | Adv. Go |
| 200 | 4 | 0.04 | 8 | 25 | Bank Error |
| 25 | 10 | 0.1 | 2.5 | 10 | Services |
| 20 | 12 | 0.12 | 2.4 | 8.3333333 | Inc. Refund |
| 100 | 5 | 0.05 | 5 | 20 | Life Ins |
| 100 | 10 | 0.1 | 10 | 10 | Xmas Fund |
| 45 | 15 | 0.15 | 6.75 | 6.6666667 | Property Value |
| | 100 | 1 | 62.4 | | |

TABLE D-4

CHANCE Pay Information

| Pay | Occ | Prob | EV | Pulls/Hit | |
|---|---|---|---|---|---|
| 15 | 24 | 0.08 | 1.2 | 12.5 | Horse Race |
| 10 | 22 | 0.073333333 | 0.73333333 | 13.636364 | BlackJack |

TABLE D-4-continued

CHANCE Pay Information

| Pay | Occ | Prob | EV | Pulls/Hit | |
|---|---|---|---|---|---|
| 10 | 20 | 0.066666667 | 0.66666667 | 15 | Dog Show |
| 25 | 25 | 0.083333333 | 2.08333333 | 12 | Slots |
| 30 | 30 | 0.1 | 3 | 10 | Adv St. Charles |
| 150 | 17 | 0.056666667 | 8.5 | 17.647059 | Adv. Rail |
| 75 | 32 | 0.106666667 | 8 | 9.375 | Adv. Util |
| 50 | 33 | 0.11 | 5.5 | 9.0909091 | Adv. ILL |
| 50 | 35 | 0.116666667 | 5.83333333 | 8.5714286 | Dividend |
| 1000 | 2 | 0.006666667 | 6.66666667 | 150 | Adv. Board |
| 200 | 12 | 0.04 | 8 | 25 | Adv. Go |
| 40 | 32 | 0.106666667 | 4.26666667 | 9.375 | Lottery |
| 150 | 16 | 0.053333333 | 8 | 18.75 | Loan |
| | 300 | 1 | 62.45 | | |

The various CHANCE and COMMUNITY CHEST outcomes, and their pay values, probabilities and expected values in one embodiment are identified in Tables D-3 and D-4, above. Generally, the CHANCE and COMMUNITY CHEST outcomes include awards of fixed coin values (e.g., "LIFE INSURANCE MATURES," $100) or instructions for movement to a particular square (e.g., ADVANCE TO BOARDWALK), where the indicated square is associated with a fixed coin award. As identified in Table D-3, the COMMUNITY CHEST outcomes range in value between 10 coins or credits (e.g., "BEAUTY CONTEST", 10 coins) to a maximum of 200 coins of credits (e.g., ADVANCE TO GO, and BANK ERROR IN YOUR FAVOR). The average value of the COMMUNITY CHEST square is 62.4 coins or credits. As identified in Table D-4, the CHANCE outcomes range in value between 10 coins or credits (e.g., "DOG SHOW", 10 coins) to a maximum of 1000 coins or credits (e.g., ADVANCE TO BOARDWALK).

In one embodiment, the likelihood of landing on a particular square is predefined and stored in an occurrence probability table in game memory. The CPU 370 selects a particular square in a manner which is consistent with the occurrence probability table. Generally, the occurrence probability table might cause certain squares to be landed on more frequently than other squares. In Table D-2, the "Occ" column identifies a predefined number of outcomes or "occurrences" of each square of the MONOPOLY ROLL &

WIN game board, and the "Prob" column identifies the probability of selecting or "landing" on the respective squares. An inspection of Table D-2 reveals that there is only 1 outcome, out of 12,802 possible outcomes, which will result in the player landing on the IN JAIL square. Similarly, there is only 1 outcome, out of 12,802 possible outcomes, which will result in the player landing on the GO TO JAIL square. Thus, the probability of the player landing on IN JAIL or GO TO JAIL (and thereby getting no award) is very small, $7.811\times10^{-5}$ (i.e., 1÷12,802). The probability of landing on the other squares is generally much greater and also corresponds to the predefined number of outcomes or "occurrences" associated with the squares. For example, consider the "GO" square. The "Occ" column of Table D-1 indicates that there are 480 outcomes, out of 12,802 possible outcomes, which will result in the player landing on the GO square. Thus, the probability of the player landing on the GO square (and thereby getting an award of 200 coins or credits) is 0.037494 (i.e., 480÷12,802). The probability of landing on other squares is computed from the "Occ" column in similar fashion.

Similarly, in one embodiment, the likelihood of selecting certain CHANCE or COMMUNITY CHEST cards is predefined and stored in an occurrence probability table in game memory. The CPU 370 selects a particular CHANCE or COMMUNITY CHEST card in a manner which is consistent with the occurrence probability table. Generally, the occurrence probability table might cause certain cards to be "drawn" more frequently than other cards. In Tables D-3 and D-4, respectively, the "Occ" column identifies a predefined number of outcomes or "occurrences" which might occur as a result of landing on CHANCE and COMMUNITY CHEST on the MONOPOLY ROLL & WIN game board. The "Prob" column identifies the probability of selecting or "drawing" the respective CHANCE and COMMUNITY CHEST outcomes. The various probabilities of the CHANCE and COMMUNITY CHEST outcomes are computed by dividing the number of occurrences of the particular outcome by the total number of CHANCE or COMMUNITY CHEST outcomes, as appropriate. For example, consider the "ADVANCE TO GO" outcome in COMMUNITY CHEST. Table D-3 shows that there are 4 outcomes, out of 100 possible COMMUNITY CHEST outcomes, which will result in drawing the "ADVANCE TO GO" card. Thus, having landed on the COMMUNITY CHEST square, the probability of the player drawing the "ADVANCE TO GO" card (and thereby getting an award of 200 coins or credits) is 0.04 (i.e., 4÷100). Next consider the "ADVANCE TO GO" outcome in CHANCE. Table D-4 shows that there are 12 outcomes, out of 300 possible CHANCE outcomes, which will result in drawing the "ADVANCE TO GO" card. Thus, having landed on the CHANCE square, the probability of the player drawing the "ADVANCE TO GO" card (and thereby getting an award of 200 coins or credits) is 0.04 (i.e., 12÷300). The probability of drawing other cards is computed in similar fashion.

The "EV" column identifies the expected values associated with the various squares (Table D-2), COMMUNITY CHEST cards (Table D-3) or CHANCE cards (Table D-4). These values are computed for each outcome by taking the product of the pay value (or average pay value) associated with that outcome and the probability associated with that outcome. Thus, for example, the "GO" square has an expected value of 7.49882831 (i.e., 200×0.037494142), and the "ADVANCE TO GO" card (in both CHANCE and COMMUNITY CHEST) has an expected value of 8 (i.e., 200×0.04).

The "Pulls/Hit" value represents the number of times, on average, that the game must be played before landing on the particular square (Table D-2) or drawing the particular CHANCE or COMMUNITY CHEST cards (Tables D-3 and D-4). The "Pulls/Hit" column is simply the inverse of the "Prob" values in Tables D-2, D-2 and D-4. Thus, for example, the "GO" square has a "Pulls/Hit" value of 26.67 (i.e., 1÷0.037494142), and the "ADVANCE TO GO" card (in both CHANCE and COMMUNITY CHEST) has a "Pulls/Hit" value of 25 (i.e., 1÷0.04).

TABLE D-5

ROLL & WIN Pay Information

| Pay | Mult | Comb | Prob | EV | 4th Coin | Pulls/Hit | MaxEval |
|---|---|---|---|---|---|---|---|
| 600 | 12 | 7Roll7 | 2.6087E−06 | 0.0015652 | 0.00117393 | 383328 | 0.127201 |
| 550 | 11 | 7Roll7 | 5.2175E−06 | 0.0028696 | 0.0021522 | 191664 | 0.233203 |
| 500 | 10 | 7Roll7 | 7.8262E−06 | 0.0039131 | 0.00293482 | 127776 | 0.318004 |
| 450 | 9 | 7Roll7 | 1.0435E−05 | 0.0046957 | 0.00352179 | 95832 | 0.381604 |
| 400 | 8 | 7Roll7 | 1.3044E−05 | 0.0052175 | 0.0039131 | 76665.6 | 0.424005 |
| 350 | 7 | 7Roll7 | 1.5652E−05 | 0.0054783 | 0.00410875 | 63888 | 0.445205 |
| 300 | 6 | 7Roll7 | 1.3044E−05 | 0.0039131 | 0.00293482 | 76665.6 | 0.318004 |
| 250 | 5 | 7Roll7 | 1.0435E−05 | 0.0026087 | 0.00195655 | 95832 | 0.212002 |
| 200 | 4 | 7Roll7 | 7.8262E−06 | 0.0015652 | 0.00117393 | 127776 | 0.127201 |
| 150 | 3 | 7Roll7 | 5.2175E−06 | 0.0007826 | 0.00058696 | 191664 | 0.063601 |
| 100 | 2 | 7Roll7 | 2.6087E−06 | 0.0002609 | 0.00019565 | 383328 | 0.0212 |
| 50 | | 777 | 0.00037566 | 0.0187829 | 0.01408715 | 2662 | 1.526418 |
| 480 | 12 | 3BRoll3B | 2.6087E−06 | 0.0012522 | 0.00093914 | 383328 | 0.101761 |
| 440 | 11 | 3BRoll3B | 5.2175E−06 | 0.0022957 | 0.00172176 | 191664 | 0.186562 |
| 400 | 10 | 3BRoll3B | 7.8262E−06 | 0.0031305 | 0.00234786 | 127776 | 0.254403 |
| 360 | 9 | 3BRoll3B | 1.0435E−05 | 0.0037566 | 0.00281743 | 95832 | 0.305284 |
| 320 | 8 | 3BRoll3B | 1.3044E−05 | 0.004174 | 0.00313048 | 76665.6 | 0.339204 |
| 280 | 7 | 3BRoll3B | 1.5652E−05 | 0.0043827 | 0.003287 | 63888 | 0.356164 |
| 240 | 6 | 3BRoll3B | 1.3044E−05 | 0.0031305 | 0.00234786 | 76665.6 | 0.254403 |
| 200 | 5 | 3BRoll3B | 1.0435E−05 | 0.002087 | 0.00156524 | 95832 | 0.169602 |
| 160 | 4 | 3BRoll3B | 7.8262E−06 | 0.0012522 | 0.00093914 | 127776 | 0.101761 |
| 120 | 3 | 3BRoll3B | 5.2175E−06 | 0.0006261 | 0.00046957 | 191664 | 0.050881 |
| 80 | 2 | 3BRoll3B | 2.6087E−06 | 0.0002087 | 0.00015652 | 383328 | 0.01696 |
| 40 | | 3B3B3B | 0.00037566 | 0.0150263 | 0.01126972 | 2662 | 1.221134 |
| 240 | 12 | 2BRoll2B | 7.8262E−06 | 0.0018783 | 0.00140872 | 12776 | 0.152642 |

TABLE D-5-continued

ROLL & WIN Pay Information

| Pay | Mult | Comb | Prob | EV | 4th Coin | Pulls/Hit | MaxEval |
|---|---|---|---|---|---|---|---|
| 220 | 11 | 2BRoll2B | 1.5652E−05 | 0.0034435 | 0.00258264 | 63888 | 0.279843 |
| 200 | 10 | 2BRoll2B | 2.3479E−05 | 0.0046957 | 0.00352179 | 42592 | 0.381604 |
| 180 | 9 | 2BRoll2B | 3.1305E−05 | 0.0056349 | 0.00422615 | 31944 | 0.457925 |
| 160 | 8 | 2BRoll2B | 3.9131E−05 | 0.006261 | 0.00469572 | 25555.2 | 0.508806 |
| 140 | 7 | 2BRoll2B | 4.6957E−05 | 0.006574 | 0.0049305 | 21296 | 0.534246 |
| 120 | 6 | 2BRoll2B | 3.9131E−05 | 0.0046957 | 0.00352179 | 25555.2 | 0.381604 |
| 100 | 5 | 2BRoll2B | 3.1305E−05 | 0.00031305 | 0.00234786 | 31944 | 0.254403 |
| 80 | 4 | 2BRoll2B | 2.3479E−05 | 0.0018783 | 0.00140872 | 42592 | 0.152642 |
| 60 | 3 | 2BRoll2B | 1.5652E−05 | 0.0009391 | 0.00070436 | 63888 | 0.076321 |
| 40 | 2 | 2BRoll2B | 7.8262E−06 | 0.000313 | 0.00023479 | 127776 | 0.02544 |
| 20 | | 2B2B2B | 0.00112697 | 0.0225394 | 0.01690458 | 887.3333333 | 1.831701 |
| 120 | 12 | 1BRoll1B | 1.0435E−05 | 0.0012522 | 0.00093914 | 95832 | 0.101761 |
| 110 | 11 | 1BRoll1B | 2.087E−05 | 0.0022957 | 0.00172176 | 47916 | 0.186562 |
| 100 | 10 | 1BRoll1B | 3.1305E−05 | 0.0031305 | 0.00234786 | 31944 | 0.254403 |
| 90 | 9 | 1BRoll1B | 4.174E−05 | 0.0037566 | 0.00281743 | 23958 | 0.305284 |
| 80 | 8 | 1BRoll1B | 5.2175E−05 | 0.004174 | 0.00313048 | 19166.4 | 0.339204 |
| 70 | 7 | 1BRoll1B | 6.261E−05 | 0.0043827 | 0.003287 | 15972 | 0.356164 |
| 60 | 6 | 1BRoll1B | 5.2175E−05 | 0.0031305 | 0.00234786 | 19166.4 | 0.254403 |
| 50 | 5 | 1BRoll1B | 4.174E−05 | 0.002087 | 0.00156524 | 23958 | 0.169602 |
| 40 | 4 | 1BRoll1B | 3.1305E−05 | 0.0012522 | 0.00093914 | 31944 | 0.101761 |
| 30 | 3 | 1BRoll1B | 2.087E−05 | 0.0006261 | 0.00046957 | 47916 | 0.050881 |
| 20 | 2 | 1BRoll1B | 1.0435E−05 | 0.0002087 | 0.00015652 | 95832 | 0.01696 |
| 10 | | 1B1B1B | 0.00150263 | 0.0150263 | 0.01126972 | 665.5 | 1.221134 |
| 60 | 12 | ABRollAB | 4.174E−05 | 0.0025044 | 0.00187829 | 23958 | 0.203522 |
| 55 | 11 | ABRollAB | 8.3479E−05 | 0.0045914 | 0.00344353 | 11979 | 0.373124 |
| 50 | 10 | ABRollAB | 0.00012522 | 0.006261 | 0.00469572 | 7986 | 0.508806 |
| 45 | 9 | ABRollAB | 0.00016696 | 0.0075131 | 0.00563486 | 5989.5 | 0.610567 |
| 40 | 8 | ABRollAB | 0.0002087 | 0.0083479 | 0.00626096 | 4791.6 | 0.678408 |
| 35 | 7 | ABRollAB | 0.00025044 | 0.0087653 | 0.006574 | 3993 | 0.712328 |
| 30 | 6 | ABRollAB | 0.0002087 | 0.006261 | 0.00469572 | 4791.6 | 0.508806 |
| 25 | 5 | ABRollAB | 0.00016696 | 0.004174 | 0.00313048 | 5989.5 | 0.339204 |
| 20 | 4 | ABRollAB | 0.00012522 | 0.0025044 | 0.00187829 | 7986 | 0.203522 |
| 15 | 3 | ABRollAB | 8.3479E−05 | 0.0012522 | 0.00093914 | 11979 | 0.101761 |
| 10 | 2 | ABRollAB | 4.174E−05 | 0.0004174 | 0.00031305 | 23958 | 0.03392 |
| 5 | | ABABAB | 0.01051841 | 0.052592 | 0.03944403 | 95.07142857 | 4.273969 |
| 60 | 12 | AnyRollCherry | 0.00017218 | 0.0103306 | 0.00774793 | 5808 | 0.83953 |
| 55 | 11 | AnyRollCherry | 0.00034435 | 0.0189394 | 0.01420455 | 2904 | 1.539138 |
| 50 | 10 | AnyRollCherry | 0.00051653 | 0.0258264 | 0.01936983 | 1936 | 2.098824 |
| 45 | 9 | AnyRollCherry | 0.00068871 | 0.0309917 | 0.0232438 | 1452 | 2.518589 |
| 40 | 8 | AnyRollCherry | 0.00086088 | 0.0344353 | 0.02582645 | 1161.6 | 2.798432 |
| 35 | 7 | AnyRollCherry | 0.00103306 | 0.036157 | 0.02711777 | 968 | 2.938354 |
| 30 | 6 | AnyRollCherry | 0.00086088 | 0.0258264 | 0.01936983 | 1161.6 | 2.098824 |
| 25 | 5 | AnyRollCherry | 0.00068871 | 0.0172176 | 0.01291322 | 1452 | 1.399216 |
| 20 | 4 | AnyRollCherry | 0.00051653 | 0.0103306 | 0.00774793 | 1936 | 0.83953 |
| 15 | 3 | AnyRollCherry | 0.00034435 | 0.0051653 | 0.00387397 | 2904 | 0.419765 |
| 10 | 2 | AnyRollCherry | 0.00017218 | 0.0017218 | 0.00129132 | 5808 | 0.139922 |
| 5 | | 2Cherry | 0.01859504 | 0.0929752 | 0.0697314 | 53.77777778 | 7.555767 |
| 2 | | Cherry | 0.11157025 | 0.2231405 | 0.16735537 | 8.962962963 | 18.13384 |
| Base Game Totals | | | 0.1526108 | 0.834523 | 0.625892 | | |
| 973.0555 | 12 | UncleRollUncle | 3.1305E−05 | | 0.00761532 | 31944 | |
| 891.9675 | 11 | UncleRollUncle | 6.261E−05 | | 0.01396142 | 15972 | |
| 810.8796 | 10 | UncleRollUncle | 9.3914E−05 | | 0.01903831 | 10648 | |
| 729.7916 | 9 | UncleRollUncle | 0.00012522 | | 0.02284597 | 7986 | |
| 648.7036 | 8 | UncleRollUncle | 0.00015652 | | 0.02538441 | 6388.8 | |
| 567.6157 | 7 | UncleRollUncle | 0.00018783 | | 0.02665363 | 5324 | |
| 486.5277 | 6 | UncleRollUncle | 0.00015652 | | 0.01903831 | 6388.8 | |
| 405.4398 | 5 | UncleRollUncle | 0.00012522 | | 0.0126922 | 7986 | |
| 324.3518 | 4 | UncleRollUncle | 9.3914E−05 | | 0.00761532 | 10648 | |
| 243.2639 | 3 | UncleRollUncle | 6.261E−05 | | 0.00380766 | 15972 | |
| 162.1759 | 2 | UncleRollUncle | 3.1305E−05 | | 0.00126922 | 31944 | |
| | | | 0.00112697 | | | | |
| 81.08796 | | UncleUncleUncle | 0.00676183 | | 0.13707581 | 147.8888889 | |
| Board Game Totals | | | 0.0078888 | | 0.296998 | 126.7619048 | |
| Base and Bonus Games | | | 0.1604996 | | 0.92289 | | |
| Probability of Top Award (Boardwalk w/dice roll of 12) = | | | | | 1.9041E−07 | 5251888.973 pulls | |

Table D-5 identifies various symbol combinations, probabilities and expected values associated with the ROLL & WIN game according to one embodiment of the present invention. The combinations include various standard winning combinations including "777," "3B3B3B," "2B2B2B," "1B1B1B," "ABABAB," "2 Cherry" and "Cherry;" various combinations which will start the ROLL & WIN bonus game including "UncleUncleUncle;" and various combinations which will trigger the ROLL THE DICE multiplier feature, including "7Roll7," "3BRoll3B," "2BRoll2B," "1BRoll1B," "ABRollAB" and "AnyRollCherry" and "UncleRollUncle." In Table D-5 and the description to follow, "Roll" is a shorthand notation for the WILD DICE symbol, "3B," "2B," "1B" and "AB" are shorthand notations for the 3 BAR, 2 BAR, 1 BAR and ANY BAR symbols and "Uncle" is a shorthand notation for the RICH UNCLE PENNYBAGS symbol.

The "Pay" column identifies payoff amounts associated with the respective combinations in Table D-5, for 1 coin played. In the case of the standard winning combinations, the payoff amounts are predetermined amounts stored in system memory. For example, the "777" combination is a standard winning combination which will award 50 coins or credits in a 1-coin game. In one embodiment, the coin awards are multiplied by two for two coins bet and multiplied by three for three or four coins bet. The fourth coin allows the player the opportunity to play the MONOPOLY ROLL & WIN™ bonus game and does not increase the value of the standard winning combinations above the 3-coin payoff amount. Thus, for example, the "777" combination which, as noted above, will award 50 coins or credits in a 1-coin game, will award 100 coins or credits in a 2-coin game and 150 coins or credits in a 3- or 4-coin game.

In the case of the combinations starting the ROLL & WIN bonus game, the payoff amounts represent average payoff amounts which may be expected in the bonus game. For example, the "UncleUncleUncle" combination will start the ROLL & WIN bonus game (if 4 coins or credits are played) which will pay, on average, 81.08796 coins or credits.

In the case of the combinations including a "Roll" (WILD DICE) symbol, the payoff amounts represent the product of the standard payoff (or average bonus payoff) with various multiplier values 2 to 12 which might result from the ROLL THE DICE multiplier-bonus. For example, "2 7Roll7" is a shorthand notation for the 7, WILD DICE, 7 combination which triggers the ROLL THE DICE feature, and in which a multiplier bonus of "2" is selected in the ROLL THE DICE feature. The payoff amount for the "2 7Roll7" combination is 100, or twice the payoff of the "777" combination. Similary, "3 7Roll7" is a shorthand notation for the 7, WILD DICE, 7 combination in which a multiplier bonus of "3" is selected in the ROLL THE DICE feature to triple the payoff of the "777" combination, and so forth.

With the exception of the "UncleRollUncle" combination, which is only available for 4 coins played, the various combinations including a "Roll" (WILD DICE) symbol are multiplied by two for two coins bet and multiplied by three for three or four coins bet. The fourth coin allows the player the opportunity to play the MONOPOLY ROLL & WIN™ bonus game and does not increase the value of the standard winning combinations above the 3-coin payoff amount. Thus, for example, the "2 7Roll7" combination which, as noted above, will award 100 coins or credits in a 1-coin game, will award 200 coins or credits in a 2-coin game and 300 coins or credits in a 3- or 4-coin game.

The "Prob" column identifies, for the standard winning combinations, the probabilities of hitting the outcomes in a single spin. For the combinations including a WILD DICE ("Roll") symbol, the "Prob" value takes into account the probability of rolling the indicated multiplier as well as the probability of "hitting" the indicated outcome. Where the reels each have twenty-two reel stop positions, as in the ROLL & WIN™ game, there are 10,648 (22×22×22) possible symbol combinations. The probability of hitting any particular combination in a single spin is determined by dividing the number of possible "hits" associated with that combination (which is a function of the number of reel positions of the symbols supporting that combination) by the total number of possible combinations (i.e., 10,648). For example, consider the "777" combination. Because there is one SEVEN symbol on reel 314, one SEVEN symbol on reel 316 and one SEVEN symbol on reel 318, there is one "hit" associated with that combination. The probability of hitting that combination is therefore $9.39\times10^{-5}$ (i.e. 1÷10,648).

Next consider the various "7Roll7" combinations. If the ROLL THE DICE multiplier is determined according to the roll of a pair of fair dice, the probability of selecting a "2×" or "12×" multiplier is 2.7%, the probability of selecting a "3×" or "11×" multiplier is 5.5%, the probability of selecting a "4×" or "10×" multiplier is 8.3%, the probability of selecting a "5×" or "9× multiplier is 11.1%, the probability of selecting a "6×" or "8×" multiplier is 13.9% and the probability of selecting a "7×" multiplier is 16.7%. The probability of "hitting" the "2 7Roll7" and "12 7Roll7" combinations is therefore $2.53\times10^{-6}$ (i.e. $9.39\times10^{-5}\times0.027$). The remai probabilities are computed in similar fashion.

The "EV" column identifies the normalized expected values of the various standard winning outcomes of Table D-2 for a 1-coin, 2-coin or 3-coin game. These values are computed for each outcome by taking the product of the pay value (or average pay value) associated with that outcome and the probability associated with that outcome, divided by the number of coins played. Thus, for example, the "12 7Roll7" outcome has a 1-coin expected value of 0.0015652 ($600\times2.6087\times10^{-6}\div1$), a 2-coin expected value of 0.0015652 ($1200\times2.6087\times10^{-6}\div2$) and a 3-coin expected value of 0.0015652 ($1800\times2.6087\times10^{-6}\div3$).

The "4thCoin" column identifies the normalized expected values of the various standard winning outcomes of Table D-2 for a 4-coin game. These values are computed in similar fashion as the 1-coin, 2-coin and 3-coin expected values but differ because the pay value of the standard combinations does not increase from a 3-coin to a 4-coin game. Thus, for example, the "12 7Roll7" outcome has a 4-coin expected value of 0.00117393 ($1800\times2.6087\times10^{-6}\div4$).

Any of the gaming machines heretofore described can be implemented with bonus-resource outcomes, causing the processor to generate a deferred instruction which is exercisable to enhance the excitement and/or winning expectation in the bonus game. Generally, the deferred instruction associated with the bonus resource is exercisable in response to later outcomes or events in the game. For example, the bonus resource might might be obtained in response to special symbol combination(s) the basic game and the deferred instruction associated with the bonus resource might be exercised in the bonus game. The deferred instruction might be executed automatically by the CPU in response to certain later-displayed indicia in the game or might be exercisable in response to player input. In one embodiment, the CPU continues to operate in the basic mode after the occurrence of a bonus-resource outcome in the basic game. In this embodiment, any number of bonus-resource outcomes may occur through several repetitions of the basic game (causing the CPU to store a corresponding number of deferred instructions in game memory) before entering the bonus mode. In one embodiment, the CPU exercises the deferred instruction(s) associated with the bonus-resource(s), if at all, in the bonus game.

In one embodiment, the bonus game resource comprises a multiplier (e.g., 2×, 5×, 10×, etc.) associated with a deferred instruction to multiply a later displayed value, such as an amount of coin(s) or credit(s) otherwise awarded in a bonus game. For example, a "5×" resource, obtained as a result of a particular outcome of the basic game, might be exercised in the bonus game to instruct the CPU to multiply an otherwise-indicated award of 5 coins by five, resulting in an award of 25 coins. In another embodiment, the deferred instruction associated with the bonus game resource comprises an "override" command causing the CPU to override or block the performance of an instruction otherwise indicated in the bonus game. For example, a deferred "override" command, obtained in the basic game as a result of a particular bonus-resource outcome, might be played in the bonus game to override an "end-bonus" instruction encountered in the bonus game. Whereas the "end-bonus" instruction would otherwise have caused the CPU to end the bonus game, the exercise of the "override" command would allow the player to continue the bonus game. With particular reference to the MONOPOLY-theme games described herein, one bonus-resource might comprise a "GET OUT OF JAIL FREE" card, obtainable as a result of a special symbol combination in the basic game and associated with a deferred instruction to "get out of jail," or in other words to override the instruction nominally associated with the IN JAIL square. Thus, for example, if the IN JAIL square is nominally associated with an "end-bonus" instruction, causing the CPU to end the bonus game, a player landing on the IN JAIL square might exercise a "GET OUT OF JAIL FREE" card to override the nominal end-bonus instruction and continue the bonus game.

It will be appreciated that the present invention has generally been described with reference to the particular games ADVANCE TO BOARDWALK™, REEL ESTATE™, ONCE AROUND™ and ROLL & WIN™, based on the MONOPOLY™ board game but is not limited to these particular games. For example, while the aforementioned games have a basic game in the form of a slot machine, the present invention may be implemented with virtually any type of game of chance or skill or combination of such games having outcomes (e.g., "start-bonus" outcomes) which may trigger play of a bonus game. The basic game may comprise, for example, a video poker or video blackjack game. Moreover, the present invention may be based on board games other than MONOPOLY. Other variations within the scope of the present invention include basic games or bonus games with different numbers and types of reels and/or symbols, different payline configurations, different values of coin awards, different probabilities, payback percentages, etc.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game on a gaming machine, the gaming machine including a controller, a display and a three-dimensional body, the body having a plurality of generally flat faces and being rotatable about at least one axis, the method comprising:

receiving a wager to play the wagering game;

randomly determining an outcome using the controller;

rotating the body about the axis;

stopping the body to display said randomly determined outcome on one of the faces thereof;

advancing an element along a plurality of locations on the display based on the randomly determined outcome; and awarding an award associated with a particular location every time an element is advanced to said particular location.

2. The method of claim 1, wherein the body is a cube-shaped die.

3. The method of claim 1, wherein the display depicts a trail having a plurality of stations, wherein the element includes a station marker, and wherein the advancing step includes moving the station marker from one of the stations to another of the stations.

4. The method of claim 3, further including awarding an award based, at least in part, on where the element advances to on the display.

5. The method of claim 3, wherein the displayed randomly determined outcome represents a number, and wherein the advancing step includes moving the station marker along the trail by a number of stations corresponding to the number represented by the displayed randomly determined outcome.

6. The method of claim 1, further including the steps of conducting a base game and conducting a bonus feature in response to a start-bonus outcome in the base game, the bonus feature including the rotating, stopping, and advancing steps.

7. A method of conducting a wagering game on a gaming machine, the gaming machine including a controller, a display and a three-dimensional body, the body having a plurality of generally flat faces and being rotatable about at least one axis, the method comprising:

receiving a wager to play the wagering game;

randomly determining an outcome using the controller;

rotating the body about the axis;

stopping the body to display said randomly determined outcome on one of the faces thereof, the outcome itself not indicating an award;

advancing play of the wagering game from a first location to a second location based on the randomly determined outcome; and awarding an award associated with said second location every time an element is advanced to said second location.

8. The method of claim 7, wherein the body is a cube-shaped die.

9. The method of claim 7, wherein the display depicts a trail having a plurality of stations, wherein the element includes a station marker, and wherein the advancing step includes moving the station marker from one of the stations to another of the stations.

10. The method of claim 9, further including awarding an award.

11. The method of claim 9, wherein the displayed randomly determined outcome represents a number, and wherein the advancing step includes moving the station marker along the trail by a number of stations corresponding to the number represented by the displayed randomly determined outcome.

12. The method of claim 7, further including the steps of conducting a base game and conducting a bonus feature in response to a start-bonus outcome in the base game, the bonus feature including the rotating, stopping, and advancing steps.

13. A gaming apparatus for conducting a wagering game, comprising:

a display;

a three-dimensional body having a plurality of generally flat faces and being rotatable about at least one axis; and a controller for generating a random outcome and for causing the body to rotate about the axis, to stop the body to display said randomly determined outcome on one of the faces thereof, said controller being further configured to advance an element alone a plurality of locations on the display based on the randomly determined outcome and to award an award associated with a particular location to which said element is advanced every time an element is advanced to said particular location.

14. The method of claim 13, wherein the body is a cube-shaped die.

15. The method of claim 13, wherein the display depicts a trail having a plurality of stations, wherein the element includes a station marker, and wherein the controller causes the station marker to move from one of the stations to another of the stations.

16. The method of claim 15, wherein the controller is for awarding an award based, at least in part, on where the element advances to on the display.

17. The method of claim 15, wherein the displayed randomly determined outcome represents a number, and wherein the controller causes the station marker to move along the trail by a number of stations corresponding to the number represented by the displayed randomly determined outcome.

* * * * *

UNITED STATES PATENT AND TRADEMARK OFFICE

CERTIFICATE OF CORRECTION

PATENT NO. : 7,195,560 B2
APPLICATION NO. : 10/427657
DATED : March 27, 2007
INVENTOR(S) : Lawrence E. DeMar et al.

It is certified that error appears in the above-identified patent and that said Letters Patent is hereby corrected as shown below:

In column 53, in Claim 13, please replace line 19 with the following:

-- configured to advance an element along a plurality of --

Signed and Sealed this

Twenty-second Day of December, 2009

David J. Kappos
*Director of the United States Patent and Trademark Office*